US010341632B2

(12) United States Patent
Pang et al.

(10) Patent No.: US 10,341,632 B2
(45) Date of Patent: Jul. 2, 2019

(54) SPATIAL RANDOM ACCESS ENABLED VIDEO SYSTEM WITH A THREE-DIMENSIONAL VIEWING VOLUME

(71) Applicant: Google LLC., Mountain View, CA (US)

(72) Inventors: Derek Pang, San Jose, CA (US); Colvin Pitts, Snohomish, WA (US); Kurt Akeley, Saratoga, CA (US)

(\*) Notice: Subject to any disclaimer, the term of this patent is extended or adjusted under 35 U.S.C. 154(b) by 0 days.

(21) Appl. No.: 15/590,877

(22) Filed: May 9, 2017

(65) Prior Publication Data
US 2017/0244948 A1    Aug. 24, 2017

Related U.S. Application Data

(63) Continuation-in-part of application No. 15/084,326, filed on Mar. 29, 2016, now Pat. No. 10,085,005.
(Continued)

(51) Int. Cl.
*G06F 3/00*    (2006.01)
*G06F 3/01*    (2006.01)
(Continued)

(52) U.S. Cl.
CPC ........... *H04N 13/117* (2018.05); *G06F 3/005* (2013.01); *G06F 3/011* (2013.01); *G06F 3/0304* (2013.01);
(Continued)

(58) Field of Classification Search
CPC ........... H04N 19/597; H04N 21/21805; H04N 21/2365; H04N 21/816; H04N 13/10; H04N 13/117; H04N 13/243; G06F 3/04815
See application file for complete search history.

(56) References Cited

U.S. PATENT DOCUMENTS 725,567 A    4/1903 Ives
4,383,170 A    5/1983 Takagi et al.
(Continued)

FOREIGN PATENT DOCUMENTS

CN    101226292    7/2008
CN    101309359    11/2008
(Continued)

OTHER PUBLICATIONS

Nimeroff, J., et al., "Efficient rendering of naturally illuminatied environments" in Fifth Eurographics Workshop on Rendering, 359-373, 1994.
(Continued)

*Primary Examiner* — Haixia Du

(57) ABSTRACT

An environment may be displayed from a viewpoint. According to one method, volumetric video data may be acquired depicting the environment, for example, using a tiled camera array. A plurality of vantages may be distributed throughout a viewing volume from which the environment is to be viewed. The volumetric video data may be used to generate video data for each vantage, representing the view of the environment from that vantage. User input may be received designating a viewpoint within the viewing volume. From among the plurality of vantages, a subset nearest to the viewpoint may be identified. The video data from the subset may be retrieved and combined to generate viewpoint video data depicting the environment from the viewpoint. The viewpoint video data may be displayed for the viewer to display a view of the environment from the viewpoint selected by the user.

41 Claims, 57 Drawing Sheets

Related U.S. Application Data

(60) Provisional application No. 62/148,460, filed on Apr. 16, 2015, provisional application No. 62/148,055, filed on Apr. 15, 2015.

(51) Int. Cl.

| | | |
|---|---|---|
| *G06F 3/03* | (2006.01) | |
| *H04N 5/222* | (2006.01) | |
| *H04N 5/225* | (2006.01) | |
| *H04N 5/247* | (2006.01) | |
| *H04N 13/117* | (2018.01) | |
| *H04N 13/156* | (2018.01) | |
| *H04N 13/161* | (2018.01) | |
| *H04N 13/194* | (2018.01) | |
| *H04N 13/232* | (2018.01) | |
| *H04N 13/243* | (2018.01) | |
| *H04N 13/275* | (2018.01) | |
| *H04N 13/282* | (2018.01) | |
| *H04N 13/344* | (2018.01) | |

(52) U.S. Cl.
CPC ......... *H04N 5/2226* (2013.01); *H04N 5/2254* (2013.01); *H04N 5/2258* (2013.01); *H04N 5/247* (2013.01); *H04N 13/156* (2018.05); *H04N 13/161* (2018.05); *H04N 13/194* (2018.05); *H04N 13/232* (2018.05); *H04N 13/243* (2018.05); *H04N 13/282* (2018.05); *H04N 13/275* (2018.05); *H04N 13/344* (2018.05)

(56) References Cited

U.S. PATENT DOCUMENTS

| | | | |
|---|---|---|---|
| 4,661,986 | A | 4/1987 | Adelson |
| 4,694,185 | A | 9/1987 | Weiss |
| 4,920,419 | A | 4/1990 | Easterly |
| 5,076,687 | A | 12/1991 | Adelson |
| 5,077,810 | A | 12/1991 | D'Luna |
| 5,157,465 | A | 10/1992 | Kronberg |
| 5,251,019 | A | 10/1993 | Moorman et al. |
| 5,282,045 | A | 1/1994 | Mimura et al. |
| 5,499,069 | A | 3/1996 | Griffith |
| 5,572,034 | A | 11/1996 | Karellas |
| 5,610,390 | A | 3/1997 | Miyano |
| 5,729,471 | A | 3/1998 | Jain et al. |
| 5,748,371 | A | 5/1998 | Cathey, Jr. et al. |
| 5,757,423 | A | 5/1998 | Tanaka et al. |
| 5,818,525 | A | 10/1998 | Elabd |
| 5,835,267 | A | 11/1998 | Mason et al. |
| 5,907,619 | A | 5/1999 | Davis |
| 5,949,433 | A | 9/1999 | Klotz |
| 5,974,215 | A | 10/1999 | Bilbro et al. |
| 6,005,936 | A | 12/1999 | Shimizu et al. |
| 6,021,241 | A | 2/2000 | Bilbro et al. |
| 6,023,523 | A | 2/2000 | Cohen et al. |
| 6,028,606 | A | 2/2000 | Kolb et al. |
| 6,034,690 | A | 3/2000 | Gallery et al. |
| 6,061,083 | A | 5/2000 | Aritake et al. |
| 6,061,400 | A | 5/2000 | Pearlstein et al. |
| 6,069,565 | A | 5/2000 | Stern et al. |
| 6,075,889 | A | 6/2000 | Hamilton, Jr. et al. |
| 6,084,979 | A | 7/2000 | Kanade et al. |
| 6,091,860 | A | 7/2000 | Dimitri |
| 6,097,394 | A | 8/2000 | Levoy et al. |
| 6,115,556 | A | 9/2000 | Reddington |
| 6,137,100 | A | 10/2000 | Fossum et al. |
| 6,169,285 | B1 | 1/2001 | Pertrillo et al. |
| 6,201,899 | B1 | 3/2001 | Bergen |
| 6,221,687 | B1 | 4/2001 | Abramovich |
| 6,320,979 | B1 | 11/2001 | Melen |
| 6,424,351 | B1 | 7/2002 | Bishop et al. |
| 6,448,544 | B1 | 9/2002 | Stanton et al. |
| 6,466,207 | B1 | 10/2002 | Gortler et al. |
| 6,476,805 | B1 | 11/2002 | Shum et al. |
| 6,479,827 | B1 | 11/2002 | Hamamoto et al. |
| 6,483,535 | B1 | 11/2002 | Tamburrino et al. |
| 6,529,265 | B1 | 3/2003 | Henningsen |
| 6,577,342 | B1 | 6/2003 | Webster |
| 6,587,147 | B1 | 7/2003 | Li |
| 6,597,859 | B1 | 7/2003 | Leinhardt et al. |
| 6,606,099 | B2 | 8/2003 | Yamada |
| 6,658,168 | B1 | 12/2003 | Kim |
| 6,674,430 | B1 | 1/2004 | Kaufman et al. |
| 6,687,419 | B1 | 2/2004 | Atkin |
| 6,697,062 | B1 | 2/2004 | Cabral |
| 6,768,980 | B1 | 7/2004 | Meyer et al. |
| 6,785,667 | B2 | 8/2004 | Orbanes et al. |
| 6,833,865 | B1 | 12/2004 | Fuller et al. |
| 6,842,297 | B2 | 1/2005 | Dowski, Jr. et al. |
| 6,900,841 | B1 | 5/2005 | Mihara |
| 6,924,841 | B2 | 8/2005 | Jones |
| 6,927,922 | B2 | 8/2005 | George et al. |
| 7,003,061 | B2 | 2/2006 | Wiensky |
| 7,015,954 | B1 | 3/2006 | Foote et al. |
| 7,025,515 | B2 | 4/2006 | Woods |
| 7,034,866 | B1 | 4/2006 | Colmenarez et al. |
| 7,079,698 | B2 | 7/2006 | Kobayashi |
| 7,102,666 | B2 | 9/2006 | Kanade et al. |
| 7,164,807 | B2 | 1/2007 | Morton |
| 7,206,022 | B2 | 4/2007 | Miller et al. |
| 7,239,345 | B1 | 7/2007 | Rogina |
| 7,286,295 | B1 | 10/2007 | Sweatt et al. |
| 7,304,670 | B1 | 12/2007 | Hussey et al. |
| 7,329,856 | B2 | 2/2008 | Ma et al. |
| 7,336,430 | B2 | 2/2008 | George |
| 7,417,670 | B1 | 8/2008 | Linzer et al. |
| 7,469,381 | B2 | 12/2008 | Ording |
| 7,477,304 | B2 | 1/2009 | Hu |
| 7,587,109 | B1 | 9/2009 | Reininger |
| 7,620,309 | B2 | 11/2009 | Georgiev |
| 7,623,726 | B1 | 11/2009 | Georgiev |
| 7,633,513 | B2 | 12/2009 | Kondo et al. |
| 7,683,951 | B2 | 3/2010 | Aotsuka |
| 7,687,757 | B1 | 3/2010 | Tseng et al. |
| 7,723,662 | B2 | 5/2010 | Levoy et al. |
| 7,724,952 | B2 | 5/2010 | Shum et al. |
| 7,748,022 | B1 | 6/2010 | Frazier |
| 7,847,825 | B2 | 12/2010 | Aoki et al. |
| 7,936,377 | B2 | 5/2011 | Friedhoff et al. |
| 7,936,392 | B2 | 5/2011 | Ng et al. |
| 7,941,634 | B2 | 5/2011 | Georgi |
| 7,945,653 | B2 | 5/2011 | Zuckerberg et al. |
| 7,949,252 | B1 | 5/2011 | Georgiev |
| 7,982,776 | B2 | 7/2011 | Dunki-Jacobs et al. |
| 8,013,904 | B2 | 9/2011 | Tan et al. |
| 8,085,391 | B2 | 12/2011 | Machida et al. |
| 8,106,856 | B2 | 1/2012 | Matas et al. |
| 8,115,814 | B2 | 2/2012 | Iwase et al. |
| 8,155,456 | B2 | 4/2012 | Babacan |
| 8,155,478 | B2 | 4/2012 | Vitsnudel et al. |
| 8,189,089 | B1 | 5/2012 | Georgiev et al. |
| 8,228,417 | B1 | 7/2012 | Georgiev et al. |
| 8,248,515 | B2 | 8/2012 | Ng et al. |
| 8,259,198 | B2 | 9/2012 | Cote et al. |
| 8,264,546 | B2 | 9/2012 | Witt |
| 8,279,325 | B2 | 10/2012 | Pitts et al. |
| 8,289,440 | B2 | 10/2012 | Knight et al. |
| 8,290,358 | B1 | 10/2012 | Georgiev |
| 8,310,554 | B2 | 11/2012 | Aggarwal et al. |
| 8,315,476 | B1 | 11/2012 | Georgiev et al. |
| 8,345,144 | B1 | 1/2013 | Georgiev et al. |
| 8,400,533 | B1 | 3/2013 | Szedo |
| 8,400,555 | B1 | 3/2013 | Georgiev et al. |
| 8,411,948 | B2 | 4/2013 | Rother |
| 8,427,548 | B2 | 4/2013 | Lim et al. |
| 8,442,397 | B2 | 5/2013 | Kang et al. |
| 8,446,516 | B2 | 5/2013 | Pitts et al. |
| 8,494,304 | B2 | 7/2013 | Venable et al. |
| 8,531,581 | B2 | 9/2013 | Shroff |
| 8,542,933 | B2 | 9/2013 | Venkataraman et al. |
| 8,559,705 | B2 | 10/2013 | Ng |

(56) References Cited

U.S. PATENT DOCUMENTS

| | | |
|---|---|---|
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,848,970 B2 | 9/2014 | Aller et al. |
| 8,860,856 B2 | 10/2014 | Wetsztein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,142 B2 | 12/2015 | Antao |
| 9,201,193 B1 | 12/2015 | Smith |
| 9,210,391 B1 | 12/2015 | Mills |
| 9,214,013 B2 | 12/2015 | Venkataraman et al. |
| 9,262,067 B1 | 2/2016 | Bell et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0043270 A1 | 3/2003 | Rafey |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0212725 A1 | 10/2004 | Raskar |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0141881 A1 | 6/2005 | Taira et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0008265 A1 | 1/2006 | Ito |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0250322 A1* | 11/2006 | Hall .............. G02B 27/0172 345/8 |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener et al. |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg |
| 2007/0273795 A1 | 11/2007 | Jaynes |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto |
| 2009/0041381 A1 | 2/2009 | Georgiev et al. |

(56) References Cited

U.S. PATENT DOCUMENTS

| | | |
|---|---|---|
| 2009/0041448 A1 | 2/2009 | Georgiev et al. |
| 2009/0070710 A1 | 3/2009 | Kagaya |
| 2009/0109280 A1* | 4/2009 | Gotsman ............. H04N 5/2628 348/39 |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0167909 A1 | 7/2009 | Imagawa et al. |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1* | 8/2009 | Mauchly ............... H04N 7/144 348/14.09 |
| 2009/0273843 A1 | 11/2009 | Raskar et al. |
| 2009/0290848 A1 | 11/2009 | Brown |
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0303288 A1 | 12/2010 | Malone |
| 2010/0328485 A1 | 12/2010 | Imamura et al. |
| 2011/0001858 A1 | 1/2011 | Shintani |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1* | 2/2011 | Raveendran ........ H04N 21/816 348/51 |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0091192 A1 | 4/2011 | Iwane |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0249341 A1 | 10/2011 | DiFrancesco et al. |
| 2011/0261164 A1 | 10/2011 | Olesen et al. |
| 2011/0261205 A1 | 10/2011 | Sun |
| 2011/0267263 A1 | 11/2011 | Hinckley |
| 2011/0267348 A1 | 11/2011 | Lin |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler |
| 2011/0293179 A1 | 12/2011 | Dikmen |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0056982 A1 | 3/2012 | Katz et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0120240 A1 | 5/2012 | Muramatsu et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2012/0321172 A1 | 12/2012 | Jachalsky et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0121577 A1 | 5/2013 | Wang |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0129213 A1 | 5/2013 | Shectman |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1* | 9/2013 | Park ..................... H04N 21/80 386/230 |
| 2013/0258451 A1 | 10/2013 | El-Ghoroury et al. |
| 2013/0262511 A1 | 10/2013 | Kuffner et al. |

(56) References Cited

U.S. PATENT DOCUMENTS

| | | |
|---|---|---|
| 2013/0286236 A1 | 10/2013 | Mankowski |
| 2013/0321574 A1 | 12/2013 | Zhang et al. |
| 2013/0321581 A1 | 12/2013 | Ei-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168484 A1 | 6/2014 | Suzuki |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0042767 A1 | 2/2015 | Ciurea et al. |
| 2015/0049915 A1 | 2/2015 | Ciurea et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0130986 A1 | 5/2015 | Ohnishi |
| 2015/0161798 A1 | 6/2015 | Venkataraman et al. |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0223731 A1 | 8/2015 | Sahin |
| 2015/0237273 A1 | 8/2015 | Sawadaishi |
| 2015/0264337 A1 | 9/2015 | Venkataraman et al. |
| 2015/0104101 A1 | 10/2015 | Bryant et al. |
| 2015/0288867 A1 | 10/2015 | Kajimura |
| 2015/0304544 A1 | 10/2015 | Eguchi |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1 | 12/2015 | Osborne |
| 2016/0029017 A1 | 1/2016 | Liang |
| 2016/0065931 A1* | 3/2016 | Konieczny ........... H04N 13/111 348/42 |
| 2016/0065947 A1 | 3/2016 | Cole et al. |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0182893 A1 | 6/2016 | Wan |
| 2016/0191823 A1 | 6/2016 | Ei-Ghoroury |
| 2016/0247324 A1 | 8/2016 | Mullins et al. |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0337635 A1 | 11/2016 | Nisenzon |
| 2016/0353006 A1 | 12/2016 | Anderson |
| 2016/0353026 A1 | 12/2016 | Blonde et al. |
| 2016/0381348 A1 | 12/2016 | Hayasaka |
| 2017/0031146 A1 | 2/2017 | Zheng |
| 2017/0059305 A1 | 3/2017 | Nonn et al. |
| 2017/0067832 A1 | 3/2017 | Ferrara, Jr. et al. |
| 2017/0078578 A1 | 3/2017 | Sato |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts |
| 2017/0243373 A1 | 8/2017 | Bevensee et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0316602 A1 | 11/2017 | Smirnov et al. |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0007253 A1 | 1/2018 | Abe |
| 2018/0012397 A1 | 1/2018 | Carothers |
| 2018/0024753 A1 | 1/2018 | Gewickey et al. |
| 2018/0033209 A1 | 2/2018 | Akeley et al. |
| 2018/0139436 A1 | 2/2018 | Yucer et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0124371 A1 | 5/2018 | Kamal et al. |
| 2018/0158198 A1 | 6/2018 | Karnad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006030486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Nokia, "City Lens", May 2012.

Ogden, J., "Pyramid-Based Computer Graphics", 1985.

Okano et al., "Three-dimensional video system based on integral photography" Optical Engineering, Jun. 1999. vol. 38, No. 6, pp. 1072-1077.

Orzan, Alexandrina, et al., "Diffusion Curves: A Vector Representation for Smooth-Shaded Images," ACM Transactions on Graphics—Proceedings of SIGGRAPH 2008; vol. 27; 2008.

Pain, B., "Back-Side Illumination Technology for SOI-CMOS Image Sensors", 2009.

Perez, Patrick et al., "Poisson Image Editing," ACM Transactions on Graphics—Proceedings of ACM SIGGRAPH 2003; vol. 22, Issue 3; Jul. 2003; pp. 313-318.

Petschnigg, George, et al., "Digial Photography with Flash and No-Flash Image Pairs", SIGGRAPH 2004.

(56) References Cited

OTHER PUBLICATIONS

Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2, 1998.
Shreiner, OpenGL Programming Guide, 7th edition, Chapter 8, 2010.
SimpleViewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method", 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
TechCrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate, 2016.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Wikipedia—Data overlay techniques for real-time visual feed. For example, heads-up displays: http://en.wikipedia.org/wiki/Head-up_display. Retrieved Jan. 2013.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54, 1996.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.

(56) References Cited

OTHER PUBLICATIONS

Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , 4, Mar. 1908, pp. 821-825.
Lumsdaine et al., "Full Resolution Lightfield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R. et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Plafform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
Meng, J. et al., "An Approach on Hardware Design for Computational Photography Applications Based on Light Field Refocusing Algorithm," Nov. 18, 2007, 12 pages.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".

(56) References Cited

OTHER PUBLICATIONS

U.S. Appl. No. 15/590,841, filed May 9, 2017 listing Kurt Akeley et al. as inventors, entitiled "Vantage Generation and Interactive Playback".
U.S. Appl. No. 15/590,951, filed May 9, 2017 listing Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/874,723, filed Jan. 18, 2018 listing Mark Weir et al. as inventors, entitled "Multi-Camera Navigation Interface".
U.S. Appl. No. 15/897,994, filed Feb. 15, 2018 listing Trevor Carothers et al. as inventors, entitled "Generation of Virtual Reality With 6 Degrees of Freesom From Limited Viewer Data".
U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50, 1991.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.

\* cited by examiner

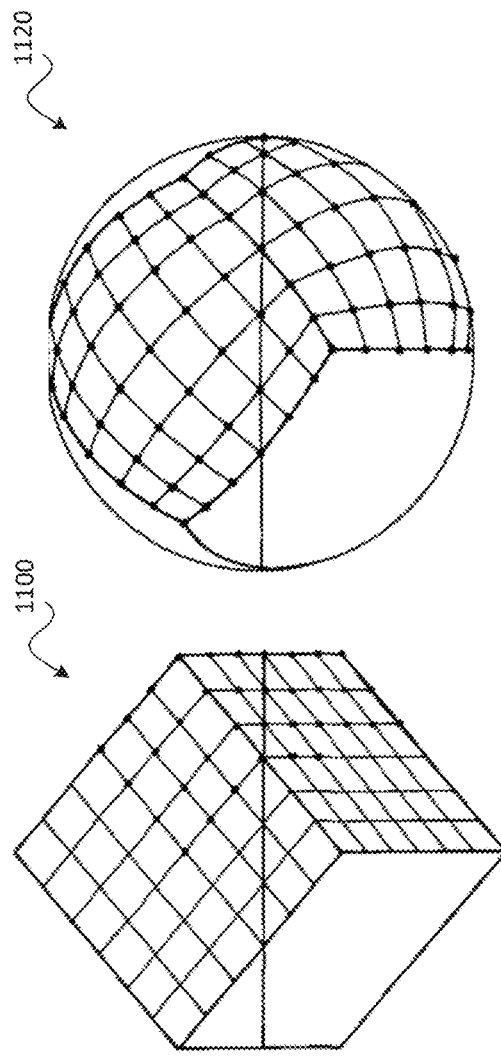
FIG. 11A
FIG. 11B
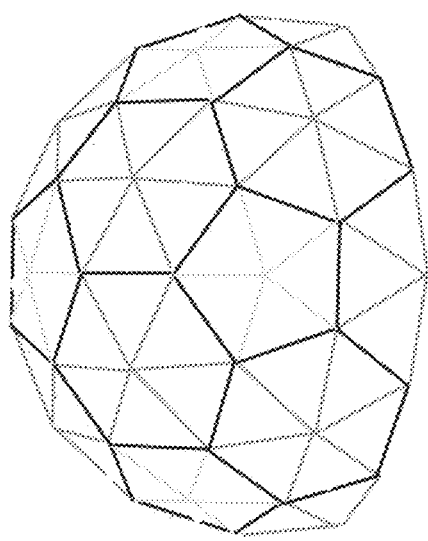
FIG. 11C

Top view

Time B

Time A

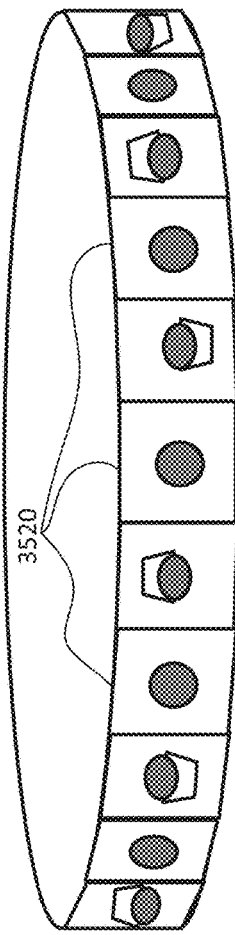
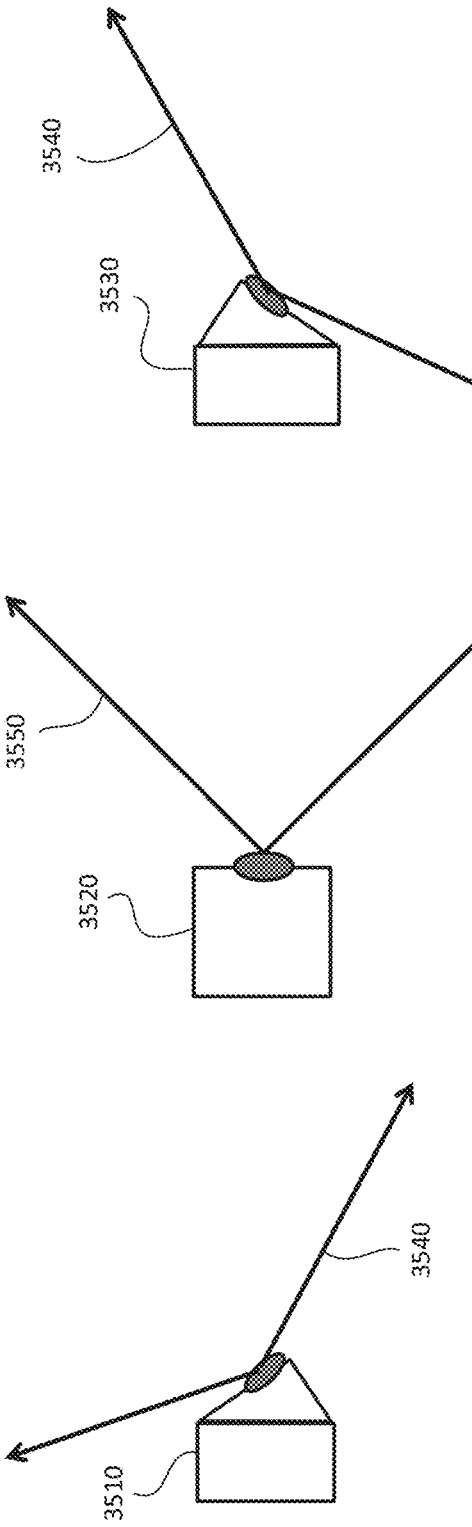
FIG. 35A
FIG. 35B
FIG. 35C
FIG. 35D

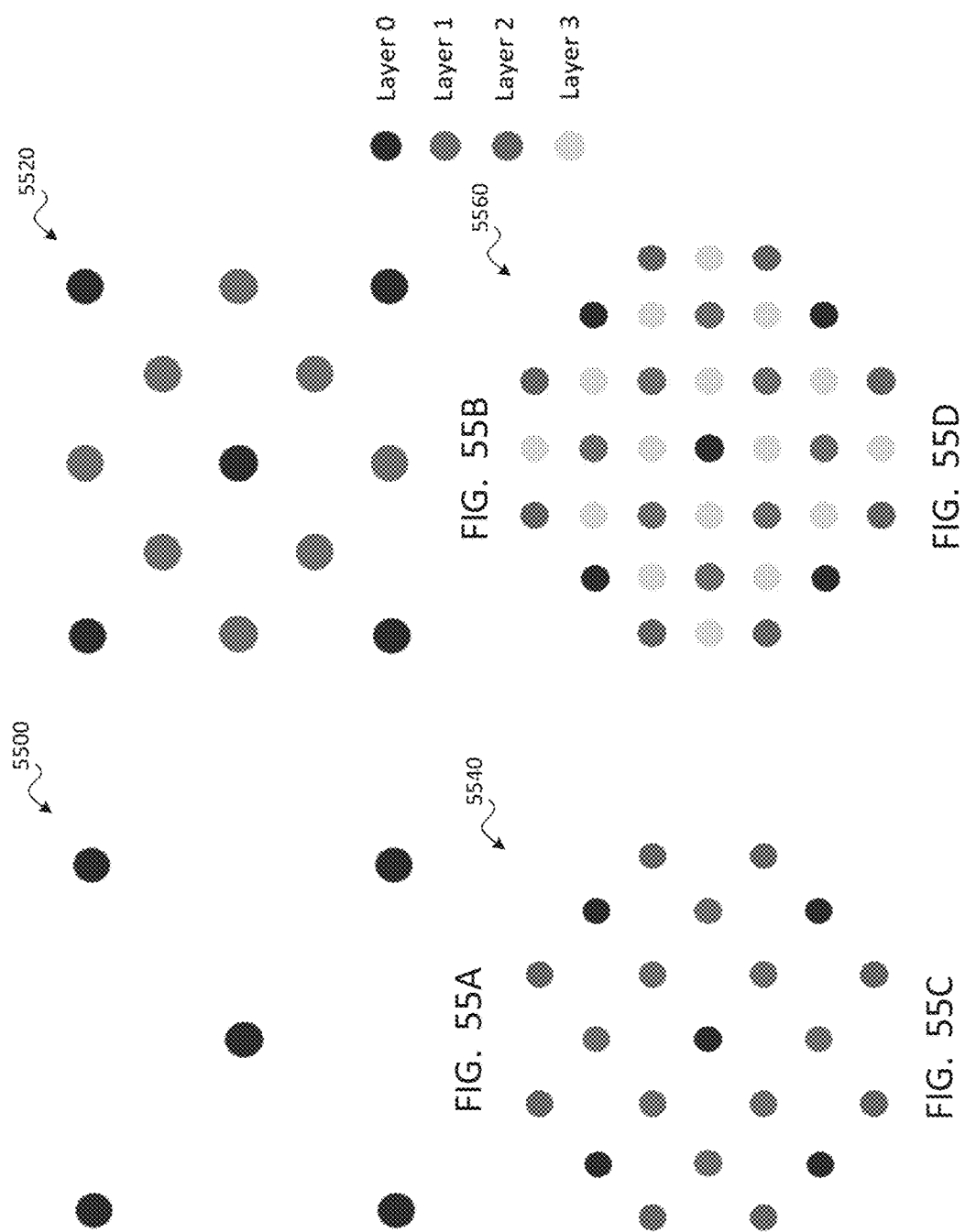

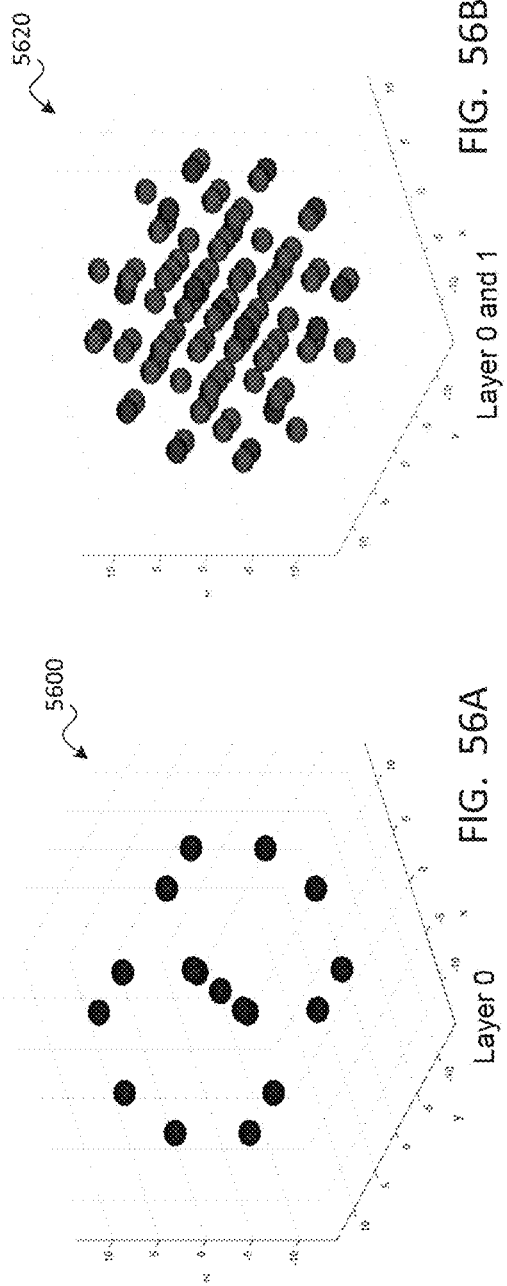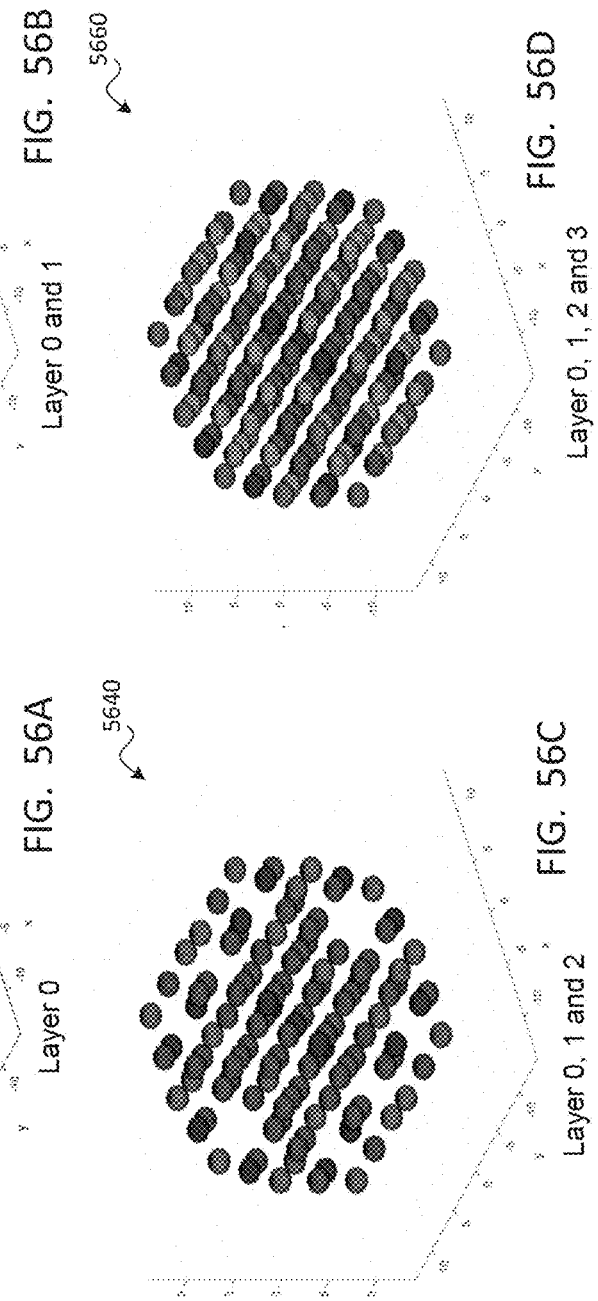

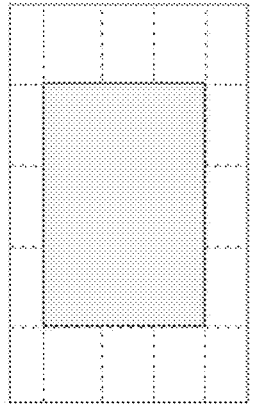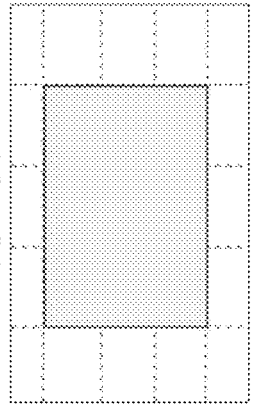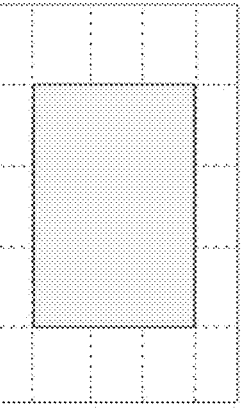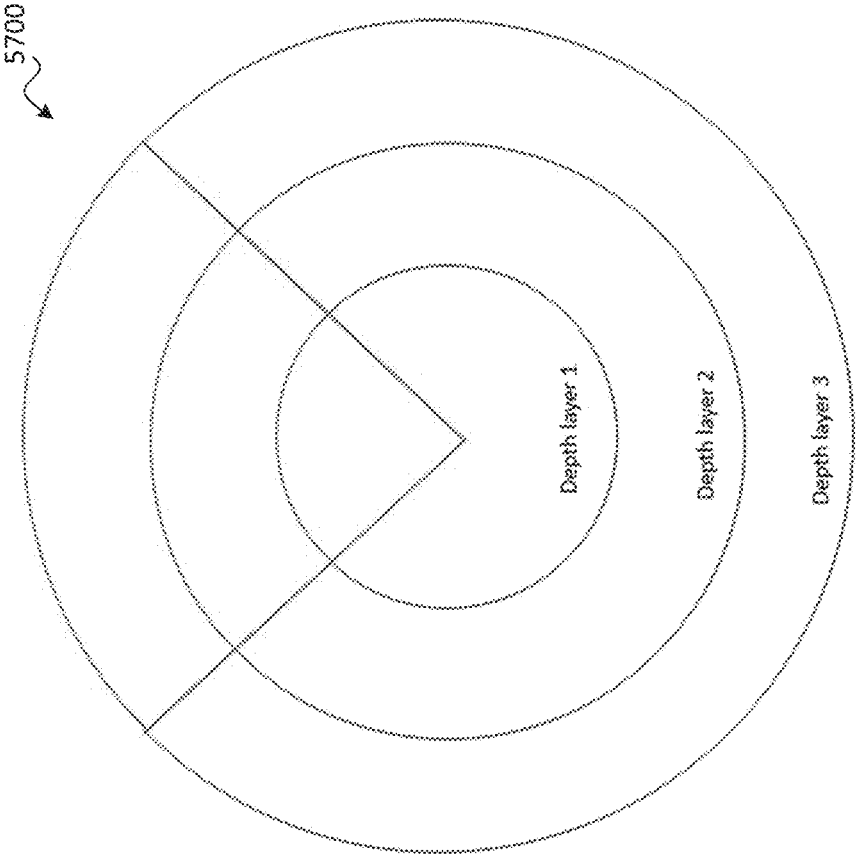
FIG. 57B
FIG. 57C
FIG. 57D
FIG. 57A ic # SPATIAL RANDOM ACCESS ENABLED VIDEO SYSTEM WITH A THREE-DIMENSIONAL VIEWING VOLUME

CROSS-REFERENCE TO RELATED APPLICATIONS

The present application is a continuation-in-part of U.S. application Ser. No. 15/084,326 for "Capturing Light-Field Volume Image and Video Data Using Tiled Light-Field Cameras", filed Mar. 29, 2016, the disclosure of which is incorporated herein by reference in its entirety.

U.S. patent application Ser. No. 15/084,326 claims the benefit of U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

U.S. patent application Ser. No. 15/084,326 also claims the benefit of U.S. Provisional Application Ser. No. 62/148,460 for "Capturing Light Field Volume Image and Video Data Using Tiled Light Field Cameras", filed Apr. 16, 2015, the disclosure of which is incorporated herein by reference in its entirety.

The present application is also related to U.S. patent application Ser. No. 14/302,826 for "Depth Determination for Light Field Images", filed Jun. 12, 2014 and issued as U.S. Pat. No. 8,988,317 on Mar. 24, 2015, the disclosure of which is incorporated herein by reference.

The present application is also related to U.S. application Ser. No. 15/590,808 for "Adaptive Control for Immersive Experience Delivery,", filed on the same date as the present application, the disclosure of which is incorporated herein by reference.

The present application is also related to U.S. application Ser. No. 15/590,841 for "Vantage Generation and Interactive Playback,", filed on the same date as the present application, the disclosure of which is incorporated herein by reference.

The present application is also related to U.S. application Ser. No. 15/590,951 for "Wedge-Based Light-Field Video Capture," filed on May 9, 2017, the disclosure of which is incorporated herein by reference.

TECHNICAL FIELD

The present document relates to the display of video from user-selected viewpoints for use in virtual reality, augmented reality, free-viewpoint video, omnidirectional video, and/or the like.

BACKGROUND

Display of a volume of captured video or positional tracking video may enable a viewer to perceive a captured scene from any location and at any viewing angle within a viewing volume. Using the data provided by such a video system, a viewpoint can be reconstructed to provide full motion parallax and/or correct view-dependent lighting. When viewing this video with a virtual reality head-mounted display, the user may enjoy an immersive virtual presence within an environment. Such a virtual reality experience may provide six degrees of freedom and uncompromised stereoscopic perception at any interpupillary distance.

One key challenge to video with a three-dimensional viewing volume is its immense data volume, which may be more than 100 times larger than that of conventional two-dimensional video. The amount of data needed may grow exponentially as the viewing volume increases. The large data requirement may become prohibitive for viewers to store the content in consumer-grade devices or for distributors to transmit the content over a network. Meeting memory, bandwidth, and/or processing requirements may also be challenges for low-latency and high-fidelity playback in today's computer. To address these challenges, an efficient compression and playback scheme is needed.

SUMMARY

At any given time, a viewer of a virtual reality or augmented reality experience is only able to observe a field-of-view (FoV) inside the viewing volume. A practical system may only fetch and render the needed FoV from the video volume data. To address the challenges of data and complexity, a spatial random access coding and viewing scheme may be used to allow arbitrary access to a viewer's desired FoV on a compressed volumetric video stream. Inter-vantage and inter spatial-layer predictions may also be used to help improve the system's coding efficiency.

Many existing image-based compression techniques require the use of high-complexity decoding methods to process all the data required for real-time virtual reality and/or augmented reality video playback. A new scheme may advantageously reduce decoding complexity without unduly compromising encoding efficiency and random access latency. According to some embodiments, a spatial random access-enabled video system, or "system," may enable arbitrary viewing at any locations inside a volumetric video without the transmission and decoding of the entire three-dimensional viewing volume data set. The system may divide the viewing volume into a three-dimensional sampling grid. Each point of the grid may contain a vantage, which is a projected view of the scene. A vantage may be omnidirectional, with 360° latitude and 180° longitude projected on a sphere. Alternatively, a vantage may only contain a subset of this information, such as a latitude less than 360° and/or a longitude less than 180°. When a user is accessing a specific viewpoint at a given location inside the viewing volume, the system may fetch the corresponding region of the vantages to render the user's field-of-view (FoV). Each vantage may contain color and/or depth information for the scene. This information may be compressed by image-based and/or video-based algorithms. The system may only prepare and compress the entire video data set once. This compression step may be done offline or live. In a streaming scenario, the system may be scalable to a large number of users without the need for on-demand encoding for each viewer's FoV.

To meet variations in the complexity, display and/or bandwidth characteristics of client devices and/or network connections, different spatial-resolution layers may be used to represent vantages. Lower spatial layers can also be used to conceal spatial random access latency or network errors when a viewer suddenly switches to a different FoV. Such layers also offer flexibility to support perceptual rendering techniques that make use of multi-spatial resolution layers.

To further reduce bandwidth and/or storage requirements, inter-vantage prediction may be used to utilize the geometric information of the scene and exploit redundancies between the vantages. When using multiple spatial-resolution layers, inter-spatial layer prediction can be employed to lower storage requirements and/or provide error resilience.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIGS. 11A through 11C are diagrams showing various patterns for joining camera lenses to create a continuous surface on a volume of space, according to various embodiments.

FIGS. 35A through 35D are perspective and side elevation views depicting a tiled array of conventional cameras, according to one embodiment.

FIGS. 55A, 55B, 55C, and 55D are a series of views depicting the operation of the hierarchical coding scheme of FIG. 54 in two dimensions, according to one embodiment.

FIGS. 56A, 56B, 56C, and 56D are a series of views depicting the operation of the hierarchical coding scheme of FIG. 54 in three dimensions, according to another embodiment.

FIGS. 57A, 57B, 57C, and 57D are a series of graphs depicting the projection of depth layers onto planar image from a spherical viewing range from a vantage, according to one embodiment.

DETAILED DESCRIPTION

Figure 1:
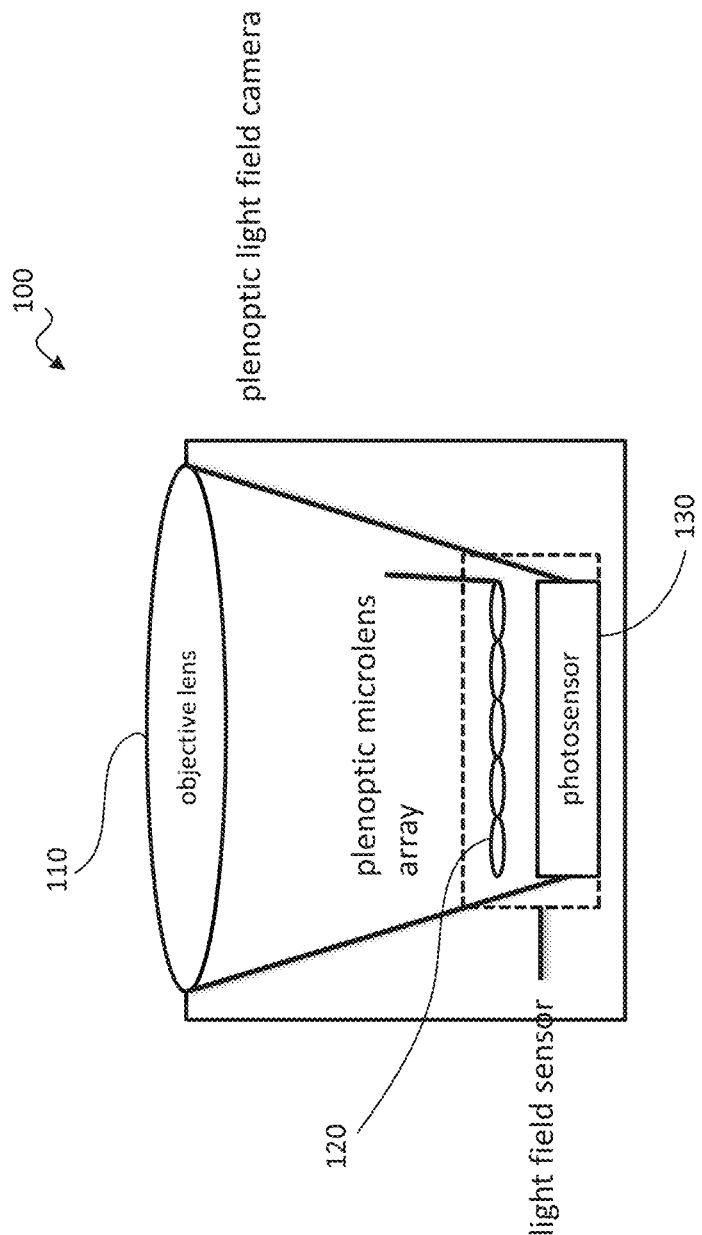
FIG. 1 is a diagram of a plenoptic light-field camera, according to one embodiment.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom.

Definitions

For purposes of the description provided herein, the following definitions are used:

Active area: the portion of a module that receives light to be provided as image data by the module.

Array light-field camera: a type of light-field camera that contains an array of objective lenses with overlapping fields-of-view and one or more photosensors, with the viewpoint from each objective lens captured as a separate image.

Capture surface, or "physical capture surface": a surface defined by a tiled array of light-field cameras, at which light is received from an environment into the light-field cameras, with exemplary capture surfaces having cylindrical, spherical, cubic, and/or other shapes.

Capture system: a tiled array of light-field cameras used to fully or sparsely capture a light-field volume.

Client computing device: a computing device that works in conjunction with a server such that data is exchanged between the client computing device and the server.

Computing device: any device having a processor.

Conventional image: an image in which the pixel values are not, collectively or individually, indicative of the angle of incidence at which light is received on the surface of the sensor.

Data store: a repository of data, which may be at a single location or distributed over multiple locations, and may be provided through the use of any volatile or nonvolatile data storage technologies.

Depth: a representation of distance between an object and/or corresponding image sample and the entrance pupil of the optics of the capture system.

Disk: a region in a light-field image that is illuminated by light passing through a single microlens; may be circular or any other suitable shape.

Disk image: a single image of the aperture stop, viewed through a plenoptic microlens, and captured by a region on the sensor surface.

Display device: a device such as a video screen that can display images and/or video for a viewer.

Entrance pupil: the optical image of the physical aperture stop, as "seen" through the front of the lens system, with a geometric size, location, and angular acceptance acting as the camera's window of view into an environment.

Environment: a real-world scene to be captured for subsequent visualization.

Fiber optic bundle: a set of aligned optical fibers capable of transmitting light.

Free-viewpoint video: video that changes in response to altering the viewpoint of the viewer Fully sampled light-field volume: a light-field volume that has been captured in a manner inclusive of ray data from all directions at any location within the light-field volume, enabling the generation of virtual views from any viewpoint, at any orientation, and with any field-of-view.

Image: a two-dimensional array of pixel values, or pixels, each specifying a color.

Input device: any device that receives input from a user.

Layer: a segment of data, which may be stored in conjunction with other layers pertaining to common subject matter such as the video data for a particular vantage.

Leading end: the end of a fiber optic bundle that receives light.

Light-field camera: any camera capable of capturing light-field images.

Light-field coordinate: for a single light-field camera, the four-dimensional coordinate (for example, x, y, u, v) used to index a light-field sample captured by a light-field camera, in which (x, y) may be the spatial coordinate representing the intersection point of a light ray with a microlens array, and (u, v) may be the angular coordinate representing an intersection point of the light ray with an aperture plane.

Light-field data: data indicative of the angle of incidence at which light is received on the surface of the sensor.

Light-field image: an image that contains a representation of light-field data captured at the sensor, which may be a four-dimensional sample representing information carried by ray bundles received by a single light-field camera.

Light-field volume: the combination of all light-field images that represents, either fully or sparsely, light rays entering the physical space defined by the light-field volume.

Light-field volume coordinate: for a capture system, an extended version of light-field coordinates that may be used for panoramic and/or omnidirectional viewing (for example, rho1, theta1, rho2, theta2), in which (rho1, theta1) represent intersection of a light ray with an inner sphere and (rho2, theta2) represent intersection of the light ray with an outer sphere concentric with the inner sphere.

Main lens, or "objective lens": a lens or set of lenses that directs light from a scene toward an image sensor.

Microlens: a small lens, typically one in an array of similar microlenses.

Microlens array: an array of microlenses arranged in a predetermined pattern.

Omnidirectional stereo video: video in which the user selects a fixed viewpoint from within a viewing volume.

Packaging: The housing, electronics, and any other components of an image sensor that reside outside the active area.

Plenoptic light-field camera: a type of light-field camera that employs a microlens-based approach in which a plenoptic microlens array is positioned between the objective lens and the photosensor.

Plenoptic microlens array: a microlens array in a plenoptic camera that is used to capture directional information for incoming light rays, with each microlens creating an image of the aperture stop of the objective lens on the surface of the image sensor.

Processor: any processing device capable of processing digital data, which may be a microprocessor, ASIC, FPGA, or other type of processing device.

Ray bundle, "ray," or "bundle": a set of light rays recorded in aggregate by a single pixel in a photosensor.

Ring array: a tiled array of light-field cameras in which the light-field cameras are generally radially symmetrically arranged about an axis to define a cylindrical capture surface of light-field cameras facing outward.

Scene: some or all of an environment that is to be viewed by a viewer.

Sectoral portion: a portion of an arcuate or semispherical shape; or in the case of a cylindrical or spherical mapping of video data from a vantage or viewpoint, a portion of the mapping of video data corresponding to a Field-of-View smaller than the mapping.

Sensor, "photosensor," or "image sensor": a light detector in a camera capable of generating images based on light received by the sensor.

Spherical array: a tiled array of light-field cameras in which the light-field cameras are generally arranged in a spherical pattern to define a spherical capture surface of light-field cameras facing outward.

Stereo virtual reality: an extended form of virtual reality in which each eye is shown a different view of the virtual world, enabling stereoscopic three-dimensional perception.

Subset: one or more, but not all, of a group of items.

Subview: the view or image from an individual view in a light-field camera (a subaperture image in a plenoptic light-field camera, or an image created by a single objective lens in an objective lens array in an array light-field camera).

Tapered fiber optic bundle, or "taper": a fiber optic bundle that is larger at one end than at the other.

Tiled array: an arrangement of light-field cameras in which the light-field cameras are compactly and/or loosely, evenly and/or unevenly distributed about an axis and oriented generally outward to capture an environment surrounding the tiled array, with exemplary tiled arrays including ring-shaped arrays, spherical arrays, cubic arrays, and the like.

Vantage: a pre-determined point within a viewing volume, having associated video data that can be used to generate a view from a viewpoint at the vantage.

Trailing end: the end of a fiber optic bundle that emits light.

Video data: data derived from image or video capture, associated with a particular vantage or viewpoint View direction: a direction along which a scene is to be viewed from a viewpoint; can be conceptualized as a vector extending along the center of a Field-of-View from the viewpoint.

Viewpoint: a point from which an environment is to be viewed.

Viewpoint video data: video data associated with a particular viewpoint that can be used to generate a view from that viewpoint.

Virtual reality: an immersive viewing experience in which images presented to the viewer are based on the location and/or orientation of the viewer's head and/or eyes.

Virtual view: a reconstructed view, typically for display in a virtual reality or augmented reality headset, which may be generated by resampling and/or interpolating data from a captured light-field volume.

Virtual viewpoint: the location, within a coordinate system and/or light-field volume, from which a virtual view is generated.

Volumetric video: image or video captured in a manner that permits the video to be viewed from multiple viewpoints Volumetric video data: data derived from image or video capture, which can be used to construct a view from multiple viewpoints within a viewing volume.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Problem Description

Figure 27:
FIG. 27 is an image of an example of a virtual reality headset, the Oculus Rift (Development Kit version).

Virtual reality is intended to be a fully immersive experience for users, often having the goal of creating an experience that is as close as possible to "being there." Users typically use headsets with immersive, wide-angle stereo viewing, multidirectional sound, and onboard sensors that can measure orientation, accelerations, and/or position. As an example, FIG. 27 shows an image of the Oculus Rift Development Kit headset as an example of a virtual reality headset 2700. Viewers using virtual reality and/or augmented reality headsets may move their heads to point in any direction, move forward and backward, and may move their heads side to side. The point of view from which the user views his or her surroundings may change to match the motion of his or her head.

FIG. 27 depicts some exemplary components of the virtual reality headset 2700. Specifically, the virtual reality headset 2700 may have a processor 2710, memory 2720, a data store 2730, user input 2740, and a display screen 2750. Each of these components may be any device known in the computing and virtual reality arts for processing data, storing data for short-term or long-term use, receiving user input, and displaying a view, respectively. In some embodiments, the user input 2740 may include one or more sensors that detect the position and/or orientation of the virtual reality headset 2700. By maneuvering his or her head, a user (i.e., a "viewer") may select the viewpoint and/or view direction from which he or she is to view an environment.

The virtual reality headset 2700 may also have additional components not shown in FIG. 27. Further, the virtual reality headset 2700 may be designed for standalone operation or operation in conjunction with a server that supplies video data, audio data, and/or other data to the virtual reality headset. Thus, the virtual reality headset 2700 may operate as a client computing device. As another alternative, any of the components shown in FIG. 27 may be distributed between the virtual reality headset 2700 and a nearby computing device such that the virtual reality headset 2700 and the nearby computing device, in combination, define a client computing device.

Virtual reality content may be roughly divided into two segments: synthetic content and real world content. Synthetic content may include applications like video games or computer-animated movies that are generated by the computer. Real world content may include panoramic imagery and/or live action video that is captured from real places or events.

Synthetic content may contain and/or be generated from a 3-dimensional model of the environment, which may be also used to provide views that are matched to the actions of the viewer. This may include changing the views to account for head orientation and/or position, and may even include adjusting for differing distances between the eyes.

Figure 7:
FIG. 7 is a diagram of a virtual reality capture system according to the prior art, developed by Jaunt.
Figure 8:
FIG. 8 is a diagram of a stereo virtual reality capture system according to the prior art.

Real world content is more difficult to fully capture with known systems and methods, and is fundamentally limited by the hardware setup used to capture the content. FIGS. 7 and 8 show exemplary capture systems 700 and 800, respectively. Specifically, FIG. 7 depicts a virtual reality capture system, or capture system 700, according to the prior art, developed by Jaunt. The capture system 700 consists of a number of traditional video capture cameras 710 arranged spherically. The traditional video capture cameras 710 are arranged facing outward from the surface of the sphere. FIG. 8 depicts a stereo virtual reality capture system, or capture system 800, according to the prior art. The capture system 800 consists of 8 stereo camera pairs 810, plus one vertically facing camera 820. Image and/or video data is captured from the camera pairs 810, which are arranged facing outward from a ring. In the capture system 700 and the capture system 800, the image and/or video data captured is limited to the set of viewpoints in the camera arrays.

When viewing real world content captured using these types of systems, a viewer may only be viewing the captured scene with accuracy when virtually looking out from one of the camera viewpoints that has been captured. If the viewer views from a position that is between cameras, an intermediate viewpoint must be generated in some manner. There are many approaches that may be taken in order to generate these intermediate viewpoints, but all have significant limitations.

One method of generating intermediate viewpoints is to generate two 360° spherically mapped environments—one for each eye. As the viewer turns his or her head, each eye sees a window into these environments. Image and/or video data from the cameras in the array are stitched onto the spherical surfaces. However, this approach is geometrically flawed, as the center of perspective for each eye changes as the user moves his or her head, and the spherical mapping assumes a single point of view. As a result, stitching artifacts and/or geometric distortions cannot be fully avoided. In addition, the approach can only reasonably accommodate viewers changing their viewing direction, and does not perform well when the user moves his or her head laterally, forward, or backward.

Another method to generate intermediate viewpoints is to attempt to generate a 3D model from the captured data, and interpolate between viewpoints based at least partially on the generated model. This model may be used to allow for greater freedom of movement, but is fundamentally limited by the quality of the generated three-dimensional model. Certain optical aspects, like specular reflections, partially transparent surfaces, very thin features, and occluded imagery are extremely difficult to correctly model. Further, the visual success of this type of approach is highly dependent on the amount of interpolation that is required. If the distances are very small, this type of interpolation may work acceptably well for some content. As the magnitude of the interpolation grows (for example, as the physical distance between cameras increases), any errors will become more visually obvious.

Another method of generating intermediate viewpoints involves including manual correction and/or artistry in the postproduction workflow. While manual processes may be used to create or correct many types of issues, they are time intensive and costly.

A capture system that is able to capture a continuous or nearly continuous set of viewpoints may remove or greatly reduce the interpolation required to generate arbitrary viewpoints. Thus, the viewer may have greater freedom of motion within a volume of space.

Tiled Array of Light-Field Cameras

The present document describes several arrangements and architectures that allow for capturing light-field volume data from continuous or nearly continuous viewpoints. The viewpoints may be arranged to cover a surface or a volume using tiled arrays of light-field cameras. Such systems may be referred to as "capture systems" in this document. A tiled array of light-field cameras may be joined and arranged in order to create a continuous or nearly continuous light-field capture surface. This continuous capture surface may capture a light-field volume. The tiled array may be used to create a capture surface of any suitable shape and size.

Figure 2:
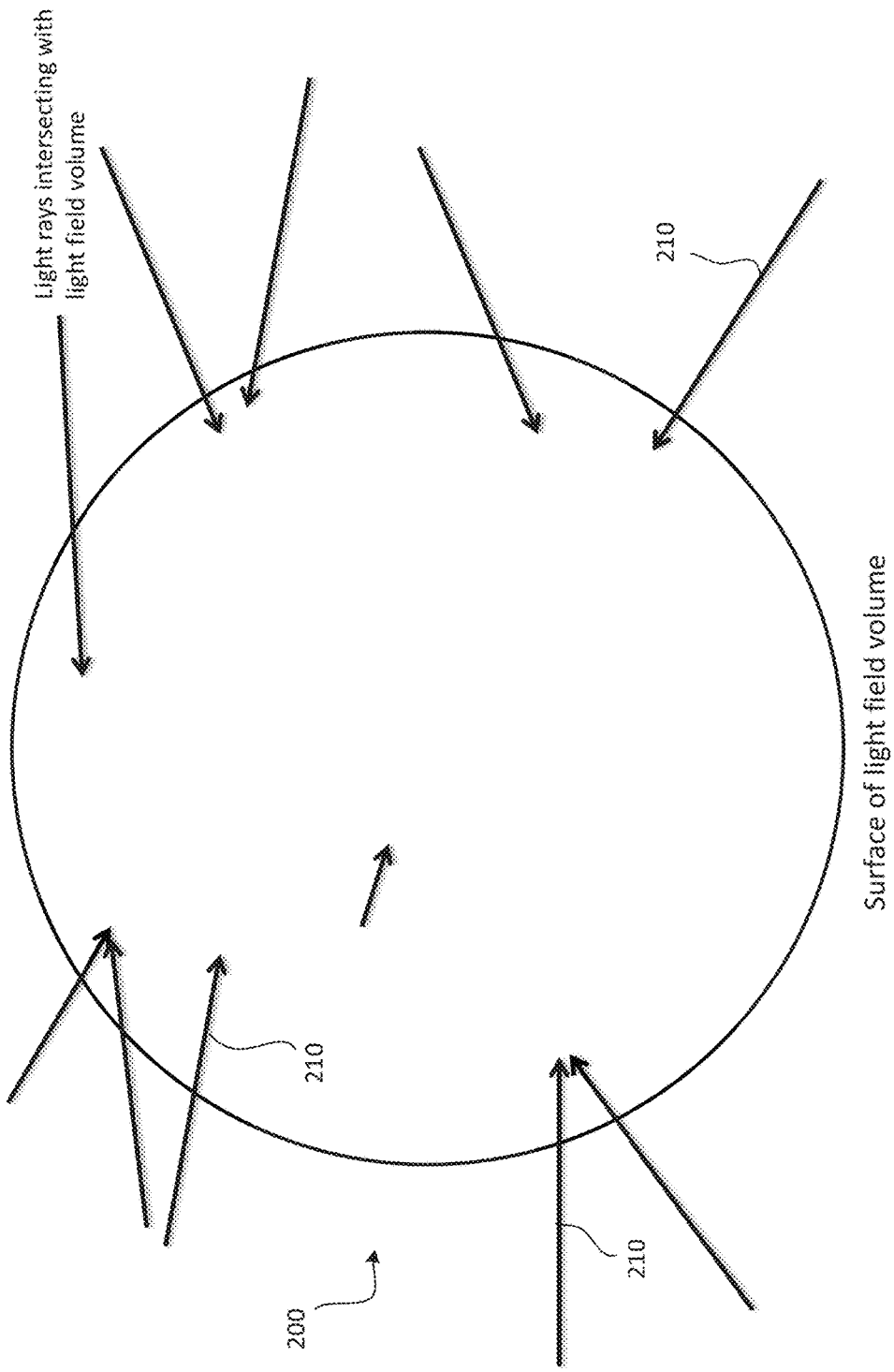
FIG. 2 is a conceptual diagram of a light-field volume, according to one embodiment.

FIG. 2 shows a conceptual diagram of a light-field volume 200, according to one embodiment. In FIG. 2, the light-field volume 200 may be considered to be a spherical volume. Rays of light 210 originating outside of the light-field volume 200 and then intersecting with the light-field volume 200 may have their color, intensity, intersection location, and direction vector recorded. In a fully sampled light-field volume, all rays and/or "ray bundles" that originate outside the light-field volume are captured and recorded. In a partially sampled light-field volume or a sparsely sampled light-field volume, a subset of the intersecting rays is recorded.

Figure 3:
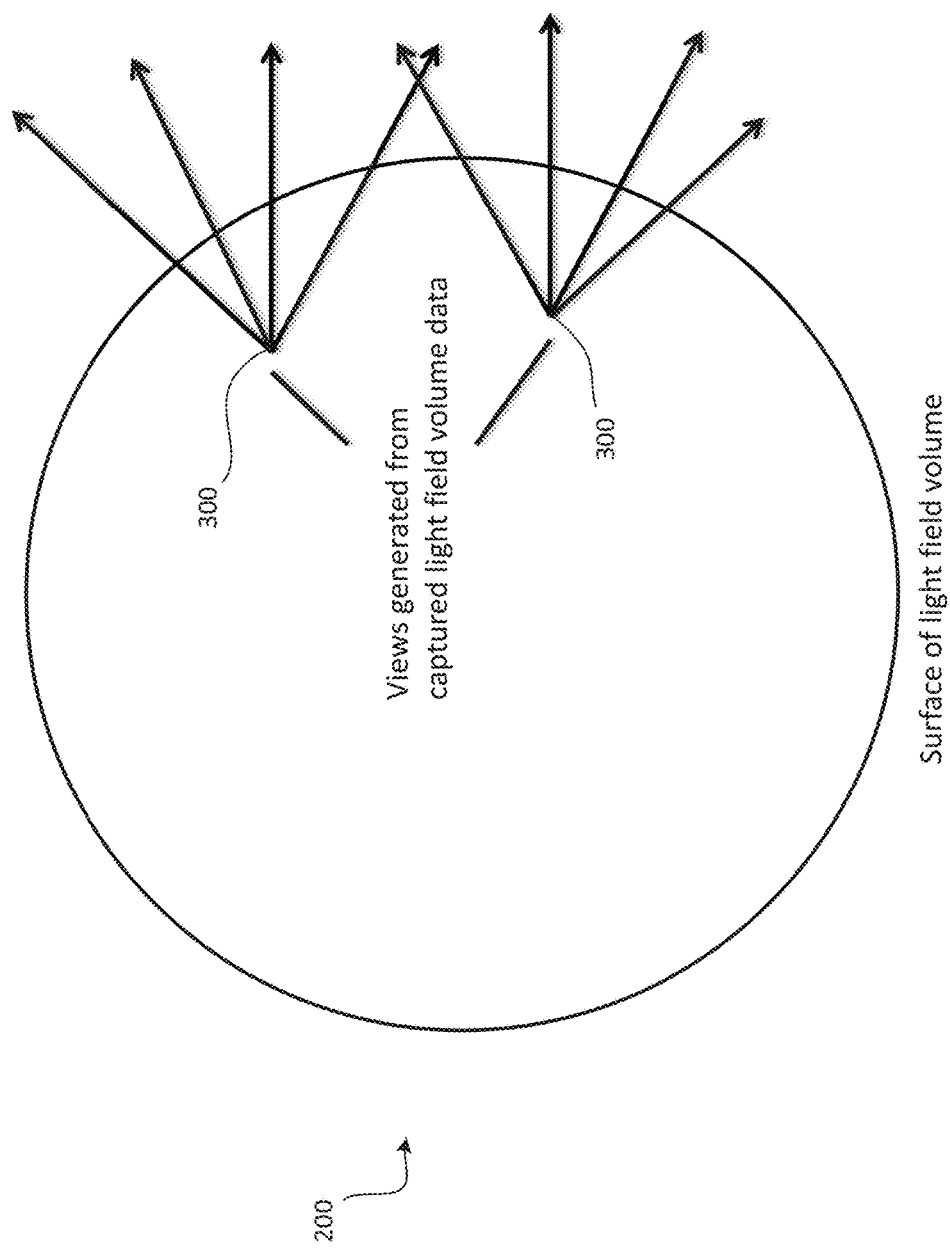
FIG. 3 is a conceptual diagram of virtual viewpoint generation from a fully sampled light-field volume.

FIG. 3 shows a conceptual diagram of virtual viewpoints, or subviews 300, that may be generated from captured light-field volume data, such as that of the light-field volume 200 of FIG. 2. The light-field volume may be a fully sampled light-field volume; hence, all rays of light entering the light-field volume 200 may have been captured. Hence, any virtual viewpoint within the light-field volume 200, facing any direction, may be generated.

In FIG. 3, two subviews 300 are generated based on two viewpoints. These subviews 300 may be presented to a viewer of a VR system that shows the subject matter captured in the light-field volume 200. One subview 300 may be generated for each of the viewer's eyes. The ability to accurately generate subviews may be limited by the sampling patterns, acceptance angles, and surface coverage of the capture system.

Figure 9:
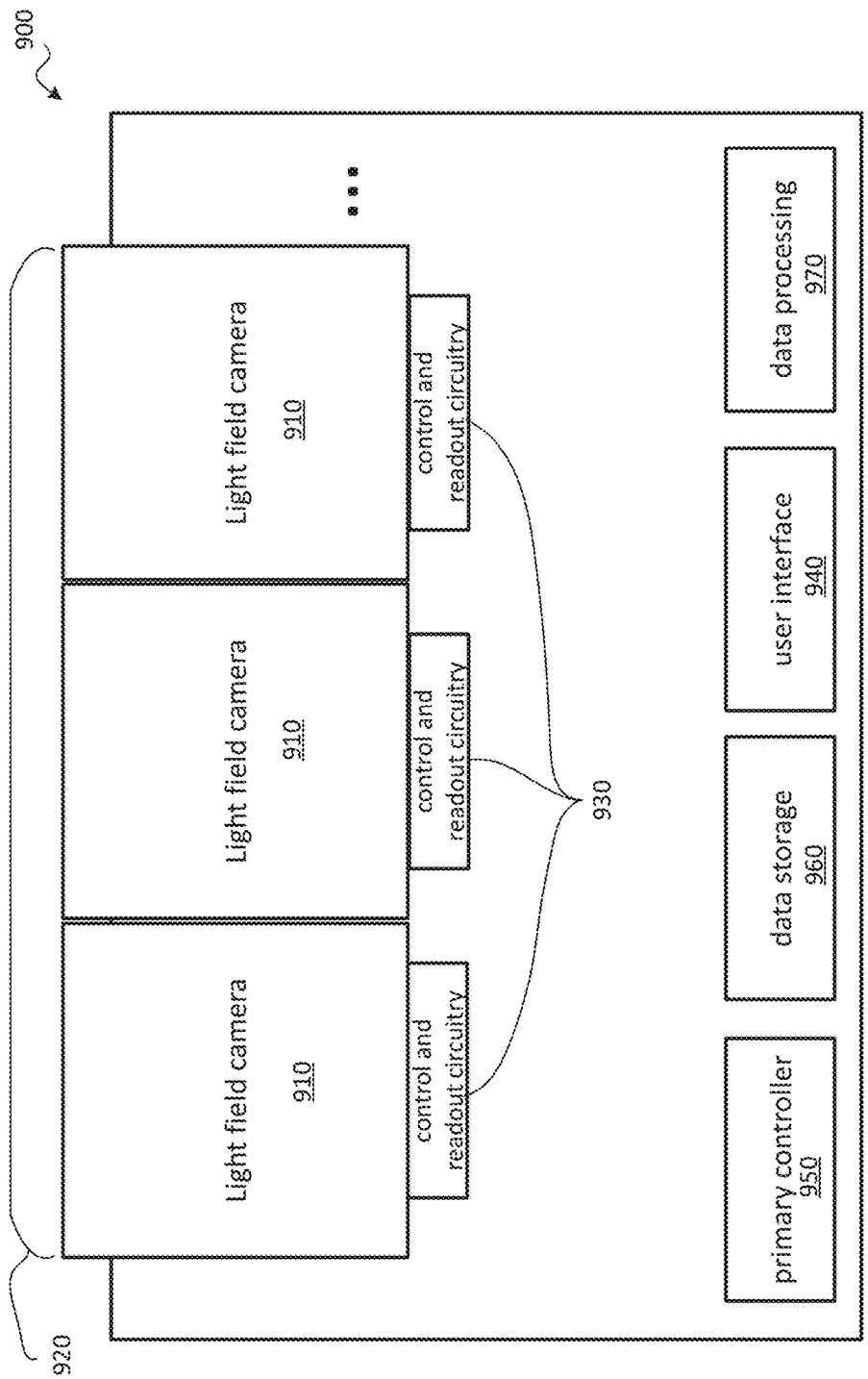
FIG. 9 is a block diagram depicting a capture system according to one embodiment.

Referring to FIG. 9, a capture system 900 is shown, according to one embodiment. The capture system 900 may contain a set of light-field cameras 910 that form a continuous or nearly continuous capture surface 920. The light-field cameras 910 may cooperate to fully or partially capture a light-field volume, such as the light-field volume 200 of FIG. 2.

For each of the light-field cameras 910, there is attached control and readout circuitry 930. This control and readout circuitry 930 may control the operation of the attached light-field camera 910, and can read captured image and/or video data from the light-field camera 910.

The capture system 900 may also have a user interface 940 for controlling the entire array. The user interface 940 may be physically attached to the remainder of the capture system 900 and/or may be remotely connected to the remainder of the capture system 900. The user interface 940 may include a graphical user interface, displays, digital controls, analog controls, and/or any other controls or feedback devices by which a user can provide input to control the operation of the capture system 900.

The capture system 900 may also have a primary controller 950 that communicates with and controls all the light-field cameras 910. The primary controller 950 may act to synchronize the light-field cameras 910 and/or control the individual light-field cameras 910 in a systematic manner.

The capture system 900 may also include data storage 960, which may include onboard and/or remote components for recording the captured video and/or image data generated by the light-field cameras 910. The data storage 960 may be physically part of the capture system 900 (for example, in hard drives, flash memory and/or RAM), removable storage (for example, arrays of SD cards and/or other removable flash storage), and/or remotely connected storage (for example, RAID storage connected wirelessly or via a wired connection).

The capture system 900 may also include data processing circuitry 970, which may process the image and/or video data as part of the capture system 900. The data processing circuitry 970 may include any type of processing circuitry, including but not limited to one or more microprocessors, ASICs, FPGA's, and/or the like. In alternative embodiments, the capture system 900 may simply collect and store raw data, which may be processed by a separate device such as a computing device with microprocessors and/or other data processing circuitry.

Figure 23:
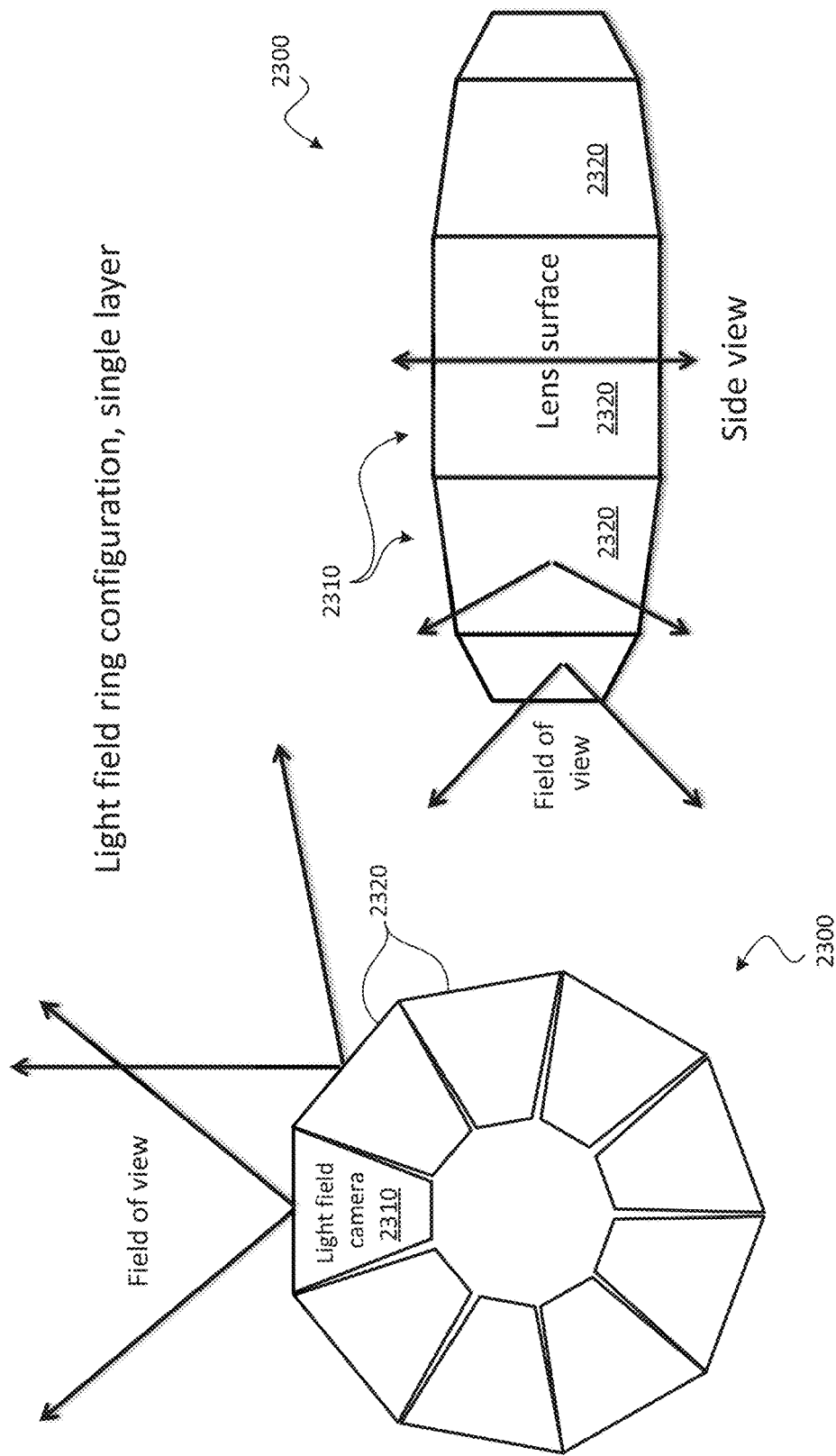
FIG. 23 is a diagram showing a tiled light-field camera array in a single layer ring configuration, according to one embodiment.

In at least one embodiment, the tiled light-field cameras 910 form an outward-facing ring. One arrangement of a tiled light-field camera array 2300 is shown in FIG. 23. In this embodiment, the tiled light-field cameras 2310 form a complete 360° ring in a single layer. Light-field cameras 2310 that neighbor each other may have overlapping fields-of-view, as shown in the top view on the left. Each of the light-field cameras 2310 may have a lens surface 2320 that is the outward-facing surface of a main lens of the light-field camera 2310. Thus, the lens surfaces 2320 may be arranged in a ring pattern.

Figure 24:
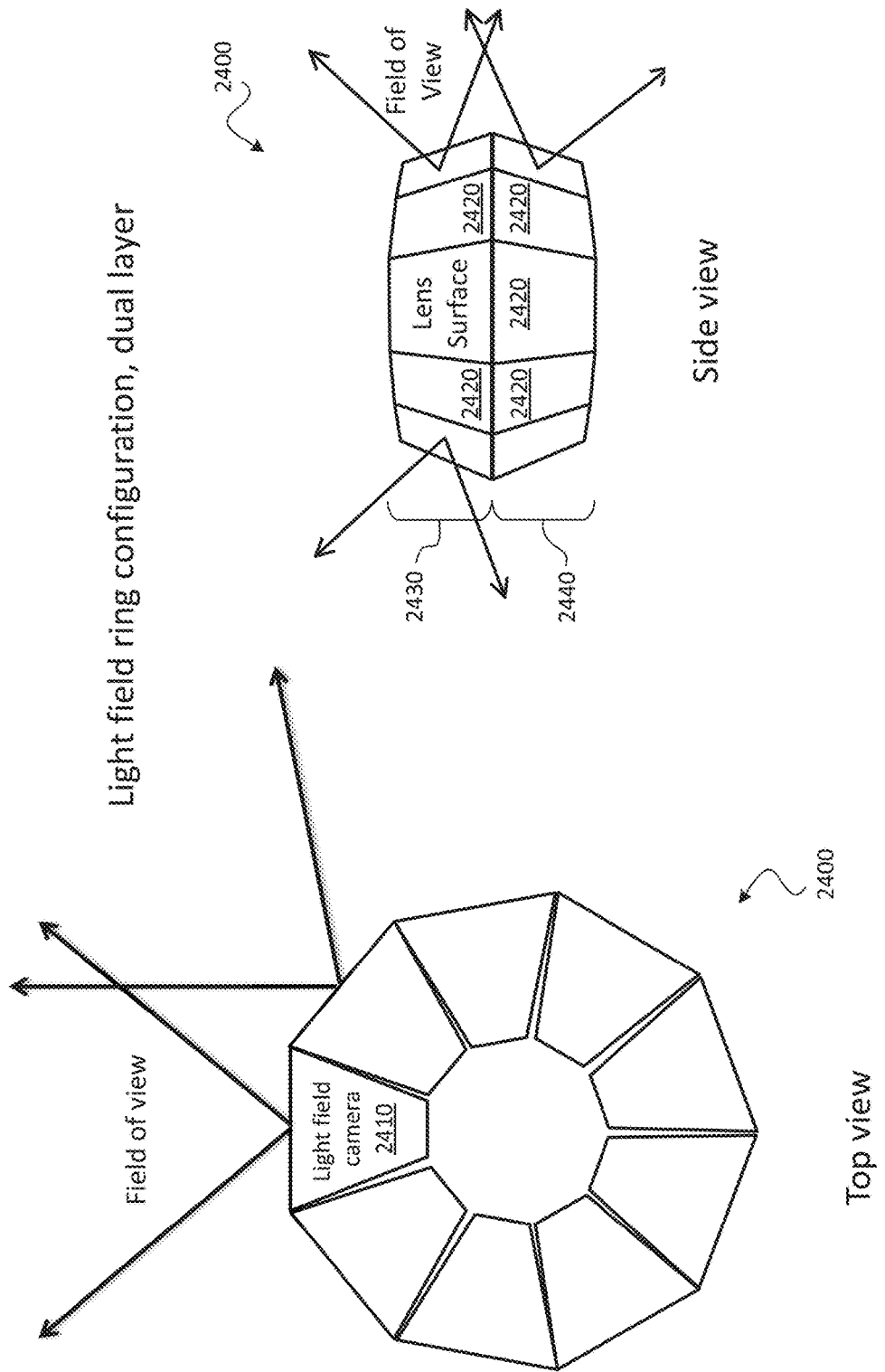
FIG. 24 is a diagram showing a tiled light-field camera array in a dual layer ring configuration, according to one embodiment.

Another arrangement of a tiled light-field camera array 2400, with 2 layers, is shown in FIG. 24. In this embodiment, light-field cameras 2410 with lens surfaces 2420 may be arranged in a top layer 2430 that captures a 360° field-of-view that faces partially "up," and in a bottom layer 2440 may capture a 360° field-of-view that faces partially "down." Light-field cameras 2410 that are adjacent to each other within the top layer 2430 or within the bottom layer 2440 may have overlapping fields-of-view, as shown in the top view on the left. Additionally or alternatively, light-field cameras 2410 of the top layer 2430 may have fields-of-view that overlap those of their adjacent counterparts in the bottom layer 2440, as shown in the side view on the right.

In FIGS. 23 and 24, nine light-field cameras 2310 or light-field cameras 2410 are shown in each layer. However, it should be understood that each layer may beneficially possess more or fewer light-field cameras 2310 or light-field cameras 2410, depending on the field-of-view applicable to each light-field camera. In addition, many other camera arrangements may be used, which may include additional numbers of layers. In some embodiments, a sufficient number of layers may be used to constitute or approach a spherical arrangement of light-field cameras.

In at least one embodiment, the tiled light-field cameras are arranged on the outward facing surface of a sphere or other volume. FIG. 11 shows possible configurations for the tiled array. Specifically, FIG. 11A shows a tiling pattern 1100 of light-field cameras that creates a cubic volume. FIG. 11B shows a tiling pattern 1120 wherein quadrilateral regions may be warped in order to approximate the surface of a sphere. FIG. 11C shows a tiling pattern 1140 based on a geodesic dome. In the tiling pattern 1140, the tile shape may alternate between pentagons and hexagons. These tiling patterns are outlined in the darker color. In all of the patterns shown, the number of tiles shown is exemplary, and the system may use any number of tiles. In addition, many other volumes and tiling patterns may be constructed.

Notably, the tiles displayed in the tiling pattern 1100, the tiling pattern 1120, and the tiling pattern 1140 represent the maximum extent of the light-field capturing surface for a single light-field camera in the tiled array. In some embodiments, the physical capture surface may closely match the tile size. In other embodiments, the physical capture surface may be substantially smaller than the tile size.

Size and Field-of-View of the Tiled Array

For many virtual reality and/or augmented reality viewing experiences, "human natural" viewing parameters are desired. In this context, "human natural" viewing parameters refer specifically to providing approximately human fields-of-view and inter-ocular distances (spacing between the eyes). Further, it is desirable that accurate image and/or video data can be generated for any viewpoint as the viewer moves his or her head.

Figure 4:
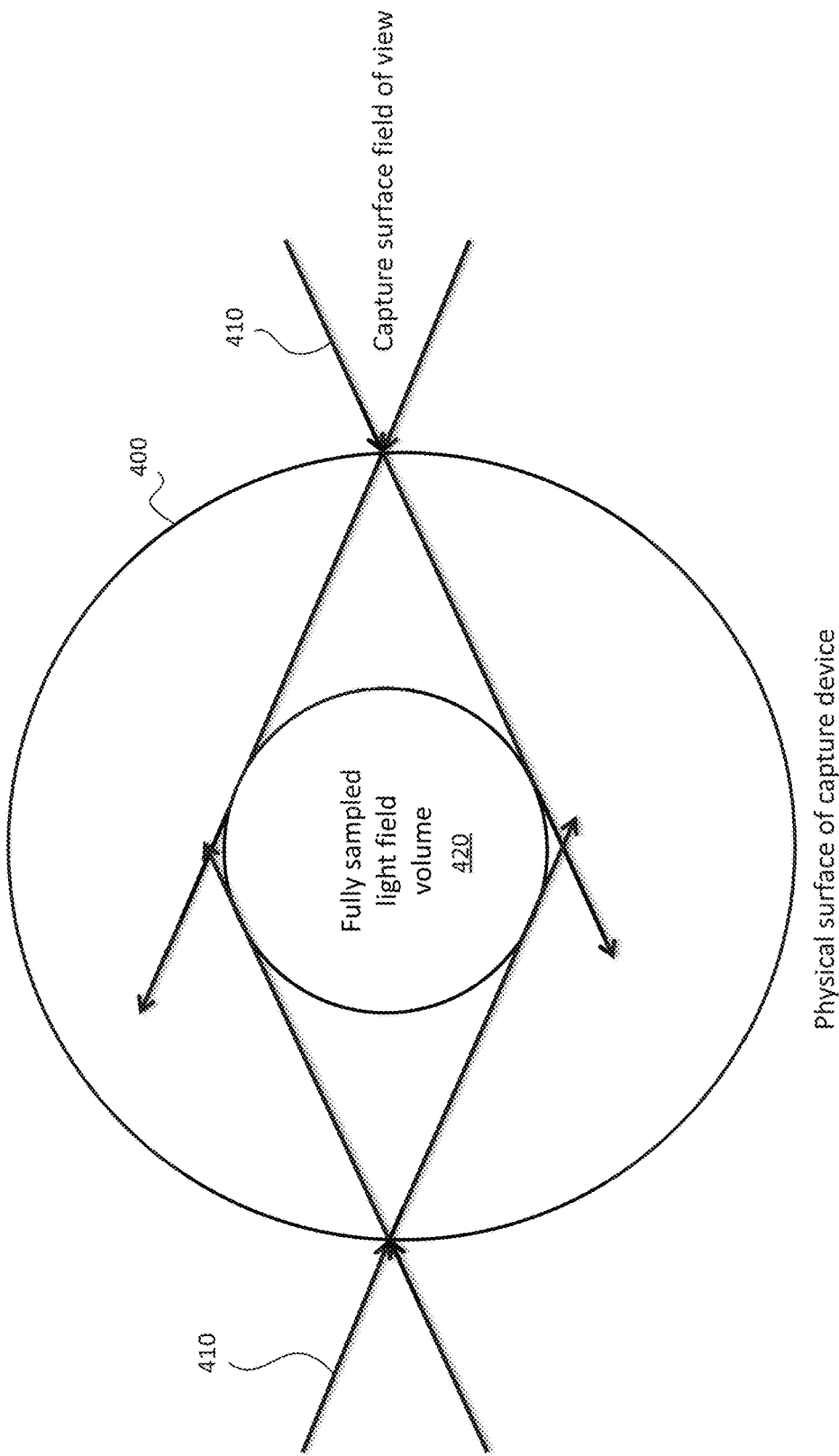
FIG. 4 is a conceptual diagram comparing the sizes of a physical capture device, capturing all incoming rays within a limited field-of-view, and the virtual size of the fully sampled light-field volume, according to one embodiment.

The physical size of the capture surface of the tiled array may be determined by the output requirements and fields-of-view of the objective lenses in the capture system. FIG. 4 conceptually shows the relationship between a physical capture surface, or capture surface 400, with an acceptance or capture surface field-of-view 410 and a virtual fully sampled light-field volume 420. A fully sampled light-field volume is a volume where all incoming rays from all directions have been captured. Within this volume (for example, the sampled light-field volume 420), any virtual viewpoint may be generated, looking any direction, with any field-of-view.

In one embodiment, the tiled array is of sufficient size and captures a sufficient field-of-view to enable generation of viewpoints that allow VR viewers to freely move their heads within a normal range of neck motion. This motion may include tilting, rotating, and/or translational motion of the head. As an example, the desired radius of such a volume may be 100 mm.

In addition, the field-of-view of the capture surface may be determined by other desired optical properties of the capture system (discussed later). As an example, the capture surface may be tiled with lenses arranged in a double Gauss or other known lens arrangement. Each lens may have an approximately 20° field-of-view half angle.

Figure 34:
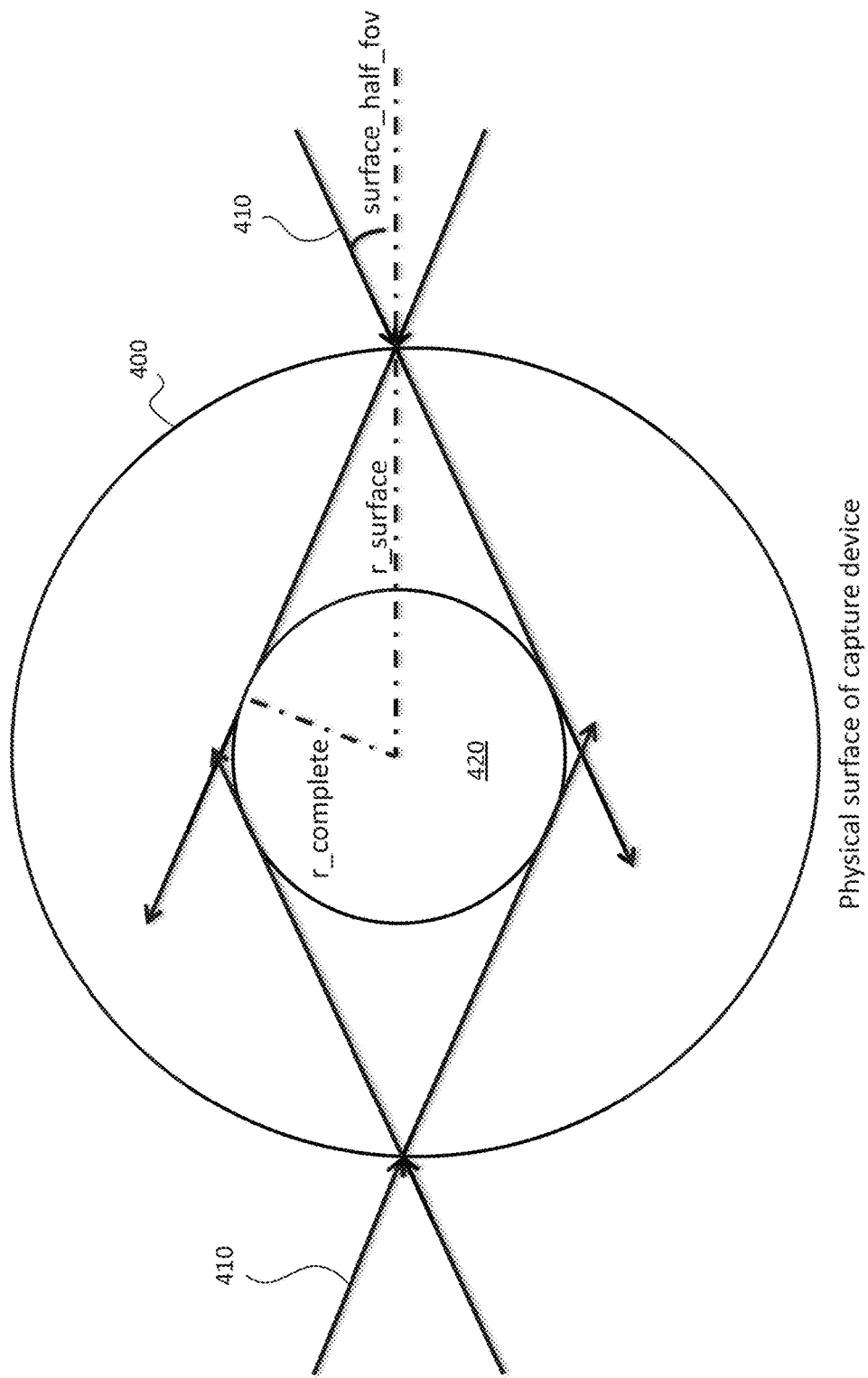
FIG. 34 is a diagram showing the relationship between the physical size and field-of-view on the capture surface to the size of a virtual fully sampled light-field volume, according to one embodiment.

Referring now to FIG. 34, it can be seen that the physical radius of the capture surface 400, r_surface, and the capture surface field-of-view half angle, surface_half_fov, may be related to the virtual radius of the fully sampled light-field volume, r_complete, by:

r_complete=r_surface*sin(surface_half_fov)

To complete the example, in at least one embodiment, the physical capture surface, or capture surface 400, may be designed to be at least 300 mm in radius in order to accommodate the system design parameters.

In another embodiment, the capture system is of sufficient size to allow users a nearly full range of motion while maintaining a sitting position. As an example, the desired radius of the fully sampled light-field volume 420 may be 500 mm. If the selected lens has a 45° field-of-view half angle, the capture surface 400 may be designed to be at least 700 mm in radius.

In one embodiment, the tiled array of light-field cameras is of sufficient size and captures sufficient field-of-view to allow viewers to look in any direction, without any consideration for translational motion. In that case, the diameter of the fully sampled light-field volume 420 may be just large enough to generate virtual views with separations large enough to accommodate normal human viewing. In one embodiment, the diameter of the fully sampled light-field volume 420 is 60 mm, providing a radius of 30 mm. In that case, using the lenses listed in the example above, the radius of the capture surface 400 may be at least 90 mm.

In other embodiments, a different limited set of freedoms may be provided to VR viewers. For example, rotation and tilt with stereo viewing may be supported, but not translational motion. In such an embodiment, it may be desirable for the radius of the capture surface to approximately match the radius of the arc traveled by an eye as a viewer turns his or her head. In addition, it may be desirable for the field-of-view on the surface of the capture system to match the field-of-view presented to each eye in the VR headset. In one embodiment, the radius of the capture surface 400 is between 75 mm and 150 mm, and the field-of-view on the surface is between 90° and 120°. This embodiment may be implemented using a tiled array of light-field cameras in which each objective lens in the objective lens array is a wide-angle lens.

Tiled Array of Plenoptic Light-Field Cameras

Many different types of cameras may be used as part of a tiled array of cameras, as described herein. In at least one embodiment, the light-field cameras in the tiled array are plenoptic light-field cameras.

Referring to FIG. 1, a plenoptic light-field camera 100 may capture a light-field using an objective lens 110, plenoptic microlens array 120, and photosensor 130. The objective lens 110 may be positioned to receive light through an aperture (not shown). Each microlens in the plenoptic microlens array 120 may create an image of the aperture on the surface of the photosensor 130. By capturing data regarding the vector at which light rays are received by the photosensor 130, the plenoptic light-field camera 100 may facilitate the generation of viewpoints within a sampled light-field volume that are not aligned with any of the camera lenses of the capture system. This will be explained in greater detail below.

Figure 25:
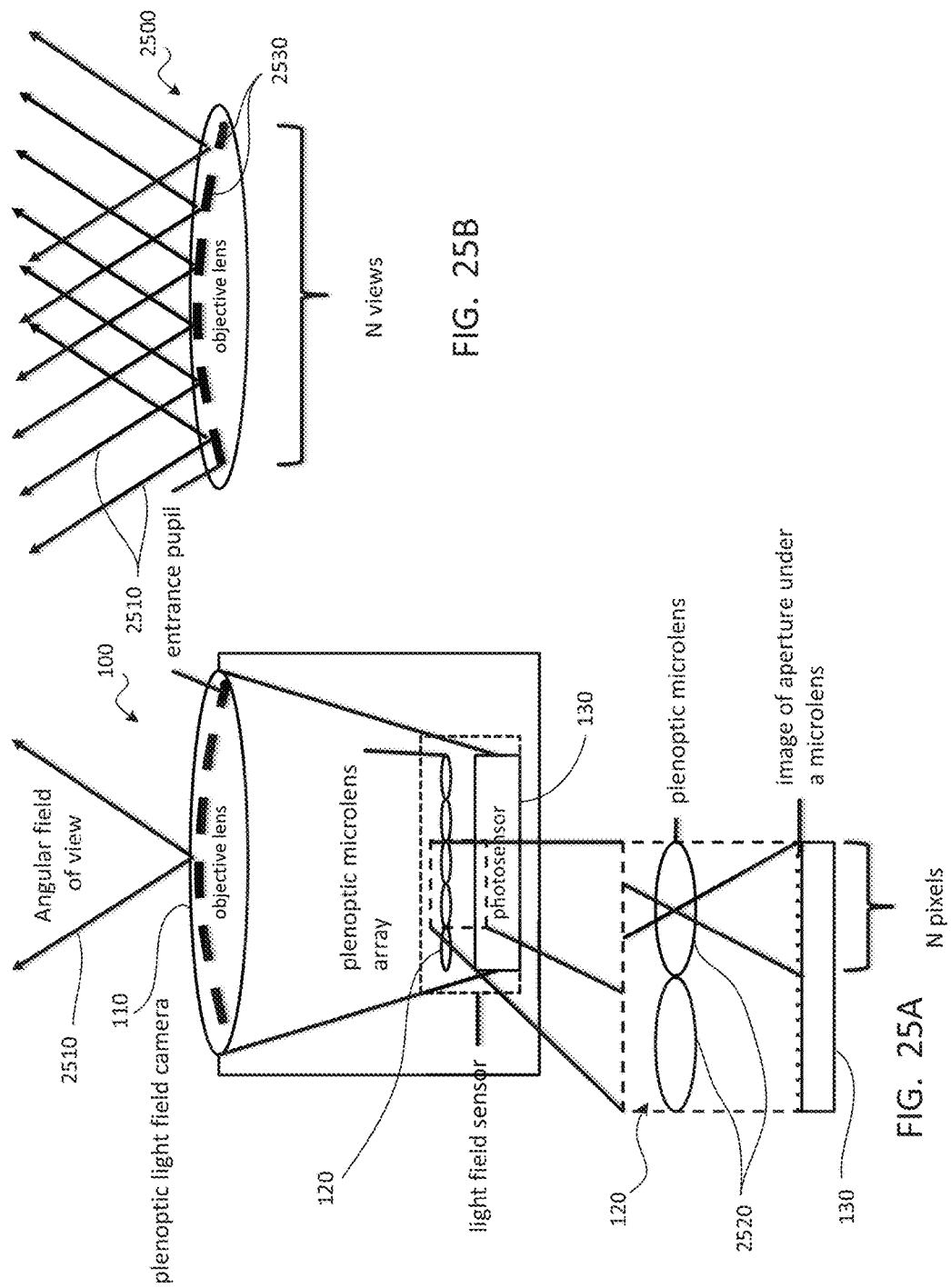
FIGS. 25A through 25B are diagrams comparing a schematic view of a plenoptic light-field camera to a virtual camera array that is approximately optically equivalent.

In order to generate physically accurate virtual views from any location on a physical capture surface such as the capture surface 400 of FIG. 4, the light-field may be captured from as much of the capture surface 400 of the capture system as possible. FIGS. 25A and 25B show the relationship between a plenoptic light-field camera such as the plenoptic light-field camera 100 of FIG. 1, and a virtual camera array 2500 that are approximately optically equivalent.

In FIG. 25A, the objective lens 110 captures light from within an angular field-of-view 2510. The objective lens 110 has an entrance pupil, the optical image of the aperture stop seen through the front of the objective lens 110. The light captured by the objective lens 110 passes through the plenoptic microlens array 120, where each microlens 2520 in the array creates an N×N pixel "disk image" on the surface of the photosensor 130. The disk image is an image of the aperture as seen by the microlens 2520 through which the disk image was received.

The plenoptic light-field camera 100 is approximately optically equivalent to a virtual camera array of N×N cameras 2530 with the same angular field-of-view 2510, with the vertex of each camera 2530 located on the surface of the entrance pupil. The size of each entrance pupil in the virtual camera array 2500 is approximately 1/Nth the size (in one dimension) of the entrance pupil of the objective lens 110. Notably, the term approximately is used in the description above, as optical aberrations and other systemic variations may result in deviations from the ideal virtual system described.

Figure 10:
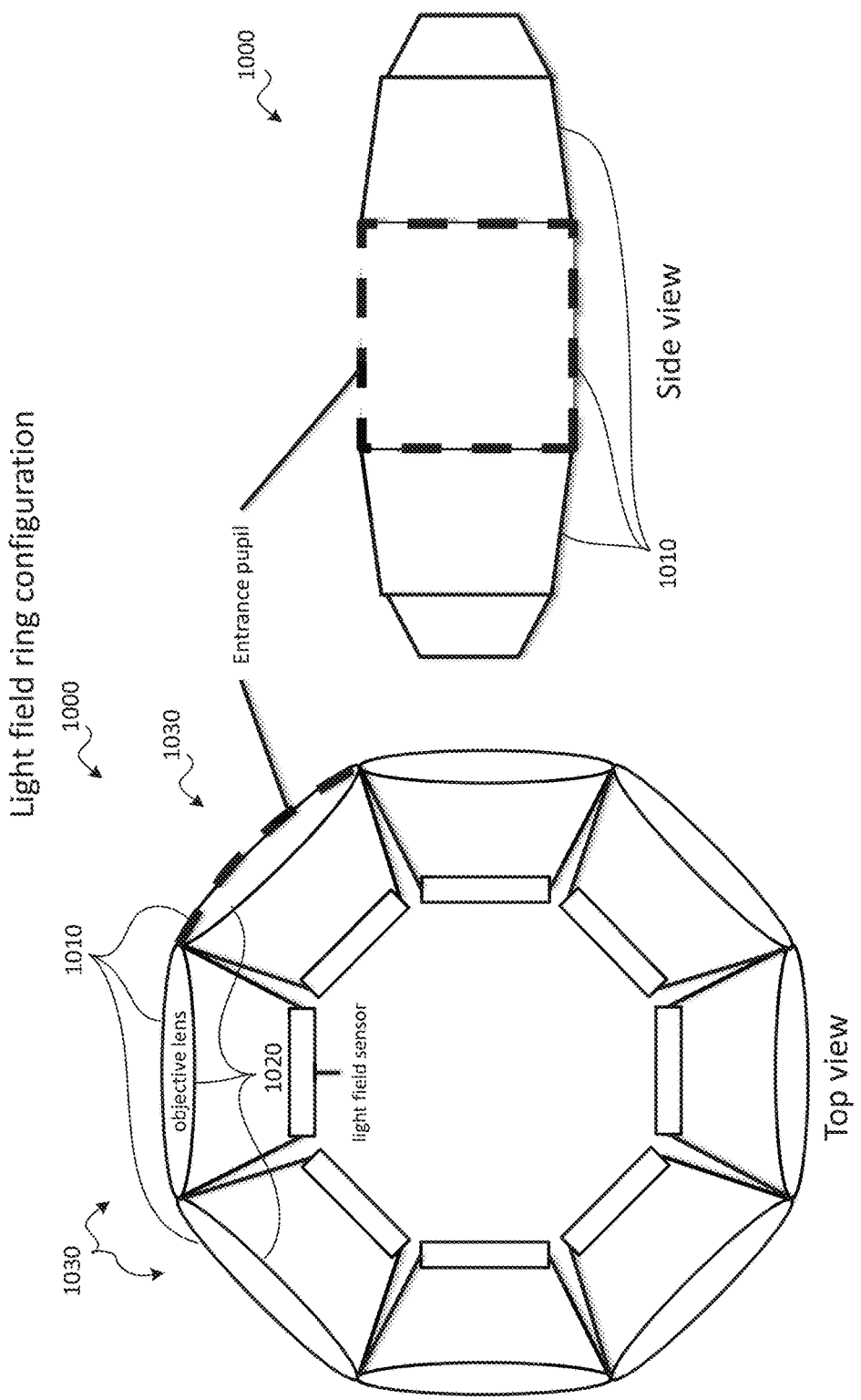
FIG. 10 is a diagram showing a tiled array in an ideal ring configuration of contiguous plenoptic light-field cameras, according to one embodiment.

In order to come as close as possible to a continuous light-field capture surface when spanning multiple cameras, the entrance pupil from one light-field camera may come as near as possible to adjoining the entrance pupil(s) from neighboring camera(s). FIG. 10 shows a tiled array 1000 in a ring configuration where the entrance pupils 1010 from the objective lenses 1020 create a gap-free surface on the tiled array 1000.

In order for the entrance pupils 1010 from neighboring objective lenses 1020 to create a nearly continuous surface, the entrance pupil 1010 may be large relative to the physical size of each light-field camera 1030 in the tiled array 1000, as shown in FIG. 10. Further, in order to provide large viewing angles in as large a volume as possible, it may be beneficial to start with a lens that has a relatively wide field-of-view. Thus, a good lens design choice may include a relatively wide field-of-view paired with a relatively large aperture (as aperture size and entrance pupil size are very closely related).

Figure 13:
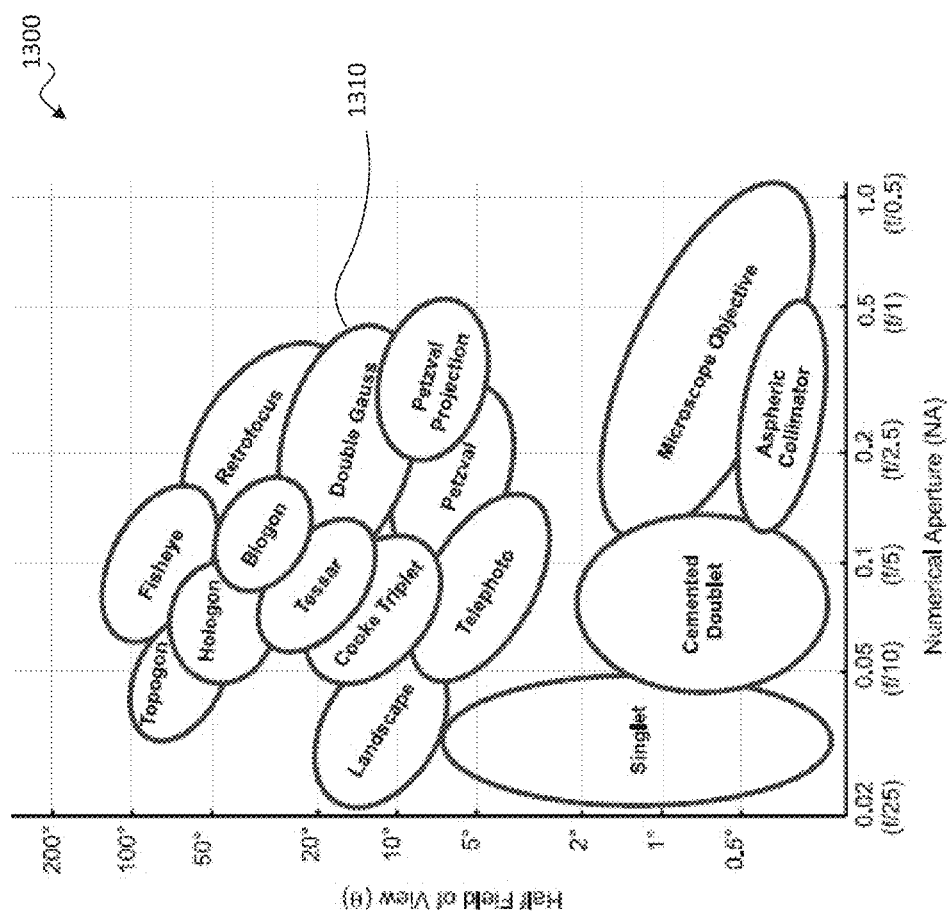
FIG. 13 is a diagram showing different basic lens designs that can be used in different embodiments, and shows typical field-of-view (FOV) and Numerical Apertures for those designs.

FIG. 13 is a diagram 1300 depicting typical fields-of-view and aperture ranges for different types of lens designs. In one embodiment, a double Gauss lens design 1310 with a low F-number is used for the objective lens. In alternative embodiments, different lens types may be used, including any of those illustrated on the diagram 1300.

Figure 14:
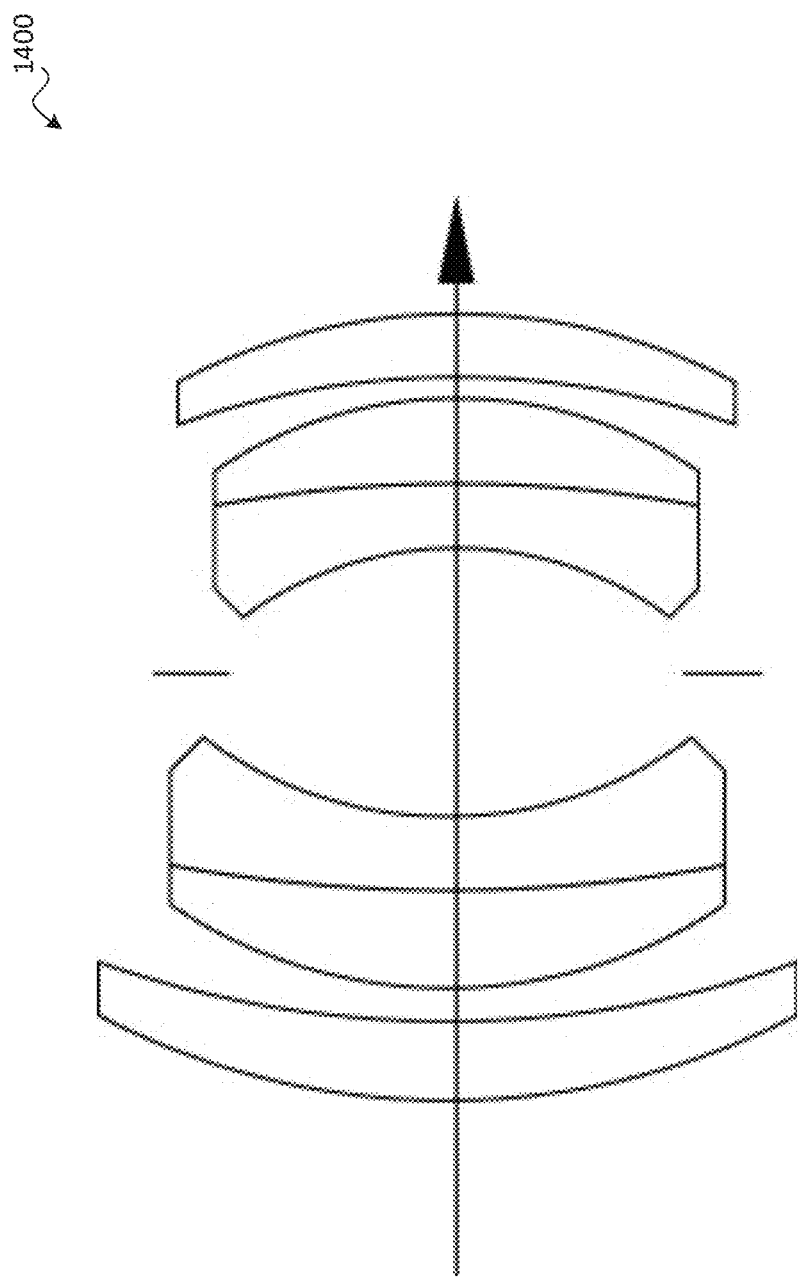
FIG. 14 is an exemplary schematic cross section diagram of a double Gauss lens design that can be used in one embodiment.

FIG. 14 shows a cross section view of a double Gauss lens design 1400 with a large aperture. Double Gauss lenses have a desirable combination of field-of-view and a potentially large entrance pupil. As an example, 50 mm lenses (for 35 mm cameras) are available at F/1.0 and below. These lenses may use an aperture stop that is greater than or equal to 50 mm on a sensor that is approximately 35 mm wide.

In one embodiment, a tiled array may have plenoptic light-field cameras in which the entrance pupil and aperture stop are rectangular and the entrance pupils of the objective lenses create a continuous or nearly continuous surface on the capture system. The aperture stop may be shaped to allow for gap-free tessellation. For example, with reference to FIG. 10, the entrance pupil 1010 may have a square or rectangular shape. Additionally, one or more lens elements may be cut (for example, squared) to allow for close bonding and to match the shape of the aperture stop. As a further optimization, the layout and packing of the microlens array, such as the plenoptic microlens array 120 of FIG. 1, may be optimized for the shape of the entrance pupil 1010. For example, the plenoptic microlens array 120 may have a square or rectangular shape and packing to match a square or rectangular shape of the entrance pupil 1010.

In one embodiment, a lens with a relatively wide field-of-view and relatively large entrance pupil is selected as the objective lens, and the lenses are spaced as closely as possible while maintaining the traditional round shape. Again, a double Gauss type lens with a large aperture may be a good choice for the objective lens.

Figure 15:
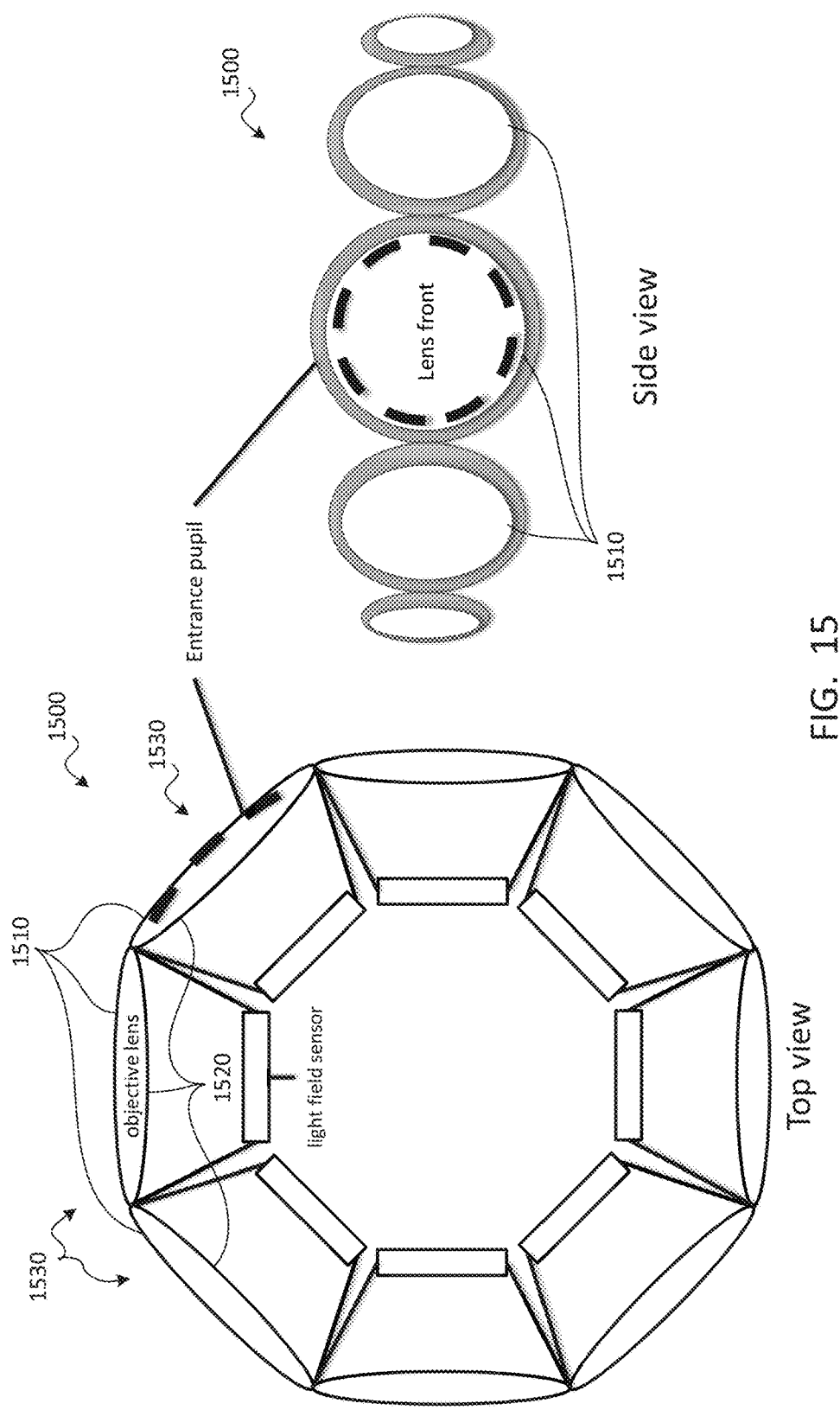
FIG. 15 is a diagram showing ring configuration of plenoptic light-field cameras with circular lenses and non-contiguous entrance pupils, according to one embodiment.

A tiled array 1500 in a ring configuration using round lenses is shown in FIG. 15. The objective lenses 1520 may be circular, along with the entrance pupils 1510 of the light-field cameras 1530. Thus, the entrance pupils 1510 may not be continuous to each other, as shown in the side view on the right-hand side. Notably, these types of objective lenses may be used in any tiling pattern. In another embodiment, the light-field cameras are arranged into a geodesic dome using two different lens diameters and the tiling pattern 1140 shown in FIG. 11C. Such an arrangement may help to minimize the spacing between the entrance pupils 1510 in order to enhance the continuity of the light-field data captured.

Figure 12:
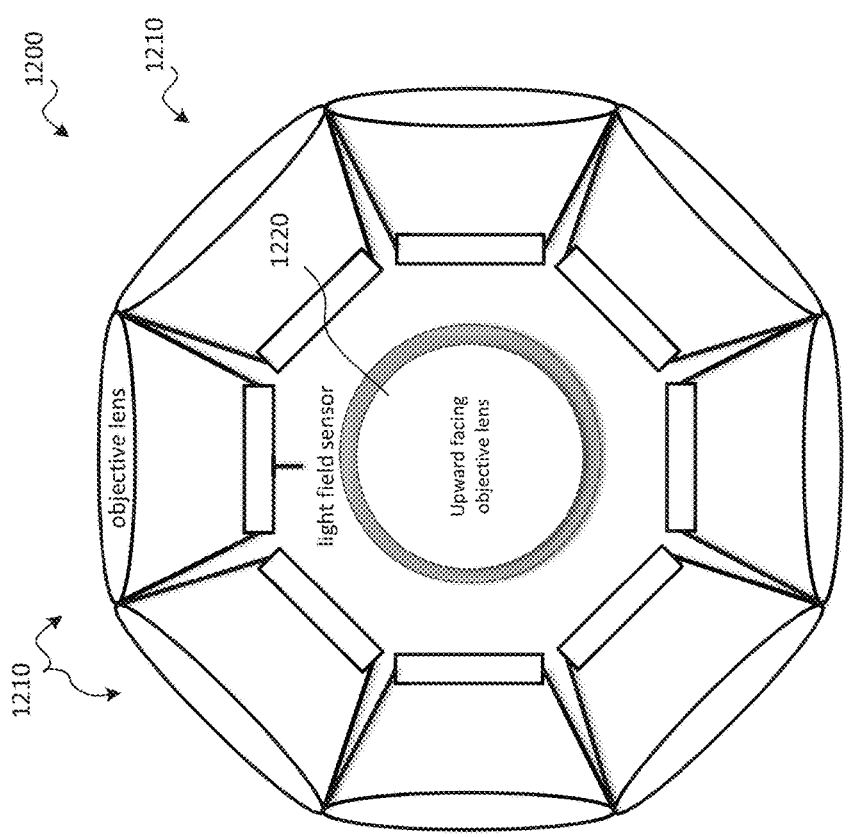
FIG. 12 is a diagram of a ring configuration with the addition of a top-facing light-field camera, according to one embodiment.

In one embodiment, one or more top and/or bottom facing cameras may be used in addition to a tiled array in a ring configuration. FIG. 12 conceptually depicts a tiled array 1200 with light-field cameras 1210 arranged in a ring-shaped pattern, with a single light-field camera 1220 facing up. Another light-field camera 1220 (not shown) may be positioned on the opposite side of the tiled array 1200 and may be oriented in a direction opposite to that of the light-field camera 1220.

Notably, the upward and/or downward facing light-field camera(s) 1220 may be standard two-dimensional camera (s), light-field camera(s) or a combination thereof. Embodiments of this type may capture highly incomplete light-field volume data directly above and below the tiled array 1200, but may offer significant savings in total system cost and/or complexity. In some circumstances, the views directly above and below the tiled array 1200 may be considered less important than other directions. For example, a viewer may not require as much detail and/or accuracy when looking up or down as when viewing images at his or her elevation.

Changing Rotational Position of the Tiled Array

In at least one embodiment, the surface of a capture system may be made to change its rotational position and capture different sets of viewpoints at different times. By changing the rotational position between frames, each successive frame may be used to capture portions of the light-field volume that may not have been captured in the previous frame.

Figure 16:
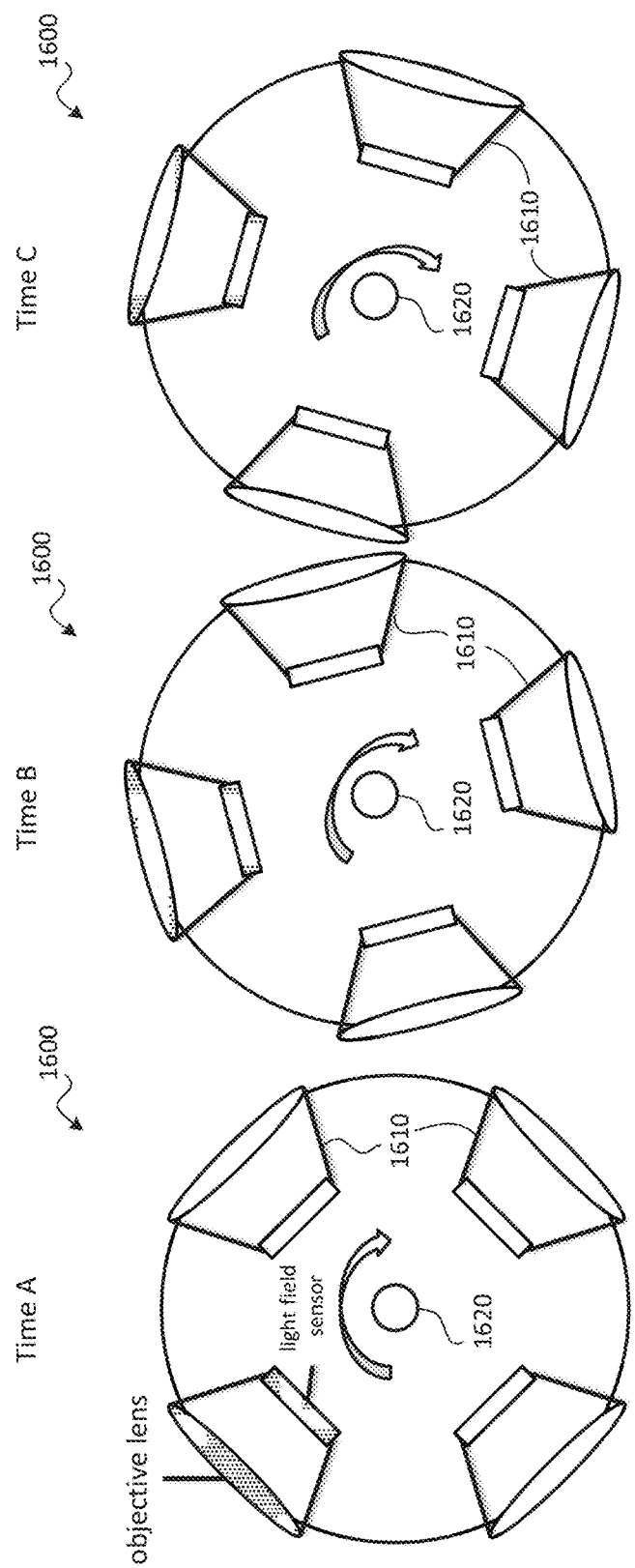
FIGS. 16A through 16C are diagrams depicting a sparsely populated light-field ring configuration that rotates, according to one embodiment.

Referring to FIGS. 16A through 16C, a sensor array 1600 may be a sparsely populated ring of plenoptic light-field cameras 1610. Each successive frame may capture a different set of angles than the previous frame.

Specifically, at time A, a portion of the light-field volume is captured. The sensor array 1600 is then rotated to the position shown at time B by rotating the ring, and another portion of the light-field volume is captured. The sensor array 1600 is rotated again, by once again rotating the ring, with another capture at time C.

This embodiment may allow for finer sampling of the light-field volume, more complete sampling of the light-field volume, and/or sampling with less physical hardware. For clarity, the embodiments with changing rotational position are displayed in a ring configuration. However, it should be recognized that the principle may be applied to any tiled configuration. Rotation may be carried out about one axis, as in FIGS. 16A through 16C, or multiple axes, if desired. A spherically tiled configuration may, for example, be rotated about all three orthogonal axes.

In one embodiment, the camera array rotates in the same direction between each capture, as in FIGS. 16A through 16C. In another embodiment, the camera array oscillates between two or more capture positions and may change the direction of rotation between captures.

For video capture, the overall frame rate of the system may be very high so that every rotational position is captured at a sufficient frame rate. As an example, if output video at 60 frames per second is desired, and the capture system uses three distinct and repeating capture positions, the overall frame capture rate, including time for positions changes, may be greater than or equal to 180 frames per second. This may enable samples to be taken at each rotational position in synchronization with the desired frame rate.

In at least one embodiment, the entire sensor array 1600 may be attached to a rotary joint, which allows the tiled array to rotate independently of the rest of the system and surroundings. The electrical connections may go through a slip ring, or rotary electrical interface, to connect rotating components in the system to non-rotating components. The rotation and/or oscillation may be driven by a motor 1620, which may be a stepper motor, DC motor, or any other suitable motor system.

Changing Rotational Position of the Light-Field Sensors

In at least one embodiment, the light-field sensors within the capture system may be rotated to capture different sets of viewpoints at different times, while the objective lenses may stay in a fixed position. By changing the rotational position of the sensors between frames, each successive frame may be used to capture portions of the light-field volume that were not captured in the previous frame.

Figure 17:
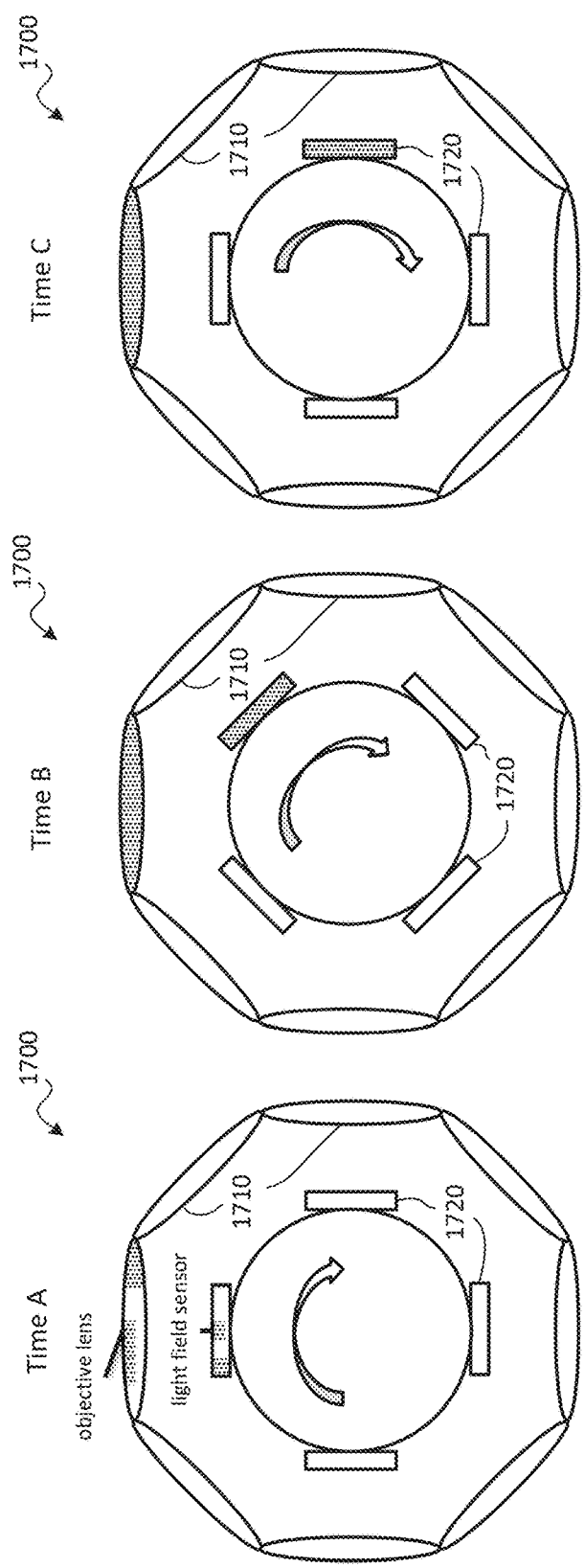
FIGS. 17A through 17C are diagrams depicting a fully populated set of lenses and sparsely populated sensors, according to one embodiment.

Referring to FIGS. 17A through 17C, a sensor array 1700 may include a ring with a full set of objective lenses 1710 with a sparse set of light-field sensors 1720. At each time of capture, the sensor array 1700 may capture images from a subset of the objective lenses 1710. The objective lenses 1710 may maintain a fixed position while the array of light-field sensors 1720 may rotate.

At time A, a portion of the light-field volume is captured that corresponds to the objective lenses 1710 that are actively used at that time (i.e., the objective lenses 1710 that are in alignment with one of the light-field sensors 1720). The light-field sensors 1720 are then rotated to the position shown at time B, and another portion of the light-field volume is captured, this time corresponding with the different set of objective lenses 1710 that are in alignment with the light-field sensors 1720. The light-field sensors 1720 are rotated again, with another capture at time C.

This embodiment may allow for finer sampling of the light-field volume, more complete sampling of the light-field volume, and/or sampling with less physical hardware. For clarity, the embodiments with changing rotational position are displayed in a ring configuration. However, it should be recognized that the principle may be applied to any tiled configuration. Rotation may be carried out about one axis, as in FIGS. 17A through 17C, or multiple axes, if desired. A spherically tiled configuration may, for example, be rotated about all three orthogonal axes.

In one embodiment, the light-field sensor array rotates in the same direction between each capture, as in FIGS. 17A through 17C. In another embodiment, the light-field sensor array may oscillate between two or more capture positions and may change the direction of rotation between captures, as in FIGS. 18A through 18C.

Figure 18:
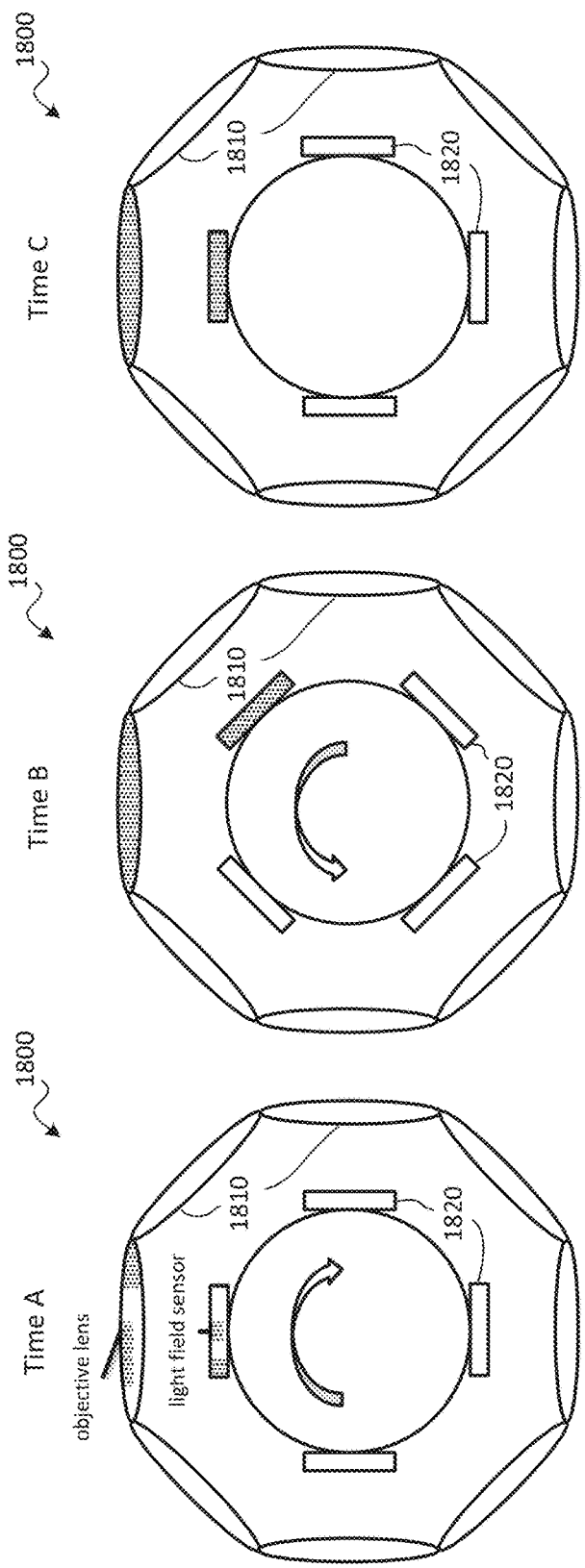
FIGS. 18A through 18C are diagrams of a fully populated set of lenses and sparsely populated sensors, according to one embodiment.

FIGS. 18A through 18C depict a sensor array 1800 that may include a ring with a full set of objective lenses 1810 with a sparse set of light-field sensors 1820, as in FIGS. 17A through 17C. Again, the objective lenses 1810 may maintain a fixed position while the array of light-field sensors 1820 rotates. However, rather than rotating in one continuous direction, the array of light-field sensors 1820 may rotate clockwise from FIG. 18A to FIG. 18B, and then counter-clockwise from FIG. 18B to FIG. 18C, returning in FIG. 18C to the relative orientation of FIG. 18A. The array of light-field sensors 1820 may thus oscillate between two or more relative positions.

In at least one embodiment, the array of light-field sensors 1720 and/or the array of light-field sensors 1820 may be attached to a rotary joint, which allows the array of light-field sensors 1720 or the array of tiled light-field sensors 1820 to rotate independently of the rest of the capture system and surroundings. The electrical connections may go through a slip ring, or rotary electrical interface, to connect rotating components in the system to non-rotating components. The rotation and/or oscillation may be driven by a stepper motor, DC motor, or any other suitable motor system.

Tiled Array of Array Light-Field Cameras

A wide variety of cameras may be used in a tiled array according to the present disclosure. In at least one embodiment, the light-field cameras in the tiled array are array light-field cameras. One example is shown in FIG. 6.

Figure 6:
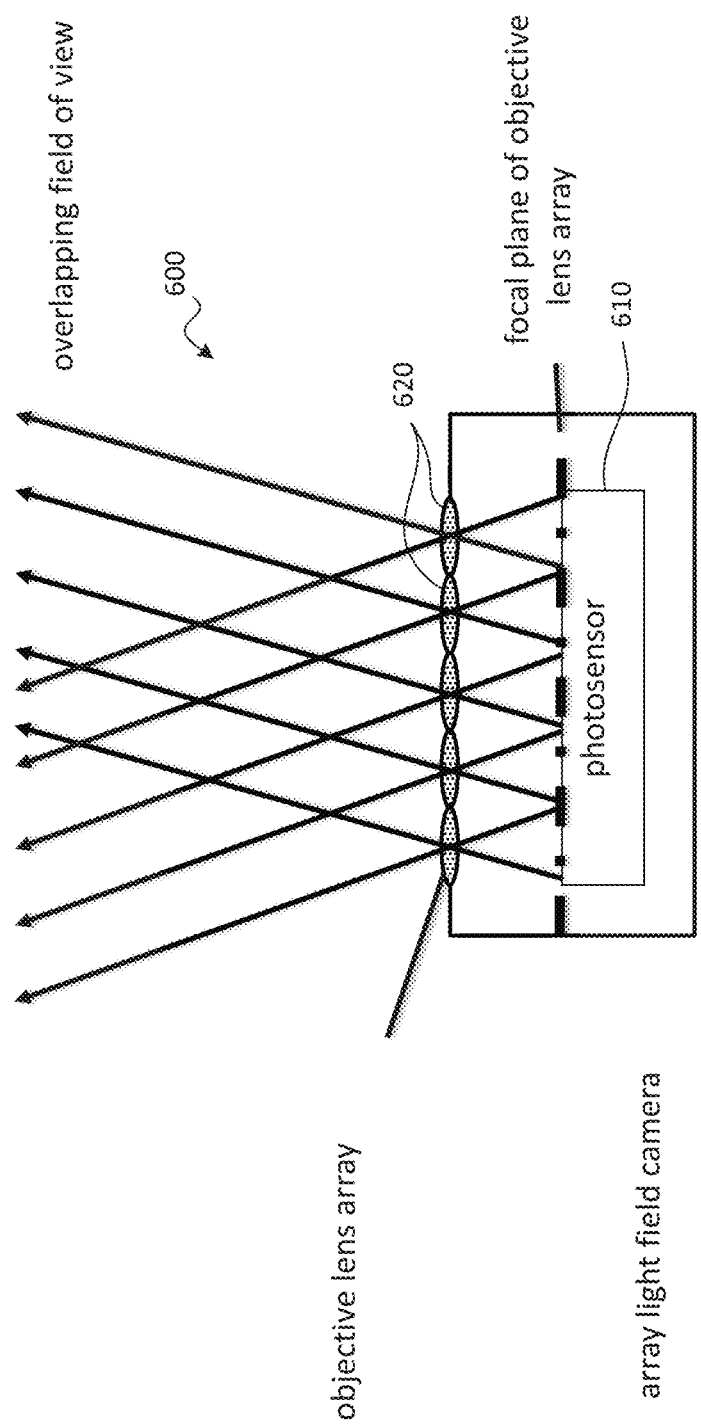
FIG. 6 is a diagram of an array light-field camera, according to one embodiment.

FIG. 6 shows the basic configuration of an array light-field camera 600 according to one embodiment. The array light-field camera 600 may include a photosensor 610 and an array of M×N objective lenses 620. Each objective lens 620 in the array may focus light onto the surface of the photo-sensor 610 and may have an angular field-of-view approximately equivalent to the other objective lenses 620 in the array of objective lenses 620. The fields-of-view of the objective lenses 620 may overlap as shown.

The objective lenses 620 may cooperate to capture M×N virtual viewpoints, with each virtual viewpoint corresponding to one of the objective lenses 620 in the array. Each viewpoint may be captured as a separate image. As each objective lens 620 is located at a slightly different position than the other objective lenses 620 in the array, each objective lens 620 may capture approximately the same image, but from a different point of view from those of the other objective lenses 620. Many variations of the basic design are possible, and any variation may be applied to the embodiments described below.

Figure 19:
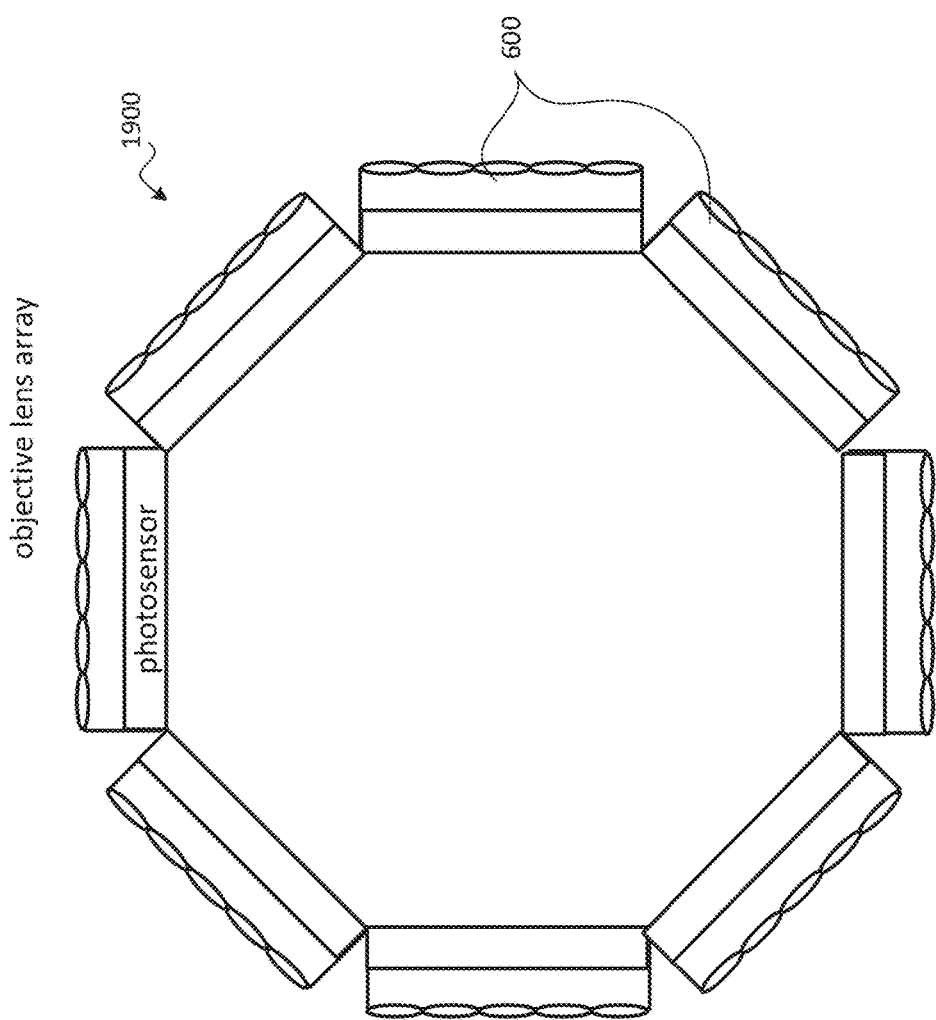
FIG. 19 is a diagram showing a ring configuration of contiguous array light-field cameras, according to one embodiment.

FIG. 19 conceptually shows how array light-field cameras 600 as in FIG. 6 may be tiled to form a nearly continuous capture surface 1900. Notably, while a ring tiling pattern is displayed in the FIG. 19, any tiling scheme may be used, including but not limited to those of FIGS. 11A, 11B, and 11C.

In one embodiment, the resolution and field-of-view of each captured subview is approximately equivalent to the desired field-of-view and resolution for later viewing. For example, if the content captured is desired to be displayed on VR headsets with resolution up to 1920×1080 pixels per eye and an angular field-of-view of 90°, each subview may capture image and/or video data using a lens with a field-of-view greater than or equal to 90° and may have a resolution greater than or equal to 1920×1080.

Changing Rotational Position of a Tiled Array of Array Light-Field Cameras

Array light-field cameras and/or components thereof may be rotated to provide more complete capture of a light-field than would be possible with stationary components. The systems and methods of FIGS. 16A through 16C, 17A through 17C, and/or 18A through 18C may be applied to array light-field cameras like the array light-field camera 600 of FIG. 6. This will be described in greater detail in connection with FIGS. 32A through 32C and FIGS. 10A through 10C.

In at least one embodiment, the surface of a capture system having array light-field cameras may be made to change its rotational position and capture different sets of viewpoints at different times. By changing the rotational position between frames, each successive frame may be used to capture portions of the light-field volume that may not have been captured in the previous frame, as in FIGS. 16A through 16C.

Figure 32:
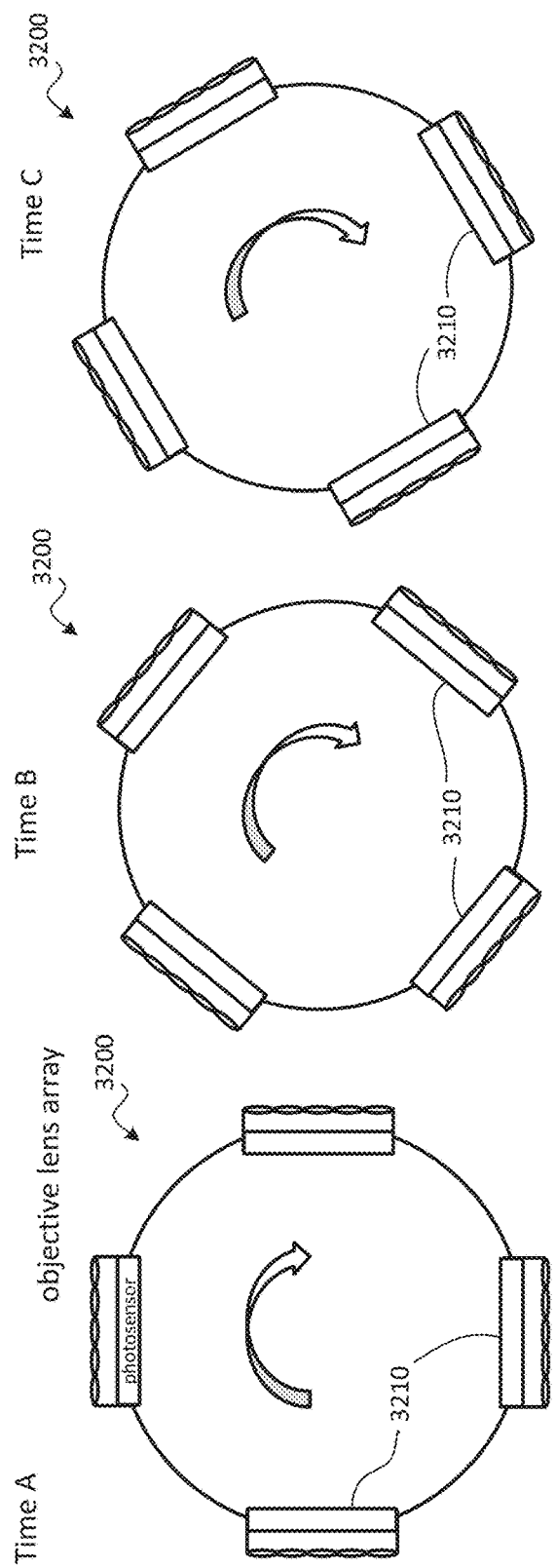
FIGS. 32A through 32C are conceptual diagrams showing a rotating sparsely populated tiled array of array light-field cameras, according to one embodiment.

Referring to FIGS. 32A through 32C, a sensor array 3200 may be a sparsely populated ring of array light-field cameras 3210. Each successive frame may capture a different set of angles than the previous frame.

Specifically, at time A, a portion of the light-field volume is captured. The sensor array 3200 is then rotated to the position shown at time B by rotating the ring, and another portion of the light-field volume is captured. The sensor array 3200 is rotated again, by once again rotating the ring, with another capture at time C.

This embodiment may allow for finer sampling of the light-field volume, more complete sampling of the light-field volume, and/or sampling with less physical hardware. Further, the benefits of the use array light-field cameras may be obtained. For clarity, the embodiments with changing rotational position are displayed in a ring configuration. However, it should be recognized that the principle may be applied to any tiled configuration. Rotation may be carried out about one axis, as in FIGS. 32A through 32C, or multiple axes, if desired. A spherically tiled configuration may, for example, be rotated about all three orthogonal axes.

In one embodiment, the array light-field camera array rotates in the same direction between each capture, as in FIGS. 32A through 32C. In another embodiment, the array light-field camera array oscillates between two or more capture positions and may change the direction of rotation between captures.

For video capture, the overall frame rate of the system may be very high so that every rotational position is captured at a sufficient frame rate. As an example, if output video at 60 frames per second is desired, and the capture system uses three distinct and repeating capture positions, the overall frame capture rate, including time for positions changes, may be greater than or equal to 180 frames per second. This may enable samples to be taken at each rotational position in synchronization with the desired frame rate.

In at least one embodiment, the entire sensor array 3200 may be attached to a rotary joint, which allows the tiled array to rotate independently of the rest of the system and surroundings. The electrical connections may go through a slip ring, or rotary electrical interface, to connect rotating components in the system to non-rotating components. The rotation and/or oscillation may be driven by a stepper motor, DC motor, or any other suitable motor system.

Changing Rotational Position of the Photosensors of Array Light-Field Cameras

In at least one embodiment, the light-field sensors of array light-field cameras within the capture system may be rotated to capture different sets of viewpoints at different times, while the arrays of objective lenses may stay in a fixed position. By changing the rotational position of the sensors between frames, each successive frame may be used to capture portions of the light-field volume that were not captured in the previous frame.

Figure 20B:
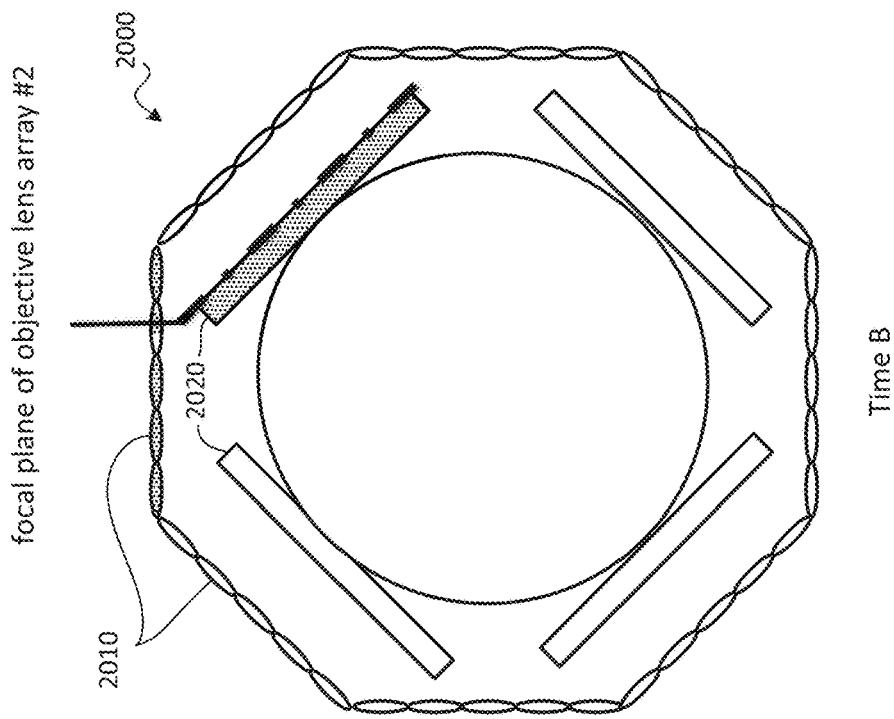
FIGS. 20A and 20B are diagrams of a fully populated set of objective lens arrays and sparsely populated sensors for array light-field cameras, according to one embodiment.
Figure 20A:
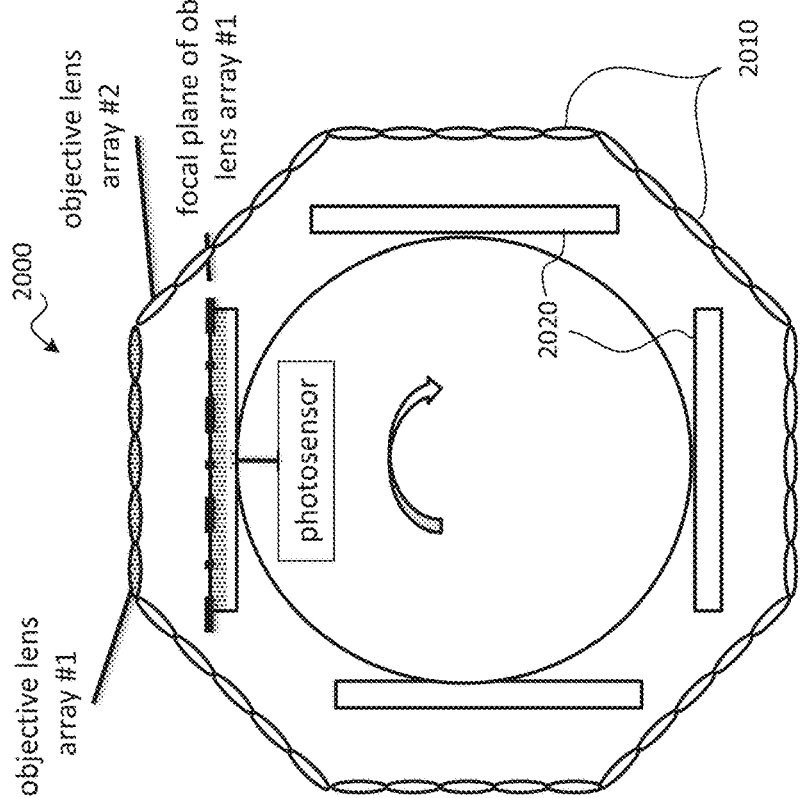

Referring to FIGS. 20A and 20B, a sensor array 2000 may include a ring with a full set of arrays of objective lenses 2010 with a sparse set of light-field sensors 2020. At each time of capture, the sensor array 2000 may capture images from a subset of the arrays of objective lenses 2010. The arrays of objective lenses 2010 may maintain a fixed position while the array of light-field sensors 2020 may rotate.

At time A, a portion of the light-field volume is captured that corresponds to the arrays of objective lenses 2010 that are actively used at that time (i.e., the arrays of objective lenses 2010 that are in alignment with one of the light-field sensors 2020). The light-field sensors 2020 are then rotated to the position shown at time B, and another portion of the light-field volume is captured, this time corresponding with the different set of arrays of objective lenses 2010 that are in alignment with the light-field sensors 2020. The light-field sensors 2020 are rotated again to once again reach the position shown at Time A, and capture may continue to oscillate between the configuration at Time A and that at time B. This may be accomplished via continuous, unidirectional rotation (as in FIGS. 17A through 17C) or via oscillating motion in which rotation reverses direction between captures, as in FIGS. 18A through 18C.

This embodiment may allow for finer sampling of the light-field volume, more complete sampling of the light-field volume, and/or sampling with less physical hardware. Further, the benefits of the use array light-field cameras may be obtained. For clarity, the embodiments with changing rotational position are displayed in a ring configuration. However, it should be recognized that the principle may be applied to any tiled configuration. Rotation may be carried out about one axis, as in FIGS. 20A and 20B, or multiple axes, if desired. A spherically tiled configuration may, for example, be rotated about all three orthogonal axes.

In at least one embodiment, the array of light-field sensors 2020 may be attached to a rotary joint, which allows the array of light-field sensors 2020 to rotate independently of the rest of the capture system and surroundings. The electrical connections may go through a slip ring, or rotary electrical interface, to connect rotating components in the system to non-rotating components. The rotation and/or oscillation may be driven by a stepper motor, DC motor, or any other suitable motor system.

Using Fiber Optic Tapers to Reduce Gaps in Coverage

Figure 33:
FIG. 33 is an exemplary image showing a CMOS photosensor mounted in an electronics package.

In practice, it may be difficult to tile photosensors very close to one another. FIG. 33 shows an exemplary CMOS photosensor 3300 in a ceramic package 3310. In addition to the active area 3320 on the photosensor 3300, there may be space required for inactive die surface, wire bonding, sensor housing, electronic and readout circuitry, and/or additional components. All space that is not active area is part of the package 3310 will not record photons. As a result, when there are gaps in the tiling, there may be missing information in the captured light-field volume.

In one embodiment, tapered fiber optic bundles may be used to magnify the active surface of a photosensor such as the photosensor 3300 of FIG. 33. This concept is described in detail in U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

Figure 21:
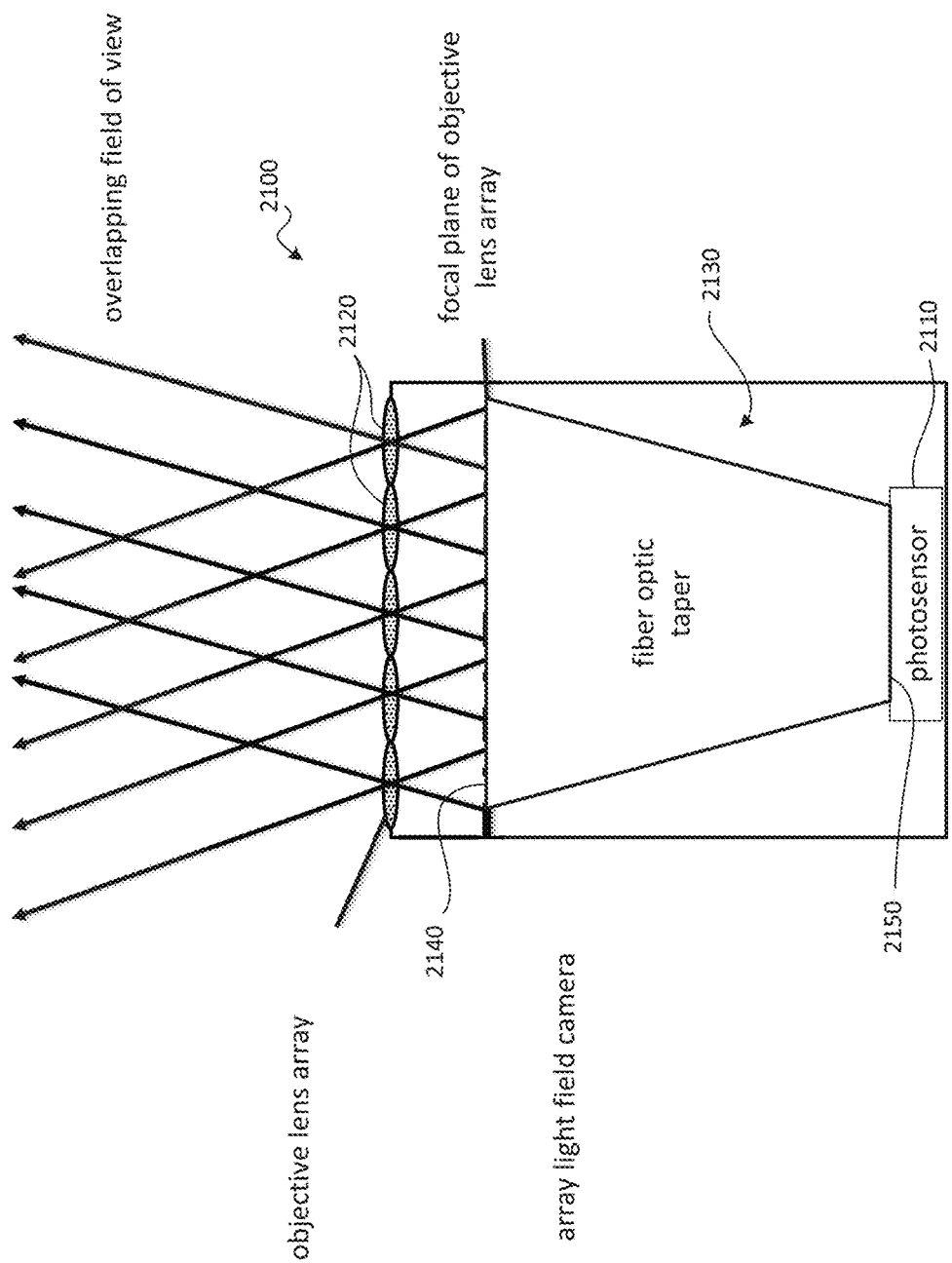
FIG. 21 is a diagram showing an array light-field camera using a tapered fiber optic bundle, according to one embodiment.

A schematic illustration is shown in FIG. 21, illustrating an array light-field camera 2100. The objective lens array 2120 focuses light on the large end 2140 of a tapered fiber optic bundle 2130. The tapered fiber optic bundle 2130 transmits the images to the photosensor 2110 and decreases the size of the images at the same time, as the images move from the large end 2140 of the tapered fiber optic bundle 2130 to the small end 2150 of the tapered fiber optic bundle 2130. By increasing the effective active surface area of the photosensor 2110, gaps in coverage between array light-field cameras 2100 in a tiled array of the array light-field cameras 2100 may be reduced. Practically, tapered fiber optic bundles with magnification ratios of approximately 3:1 may be easily acquired.

Figure 22:
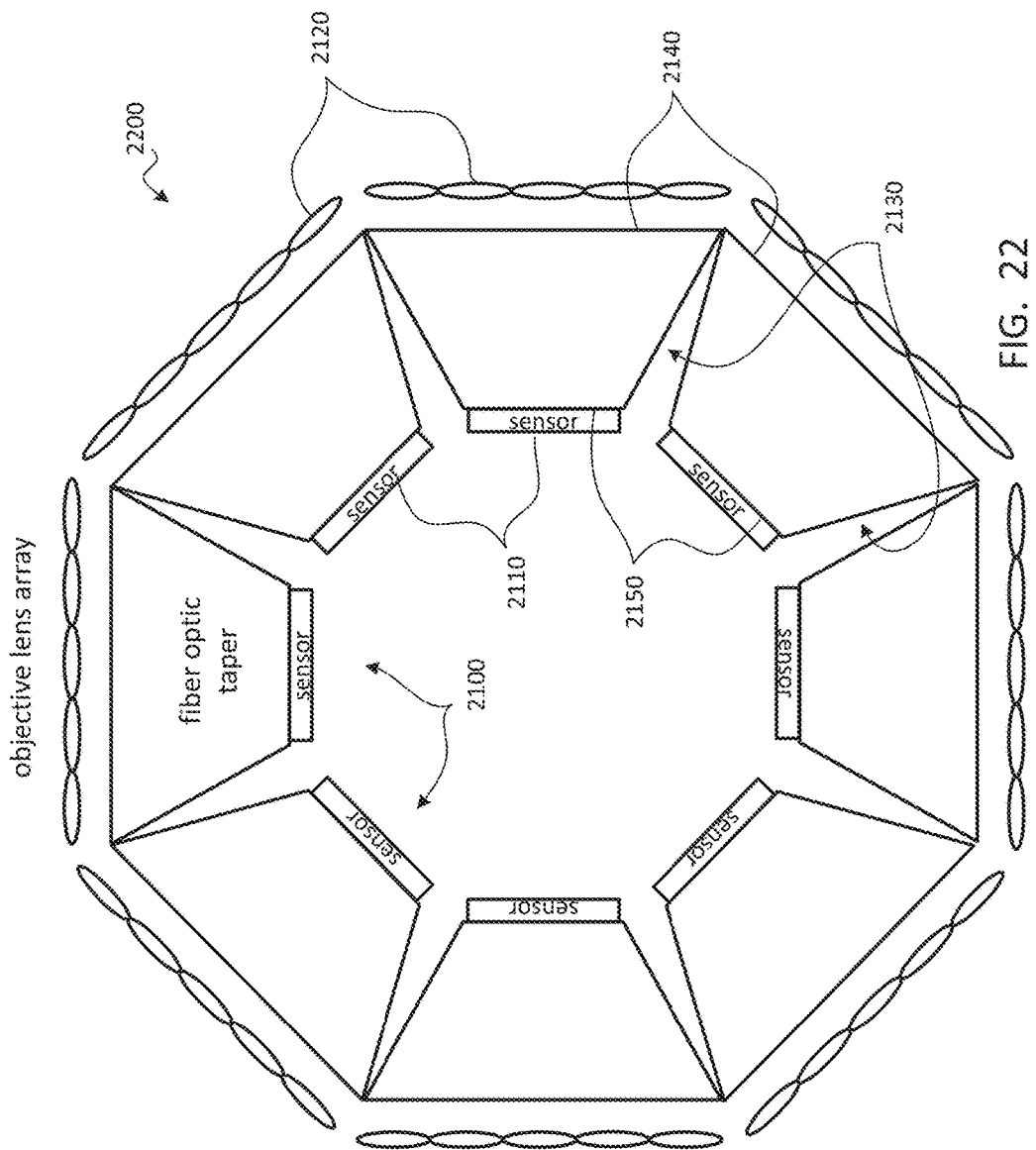
FIG. 22 is a diagram showing array light-field cameras using tapered fiber optic bundles in a ring configuration, according to one embodiment.

FIG. 22 conceptually shows how array light-field cameras using fiber optic tapers, such as the array light-field camera 2100 of FIG. 21, may be tiled to form a tiled array 2200 in a ring configuration. Usage of the tapered fiber optic bundles 2130 may increase the amount of available space between the photosensors 2110, allowing room that may be required for other purposes.

Array light-field cameras using tapered fiber optic bundles may be used to create capture surfaces that may otherwise be extremely impractical. Photosensors are generally rectangular, and customization to specific shapes and/or sizes can be extremely time and cost-intensive. In addition, tiling options using rectangles can be limited, especially when a goal is to minimize gaps in coverage. In one embodiment, the large ends of the tapered fiber optic bundles used in the tiled array are cut into a mix of precisely sized and shaped hexagons and pentagons. These tapered fiber optic bundles may then be attached to photosensors and tiled into a geodesic dome as shown in FIG. 11C. Objective lenses may be packed onto the geodesic surface as efficiently as possible. In this embodiment, each photosensor may capture image and/or video data in regions directly connected to fiber optic bundles that reach the surface of the dome (for example, resulting in pentagonal and hexagonal active areas on the photosensors). See also, the above-referenced U.S. Provisional Application No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference.

Focus, Resolution and Aperture Size

Ultimately, the resolution and maximum depth-of-field of virtual views generated from light-field volume data may be limited to the resolution and depth-of-field of the captured subviews. In typical practice, subviews in the light-field camera systems described herein have a large depth-of-field. However, as each subview captures light through an aperture with a physical size, the depth-of-field and of the subview is at least partially determined by the focus of the lens system and the size of the aperture. Additionally, the resolution of each subview is limited by the resolution of the photosensor pixels used when capturing that subview as well as the achievable resolution given the optics of the system. It may be desirable to maximize both the depth-of-field and the resolution of the subviews. In practice, the resolution and depth-of-field of the subviews may need to be balanced against the limitations of the sensor, the limitations of the available optics, the desirability of maximizing the continuity of the capture surface, and/or the desired number of physical subviews.

In at least one embodiment, the focus of the objective lenses in the capture system may be set to the hyperfocal position of the subviews given the optical system and sensor resolution. This may allow for the creation of virtual views that have sharp focus from a near distance to optical infinity.

In one embodiment of an array light-field camera, the aperture of each objective lens in the objective lens array may be reduced to increase the depth-of-field of the subviews. In one embodiment, the aperture size may be set so that a desired close focus distance is achievable when the objective lenses have focus set to their respective hyperfocal distances.

Virtual View Generation from the Captured Light-Field Data

Once image and/or video data has been captured by the tiled array of light-field cameras, images for different virtual viewpoints may be generated. In some embodiments, two images may be generated: one for each eye. The images may be generated from viewpoints that are displaced from each other by the ordinary displacement that exists between two human eyes. This may enable the images to present the viewer with the impression of depth. Image generation may be continuous, and may occur at any frame rate, such as, for example, 24 frames per second (FPS), 30 FPS, or 60 FPS, so that the images, in sequence, define a video feed for each eye. The video feed may be generated in real time as the viewer moves his or her head. Accelerometers, position sensors, and/or other sensors may be used to detect the motion and/or position of the viewer's head; the resulting position data may be used to move the viewpoints used to generate the images in general synchronization with the viewer's movements to present the impression of immersion in the captured environment.

Coordinate Conversion from Capture to Light-Field Volume

In at least one embodiment, all pixels in all the light-field cameras in the tiled array may be mapped to light-field volume coordinates. This mapping may facilitate the generation of images for different viewpoints within the light-field volume.

Figure 5:
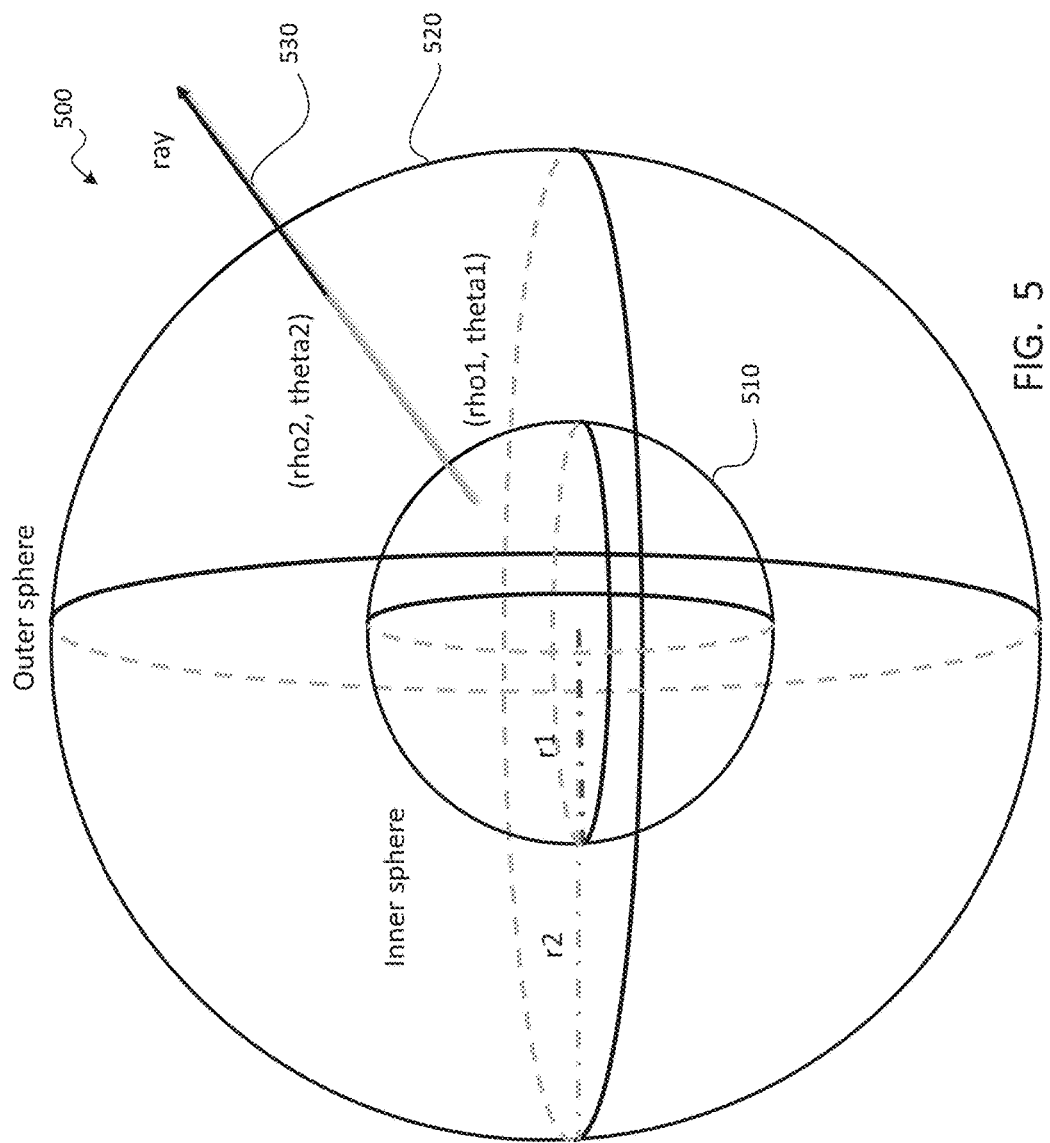
FIG. 5 is a conceptual diagram of a coordinate system for a light-field volume.

Light-field volume coordinates are shown conceptually in FIG. 5. Light-field volume coordinates are an extended version of standard light-field coordinates that may be used for panoramic and/or omnidirectional viewing, and may be expressed in terms of rho1, theta1, rho2, theta2. These variables may define a coordinate system 500 that is based on the polar coordinates of the intersection of a ray with the surface of two concentric spheres. The inner sphere 510 may have a radius r1 that is large enough to intersect with all rays of interest. Any virtual sphere that fully contains the physical capture system may be sufficient. The outer sphere 520 may be larger than the inner sphere 510. While the outer sphere 520 may be of any size larger that the inner sphere 510, it may be conceptually simplest to make the outer sphere 520 extremely large (r2 approaches infinity) so that rho2 and theta2 may often simply be treated as directional information directly.

This coordinate system 500 may be relative to the entire tiled light-field capture system. A ray 530 intersects the inner sphere 510 at (rho1, theta1) and the outer sphere 520 at (rho2, theta2). This ray 530 is considered to have the 4D coordinate (rho1, theta1, rho2, theta2).

Notably, any coordinate system may be used as long as the location and direction of all rays of interest can be assigned valid coordinates. The coordinate system 500 of FIG. 5 represents only one of many coordinate systems that may be used to describe the rays of light in a light-field volume in a manner that is global to the light-field camera array. In alternative embodiments, any other known coordinate system may be used, including but not limited to Cartesian and cylindrical coordinate systems.

The coordinate system 500 for a light-field volume may be considered to exist in a 3-dimensional Cartesian space, and the origin of the coordinate system 500 may be located at the center of the inner sphere 510 and the outer sphere 520. Coordinates may be converted from light-field volume coordinates to Cartesian coordinates by additionally taking into account the radii of the inner sphere 510 and the outer sphere 520. Notably, many rays that may be defined in Cartesian coordinates may not be able to be represented in the coordinate system 500, including all rays that do not intersect the inner sphere 510.

Conceptually, a mapping from a pixel position, indexed in a 2D array by x and y, on a camera, camera, to a light-field volume coordinate in the coordinate system 500 is a mapping function:

$$f(camera,x,y) \rightarrow (rho1, theta1, rho2, theta2)$$

In practice, each pixel, microlens, and subaperture may have a physical size; as a result, each pixel may integrate light not from a single ray, but rather a "ray bundle" consisting of a narrow volume of rays. For clarity, the simplified one-pixel-to-one-ray relationship described above will be used herein. However, one skilled in the art will recognize that this mapping may be naturally extended to cover "ray bundles."

In one embodiment, the mapping function may be determined by the design of the capture system. Using a ray tracer or other optical software, a mapping from pixel coordinates to camera-centric world coordinates may be created. In one embodiment, the ray tracer traces a single, representative ray, from the center of each pixel, through the optical system, and out into the world. That representative ray may be parameterized by its intersection with the entrance pupil and direction of travel.

In another embodiment, many rays may be traced for each pixel, intersecting with the pixel in many locations and from many directions. The rays that are successfully traced from the pixel and out through the objective lens may be aggregated in some manner (for example, by averaging or fitting a ray using least squares error regression), and a representative ray may be generated. The camera-centric world coordinates may then be transformed based on the camera's location within the tiled array, into world coordinates that are consistent to all cameras in the array. Finally, each transformed ray in the consistent world coordinate space may be traced and intersections calculated for the inner and outer spheres that define the light-field volume coordinates.

In one embodiment, a calibration process may determine the mapping function after the camera is constructed. The calibration process may be used to fine-tune a previously calculated mapping function, or it may be used to fully define the mapping function.

Figure 26:
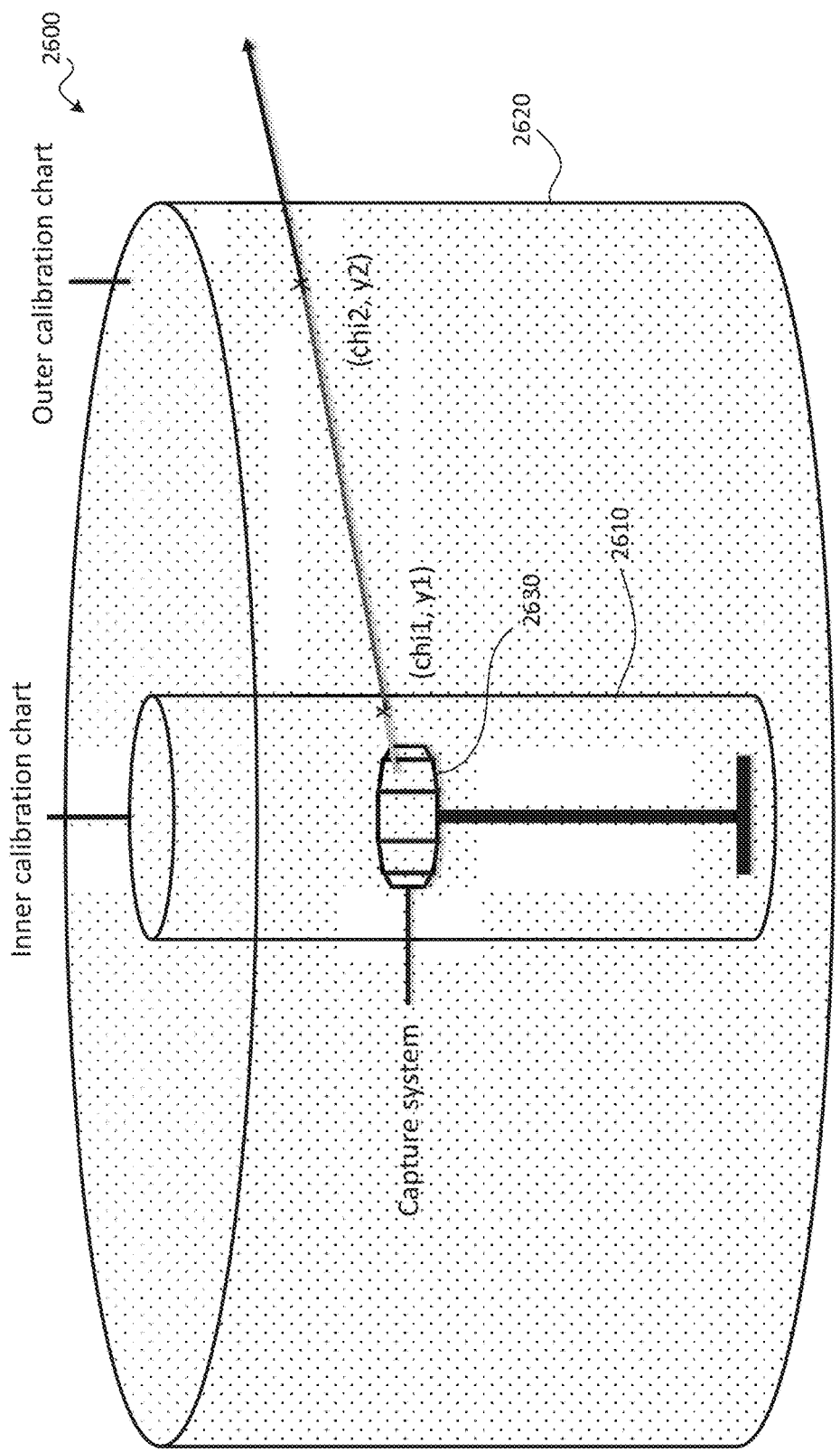
FIG. 26 is a diagram showing a possible set of two cylindrical calibration charts that may be used to calibrate a tiled light-field camera array, according to one embodiment.

FIG. 26 shows a diagram 2600 with a set of two charts that may be used to calibrate the mapping function. More specifically, the diagram 2600 includes a cylindrical inner calibration chart, or chart 2610, and a cylindrical outer calibration chart, or chart 2620. The chart 2610 and the chart 2620 are concentric and axially aligned with the capture system 2630. Each of the chart 2610 and the chart 2620 contains a pattern so that locations on images may be precisely calculated. For example, the pattern may be a grid or checkerboard pattern with periodic features that allow for global alignment.

In at least one embodiment, the capture system 2630 may be calibrated as follows:

Capture image data with the inner chart 2610 in place
For each camera in the array of the capture system 2630:
    For each subview:
        Find and register the subview with the global alignment features
        For each pixel:
            Calculate the intersection with the chart as (chi1, y1)
Remove the inner chart 2610
Capture image data with the outer chart 2620 in place
    For each subview:
        Find and register the subview with the global alignment features
        For each pixel:
            Calculate the intersection with the chart as (chi2, y2)
For each pixel:
    Trace the ray defined by (chi1, y, chi2, y2) to intersect with the inner sphere 510 in the coordinate system 500 for the light-field volume to determine (rho1, theta1).
    Trace the ray defined by (chi1, y, chi2, y2) to intersect with the outer sphere 520 in the coordinate system 500 for the light-field volume to determine (rho2, theta2).

Notably, the size and shapes of the chart 2610 and the chart 2620 may be varied to include spherical charts, cubic charts, or any other type of surface or combination thereof. Different chart types may be more readily adapted to different coordinate systems.

Virtual View Generation from Light-Field Volume Data

Images for virtual reality viewing may be generated from the light-field volume data. These images will be referred to as "virtual views." To create a virtual view, a virtual lens, virtual focus position, virtual field-of-view and virtual sensor may be used.

In at least one embodiment, a virtual lens may be centered at the location of the desired virtual viewpoint. The virtual lens may contain a virtual aperture that may have any shape or size, and these characteristics may partially determine the depth-of-field and bokeh of the virtual view. The virtual focus position and virtual field-of-view of the lens may jointly define a region that will be visible and "in focus" after reconstruction. Notably, the focus and resolution are ultimately limited by the focus and resolution of the capture system, so it is possible to reconstruct an image on a virtual focal plane where nothing is really in focus. The virtual sensor may have the same resolution as the desired output resolution for the virtual view.

Figure 28:
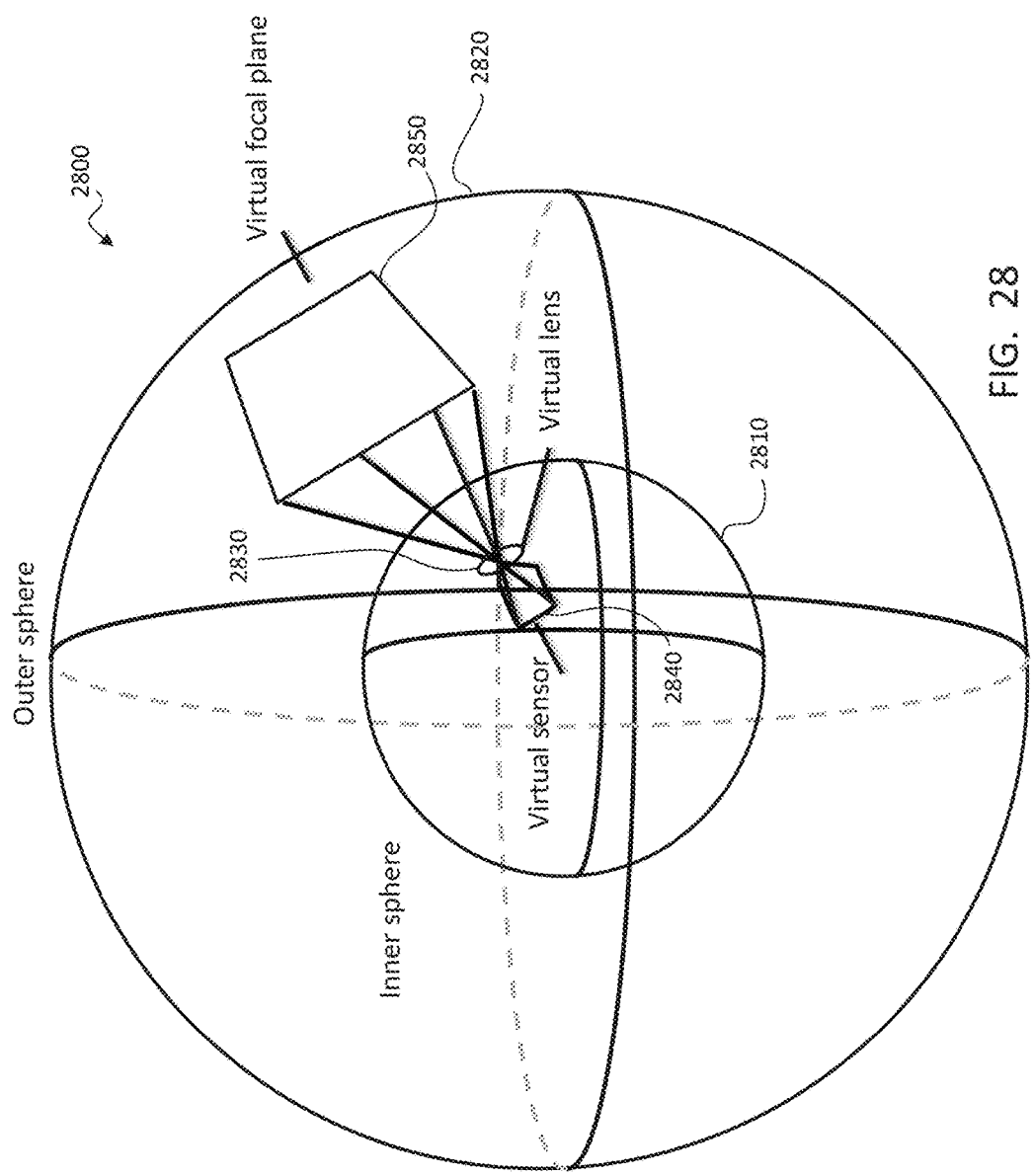
FIG. 28 is a conceptual drawing showing a virtual camera system and field-of-view that may be used to generate virtual views, according to one embodiment.

In one embodiment, a virtual camera system may be used to generate the virtual view. This embodiment is conceptually shown in FIG. 28, in connection with a coordinate system 2800 having an inner sphere 2810 and an outer sphere 2820. The virtual camera system may have a virtual lens 2830 and a virtual sensor 2840 that can be used to generate the virtual view. The configuration of the virtual lens 2830 may determine a virtual focal plane 2850 with a virtual field-of-view.

Figure 29:
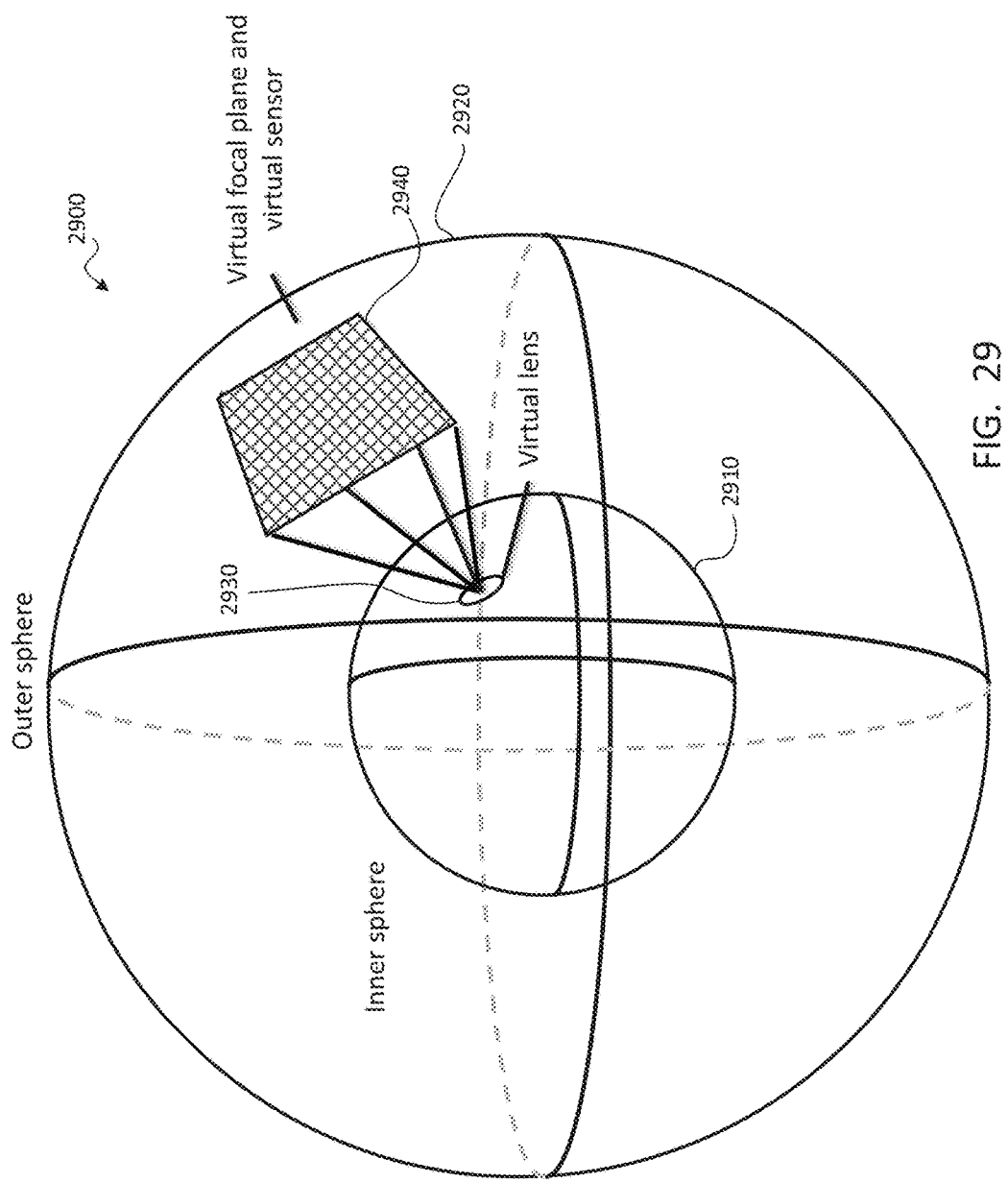
FIG. 29 is a conceptual drawing showing a coordinate system with a virtual camera system based on an ideal lens, according to one embodiment.

In one embodiment, an ideal lens is assumed, and the virtual setup may be simplified. This embodiment is conceptually shown in FIG. 29, in connection with a coordinate system 2900 having an inner sphere 2910 and an outer sphere 2920. In this simplified model, the sensor pixels may be mapped directly onto the surface of the focal plane and more complicated ray tracing may be avoided.

Specifically, the lens may be geometrically simplified to a surface (for example, a circular disc) to define a virtual lens 2930 in three-dimensional Cartesian space. The virtual lens 2930 may represent the aperture of the ideal lens. The virtual field-of-view and virtual focus distance, when taken together, define an "in focus" surface in three-dimensional Cartesian space with the same aspect ratio as the virtual sensor. A virtual sensor 2940 may be mapped to the "in focus" surface.

The following example assumes a set of captured rays parameterized in light-field volume coordinates, rays, a circular virtual aperture, va, a rectangular virtual sensor with width w and height h, and rectangular "in focus" surface, fs. An algorithm to create the virtual view may then be the following:

```
view_image = new Image(w, h)
view_image.clear( )
for each ray in rays
    cart_ray = convert_to_cartesian3d(ray)
    if (intersects(cart_ray, va) && intersects(cart_ray, fs))
        point = intersection(cart_ray, fs)
        norm_point = normalize_point_relative_to(fs)
        sensor_x = norm_point.x * w
        sensor_y = norm_point.y * h
        accumulate(view_image, x, y, ray.color)
where:
```
- intersects returns true if the supplied ray intersects with the surface
- intersection returns the location, in Cartesian coordinates, of intersection
- normalize_point_relative_to normalizes a Cartesian 3D point into a normalized 2D location on the provided surface. Values are in x = [0,1] and y = [0,1]
- accumulate accumulates the color values assigned to the ray into the image. This method may use any sort of interpolation, including nearest neighbor, bilinear, bicubic, or any other method.

Figure 30:
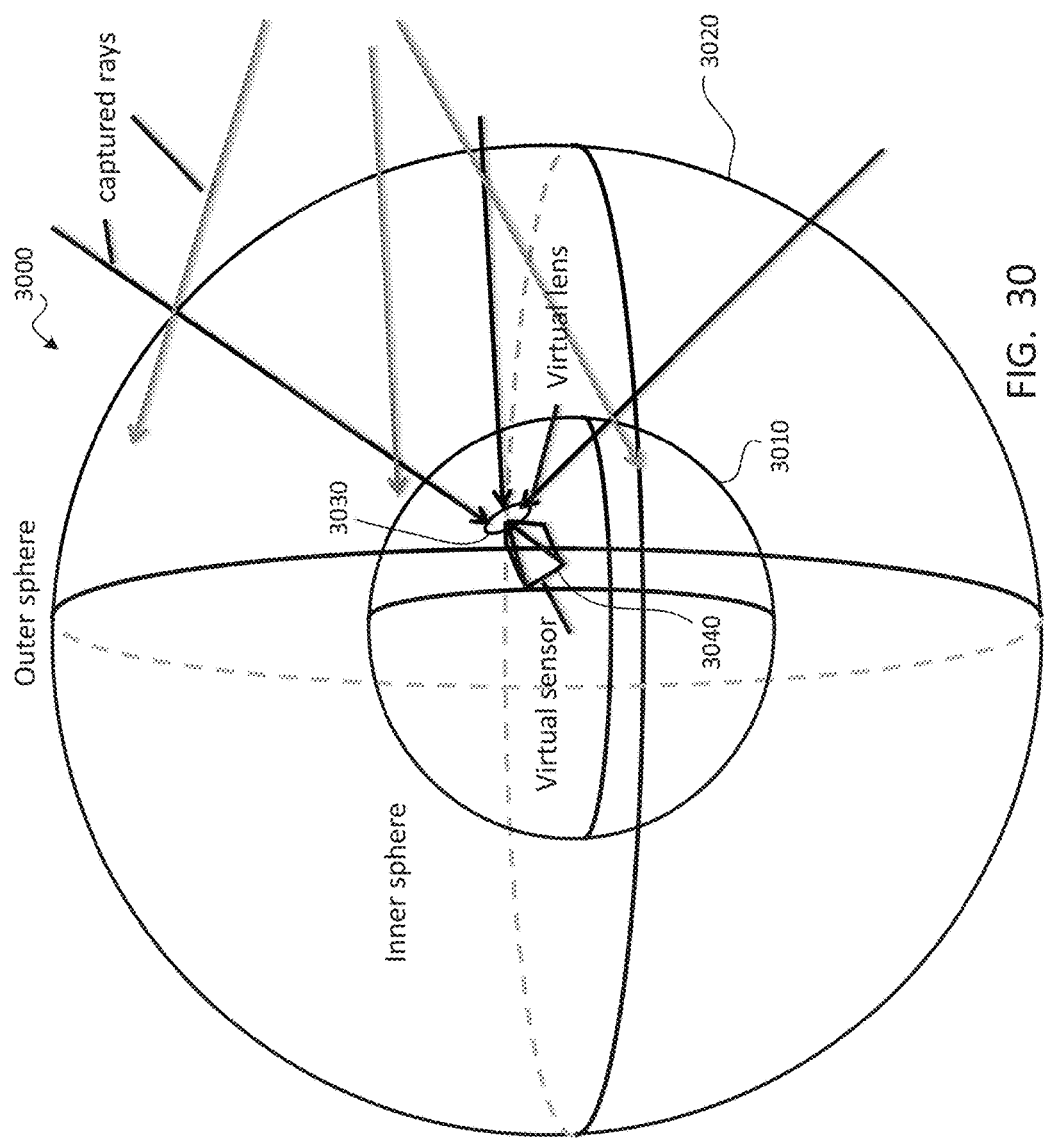
FIG. 30 is a conceptual drawing showing a virtual camera system based on a more complete model of a virtual lens, according to one embodiment.

In another embodiment, the virtual lens and/or the virtual sensor may be fully modeled as a more complete optical system. This embodiment is conceptually shown in FIG. 30, which illustrates modeling in the context of a coordinate system 3000 having an inner sphere 3010 and an outer sphere 3020. The embodiment may consist of a virtual sensor 3040 and a virtual lens 3030, each with size and shape in Cartesian coordinates. In this case, rays in the captured light-field volume may be traced through the virtual lens 3030 and ultimately intersected (or not) with the virtual sensor 3040.

The virtual sensor 3040 may consist of virtual optical components, including one or more virtual lenses, virtual reflectors, a virtual aperture stop, and/or additional components or aspects for modeling. In this embodiment, rays that intersect with the entrance to the virtual lens 3030 may be optically traced through the virtual lens 3030 and onto the surface of the virtual sensor 3040.

Figure 31:
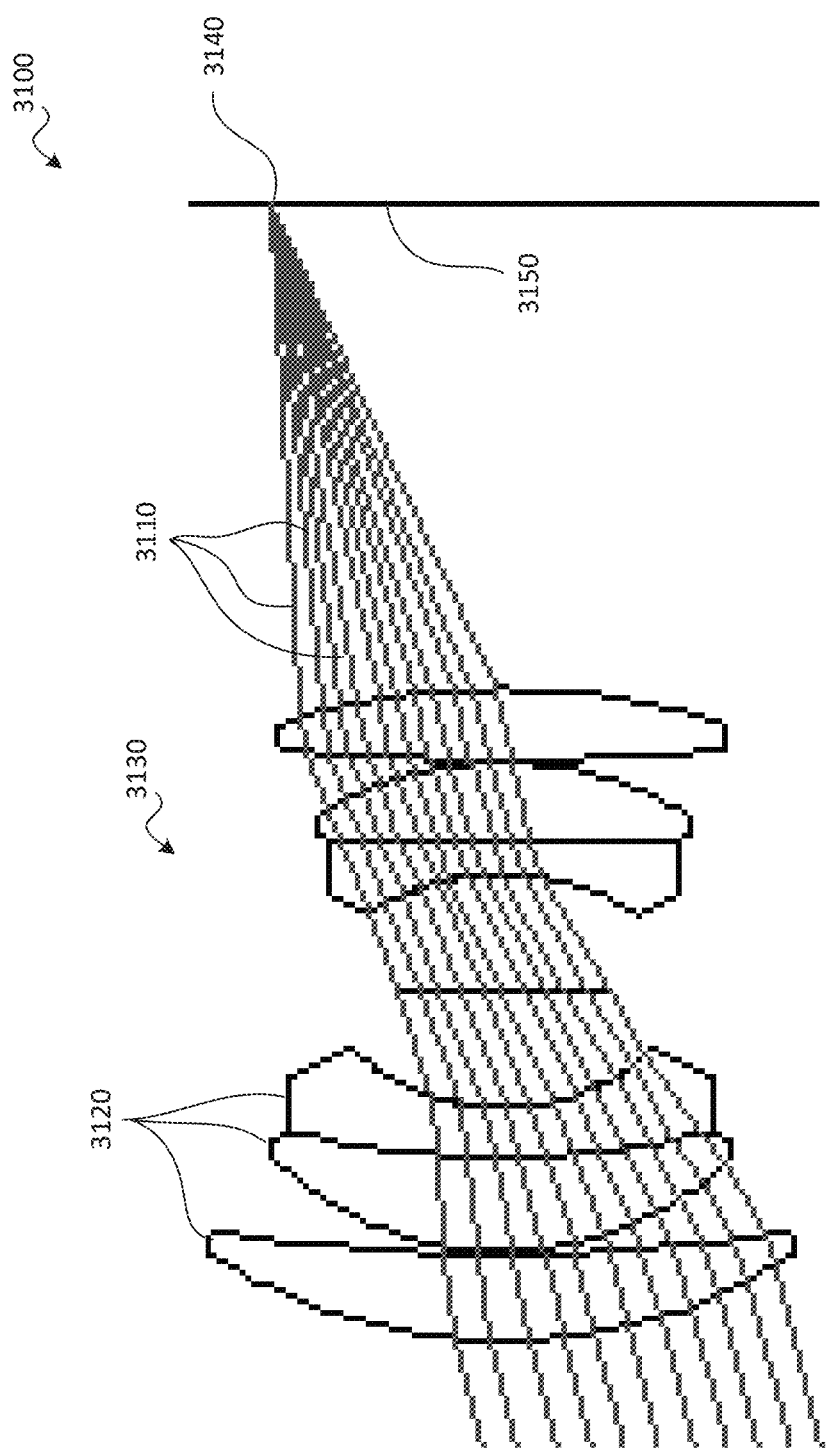
FIG. 31 is a diagram showing example output from an optical ray tracer, according to one embodiment.

FIG. 31 shows exemplary output 3100 from an optical ray tracer. In the image, a set of rays 3110 are refracted through the elements 3120 in a lens 3130 and traced to the intersection point 3140 on a virtual sensor surface 3150.

The following example assumes a set of captured rays parameterized in light-field volume coordinates, rays, a virtual lens, vl, that contains a virtual entrance pupil, vep, and a rectangular virtual sensor, vs, with width w and height h. An algorithm to create the virtual view may then be the following:

```
view_image = new Image(w, h)
view_image.clear( )
for each ray in rays
    cart_ray = convert_to_cartesian3d(ray)
    if (intersects(cart_ray, vep))
        image_ray = trace_ray_through_lens(cart_ray, vl)
        if (intersects(image_ray, vs))
            point = intersection(cart_ray, vs)
            norm_point = normalize_point_relative_to(vs)
            sensor_x = norm_point.x * w
            sensor_y = norm_point.y * h
            accumulate(view_image, x, y, image_ray.color)
    Where:
    • intersects returns true if the supplied ray intersects with
      the surface
    • intersection returns the location, in Cartesian coordinates,
      of intersection
    • trace_ray_through_lens traces a ray through the virtual lens
    • normalize_point_relative_to normalizes a Cartesian 3D point
      into a normalized 2D location on the provided surface. Values
      are in x = [0,1] and y = [0,1]
    • accumulate accumulates the color values assigned to the ray
      into the image. This method may use any sort of
      interpolation, including nearest neighbor, bilinear, bicubic,
      or any other method.
```

Notably, optical ray tracers (for example, commercial applications such as ZEMAX) may function with varying levels of complexity as the behavior of light in the physical world is extremely complex. The above examples assume that one ray of light from the world equates to a single ray of light after passing through an optical system. Many optical modeling programs will model additional complexities such as chromatic dispersion, diffraction, reflections, and absorption.

Synthetic Ray Generation

In some embodiments of the capture system, certain areas of the light-field volume may not be adequately sampled. For example, FIG. 15 shows a tiled array 1500 in the form of a ring arrangement of light-field cameras 1530 in which gaps exist between the entrance pupils of the light-field cameras 1530 in the tiled array 1500. Light from the world that intersects with the tiled array 1500 in the gaps will not be recorded. While the sizes of the gaps in a light-field capture system may be extremely small relative to those of prior art systems, these gaps may still exist in many embodiments. When virtual views are generated that require ray data from the inadequately sampled regions of the light-field volume, these rays may be synthetically generated.

In one embodiment, rays are synthetically generated using simple interpolation between the closest available samples based on their light-field volume coordinates. Simple interpolation may work well when the difference between the location of the available samples and the desired sample is small. Notably, small is a relative term, and dependent on many factors, including the resolution of the virtual view, the location of physical subjects in the world at the time of capture, the application's tolerance for errors, and a host of other factors. The simple interpolation may generate a new sample value based on a weighted average of the neighboring rays. The weighting function may use nearest neighbor interpolation, linear interpolation, cubic interpolation, median filtering or any other approach now known or later developed.

In another embodiment, rays are synthetically generated based on a three-dimensional model and/or a depth map of the world at the time of capture. Notably, in a system that is well-calibrated relative to the world, a depth map and a three-dimensional model may be easily interchangeable. For the duration of the description, the term depth map will be used. In this embodiment, a depth map may be generated algorithmically from the captured light-field volume.

Depth map generation from light-field data and/or multiple overlapping images is a complicated problem, but there are many existing algorithms that attempt to solve the problem. See, for example, the above-cited U.S. patent application Ser. No. 14/302,826 for "Depth Determination for Light Field Images", filed Jun. 12, 2014 and issued as U.S. Pat. No. 8,988,317 on Mar. 24, 2015, the disclosure of which is incorporated herein by reference.

Once a depth map has been generated, a virtual synthetic ray may be traced until it reaches an intersection with the depth map. In this embodiment, the closest available samples from the captured light-field volume may be the rays in the light-field that intersect with the depth map closest to the intersection point of the synthetic ray. In one embodiment, the value assigned to the synthetic ray may be a new sample value based on a weighted average of the neighboring rays. The weighting function may use nearest neighbor interpolation, linear interpolation, cubic interpolation, median filtering, and/or any other approach now known or later developed.

In another embodiment, a pixel infill algorithm may be used if insufficient neighboring rays are found within an acceptable distance. This situation may occur in cases of occlusion. For example, a foreground object may block the view of the background from the perspective of the physical cameras in the capture system. However, the synthetic ray may intersect with the background object in the occluded region. As no color information is available at that location on the background object, the value for the color of the synthetic ray may be guessed or estimated using an infill algorithm. Any suitable pixel infill algorithms may be used. One exemplary pixel infill algorithm is "PatchMatch," with details as described in C. Barnes et al., PatchMatch: A Randomized Correspondence Algorithm for Structural Image Editing ACM Transactions on Graphics (Proc. SIGGRAPH), August 2009.

Virtual View Generation Acceleration Structures

In some cases, the algorithms for virtual view generation cited above may not execute efficiently enough, may not execute quickly enough, and/or may require too much data or bandwidth to properly enable viewing applications. To better enable efficient processing and/or viewing, the captured data may be reorganized or resampled as appropriate.

In one embodiment, the captured data may be resampled into a regularized format. In one specific embodiment, the light-field is resampled into a four-dimensional table, with separate dimensions for rho1, theta1, rho2 and theta2. The size of the resampled table will depend on many factors, including but not limited to the intended output resolution of the virtual views and the number of discrete viewpoints from which virtual views may be generated. In one embodiment, the intended linear output resolution of a virtual view may be 1000 pixels, and the field-of-view may be 100°. This may result in a total sampling of 3600 pixels for 360°. In the same embodiment, it may be desired that 100 discrete viewpoints can be generated in a single dimension. In this case, the size of the four-dimensional table may be 100×100×3600×3600. Notably, large sections of the table may be empty of data, and the table may be dramatically compressed relative to its nominal size. The resampled, regularized data structure may be generated through the use of "splatting" algorithms, "gathering" algorithms, or any other algorithm or technique.

In an embodiment using a "splatting" algorithm, the resampling process may begin with a four-dimensional table initialized with empty values. The values corresponding to each ray in the captured data set may then be added into the table at the data index(es) that best match the four-dimensional coordinates of the ray. The adding may use any interpolation algorithm to accumulate the values, including but not limited to a nearest neighbor algorithm, a quadlinear algorithm, a quadcubic algorithm, and/or combinations or variations thereof.

In an embodiment using a "gathering" algorithm, the value for each data index in the 4D table is calculated by interpolating from the nearest rays in the captured light-field data set. In one specific embodiment, the value at each index is a weighted sum of all rays that have coordinates within a four-dimensional hypercube centered at the coordinates corresponding to the data index. The weighting function may use nearest neighbor interpolation, linear interpolation, cubic interpolation, median filtering or any other approach now known or later developed.

After the captured light-field data set has been resampled into the four-dimensional table, there may be locations in the table with values that remain uninitialized or that have accumulated very little data. These locations may be referred to as "holes". In some cases, it may be desirable that the "holes" are filled in prior to the performance of additional processing like virtual view generation. In one embodiment, holes may be filled in using four-dimensional interpolation techniques in which values for the holes are interpolated based on the values of their neighbors in the four-dimensional table. The interpolation may use any type of filter kernel function, including but limited to linear functions, median filter functions, cubic functions, and/or sync functions. The filter kernel may be of any size.

In another embodiment, "hole" data may be filled in using pixel infill algorithms. In a specific example, to fill hole data for the index with coordinates (rho1, theta1, rho2, theta2), a two-dimensional slice of data may be generated by keeping rho1 and theta1 fixed. A pixel infill algorithm (for example, PatchMatch) may be applied to fill in the missing data in the two-dimensional slice, and the generated data values may then be added into the four-dimensional table.

In one embodiment, the resampled four-dimensional table may be divided and stored in pieces. In some embodiments, each piece may correspond with a file stored in a file system. As an example, the full four-dimensional table may be broken up by evenly in four pieces by storing ¼×¼×¼×¼ of the full table in each piece. One advantage of this type of approach may be that entire pieces may be completely empty, and may thus be discarded. Another advantage may be that less information may need to be loaded in order to generate a virtual view.

In one embodiment, a set of virtual views is precomputed and stored. In some embodiments, a sufficient number of virtual views may be precomputed to enable the display of any needed viewpoint from the precomputed virtual views. Thus, rather than generating virtual views in real-time, the viewing software may read and display the precomputed virtual views. Alternatively, some precomputed virtual views may be used in combination with real time generation of other virtual views.

Conventional Camera Arrays

In some embodiments, conventional, two-dimensional cameras may be used in order to provide additional spatial resolution, cost reduction, more manageable data storage, processing, and/or transmission, and/or other benefits. Advantageously, such conventional cameras may be arranged in a tiled array similar to those described above for light-field cameras. Such arrays may also be arranged to provide continuous, or nearly continuous, fields-of-view.

Referring to FIGS. 35A through 35D, perspective and side elevation views depict a tiled array 3500 of conventional cameras, according to one embodiment. As shown, the tiled array 3500 may have three different types of cameras, including upper view cameras 3510, center view cameras 3520, and lower view cameras 3530. In the tiled array 3500, the upper view cameras 3510, the center view cameras 3520, and the lower view cameras 3530 may be arranged in an alternating pattern, with a center view camera 3520 between each upper view camera 3510 and each lower view camera 3530. Thus, the tiled array 3500 may have as many of the center view cameras 3520 as it has of the lower view cameras 3530 and the upper view cameras 3510, combined. The larger number of center view cameras 3520 may provide enhanced and/or more complete imaging for the center view, in which the viewer of a virtual reality experience is likely to spend the majority of his or her viewing time.

As shown in FIGS. 35B and 35D, the upper view cameras 3510 and the lower view cameras 3530 may each have a relatively large field-of-view 3540, which may be 120° or larger. As shown in FIG. 35C, the center view cameras 3520 may each have a field-of-view 3550 that approximates that of the headset the user will be wearing to view the virtual reality experience. This field-of-view 3550 may be, for example, 90° to 110°. The placement of the upper view cameras 3510 and the lower view cameras 3530 may be relatively sparse, by comparison with that of the center view cameras 3520, as described above.

Figure 36:
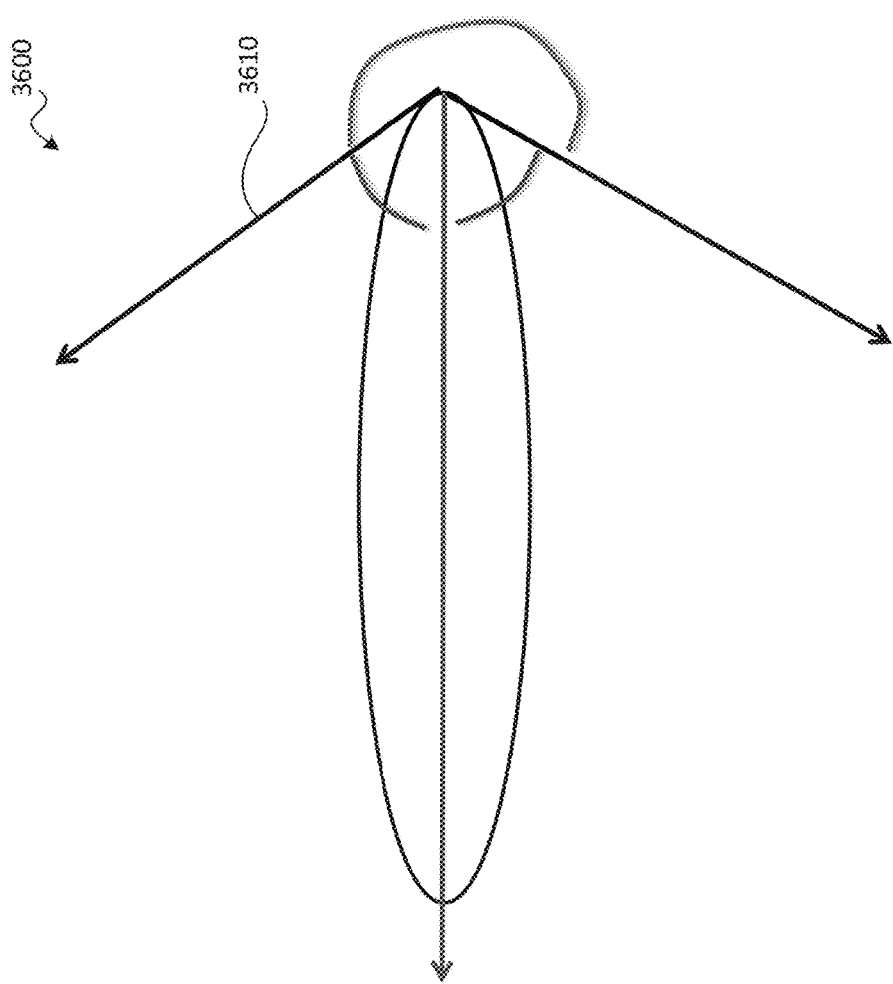
FIG. 36 is a diagram that depicts stitching that may be used to provide an extended vertical field-of-view.

Referring to FIG. 36, a diagram 3600 depicts stitching that may be used to provide an extended vertical field-of-view 3610. A 200° or greater vertical field-of-view 3610 may be obtained at any point along the tiled array 3500 with only "close" stitching. Additional vertical field-of-view may be constructed with "far" stitching. Advantageously, the tiled array 3500 may have full support for three angular degrees of freedom and stereo viewing. Further, the tiled array 3500 may provide limited support for horizontal parallax and/or limited stitching, except for extreme cases. Alternative embodiments may provide support for head tilt, vertical parallax, and/or forward/backward motion. One embodiment that provides some of these benefits will be shown and described in connection with FIG. 37.

Figure 37:
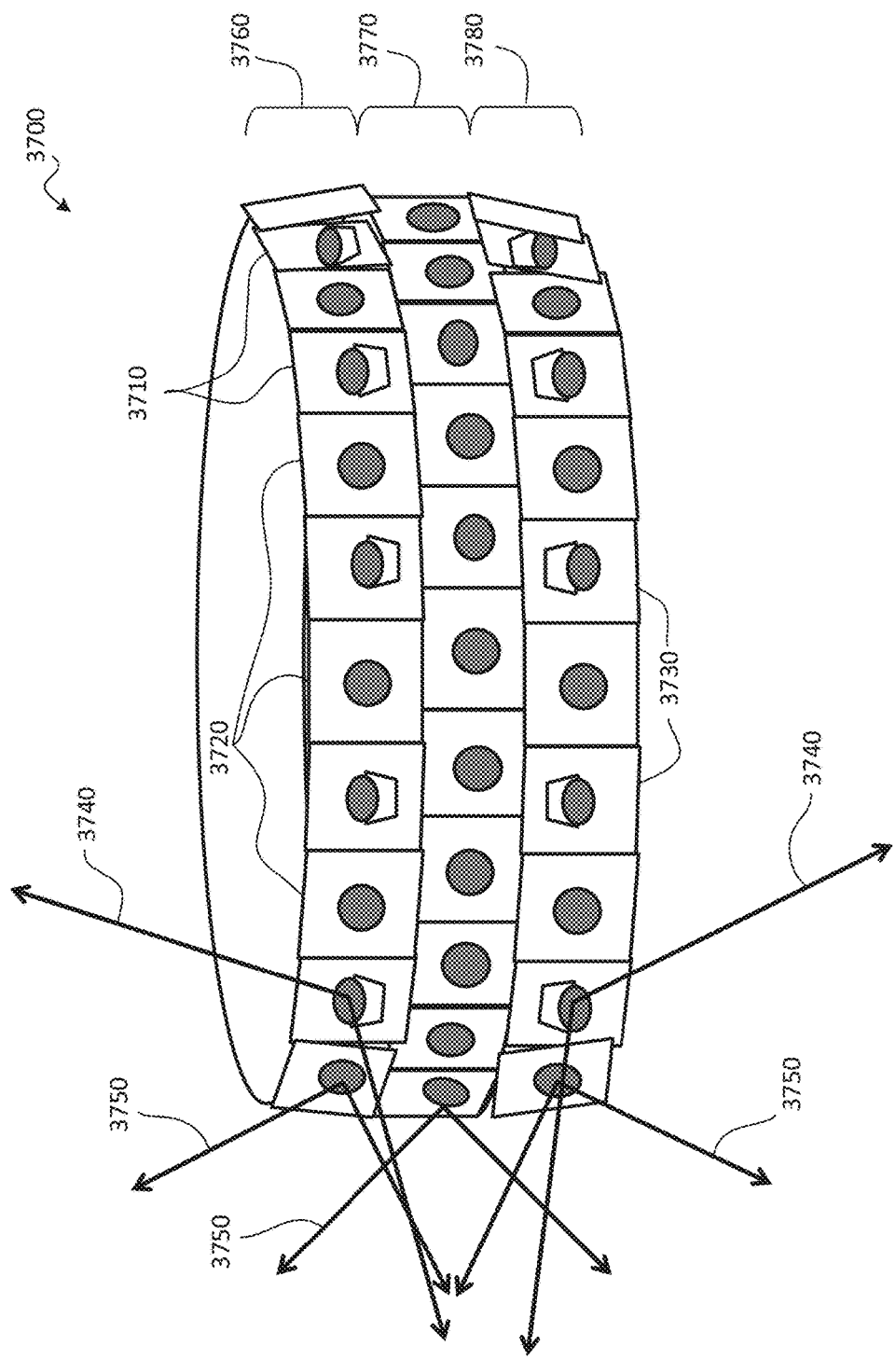
FIG. 37 is a perspective view depicting a tiled array according to another alternative embodiment.

Referring to FIG. 37, a perspective view depicts a tiled array 3700 according to another alternative embodiment. As shown, the tiled array 3700 may have three different types of cameras, including upper view cameras 3710, center view cameras 3720, and lower view cameras 3730. As in the previous embodiment, each of the upper view cameras 3710 and the lower view cameras 3730 may have a field-of-view 3740 that is relatively large, for example, 120° or larger. Each of the center view cameras 3720 may have a field-of-view 3750 that is somewhat smaller, for example, 90° to 110°.

The upper view cameras 3710, the center view cameras 3720, and the lower view cameras 3730 may be arranged in three rows, including a top row 3760, a middle row 3770, and a bottom row 3780. In the top row 3760, the upper view cameras 3710 and the center view cameras 3720 may be arranged in an alternating pattern. In the middle row 3770, only the center view cameras 3720 may be present. In the bottom row, 3780, the lower view cameras 3730 and the center view cameras 3720 may be arranged in an alternating pattern similar to that of the upper view cameras 3710 and the center view cameras 3720 of the top row 3760. The tiled array 3700 may have approximately four times as many of the center view cameras 3720 as of each of the upper view cameras 3710 and the lower view cameras 3730. Thus, as in the previous embodiment, more complete imaging may be provided for the center views, in which the viewer of a virtual reality experience is likely to spend the majority of his or her viewing time. Notably, the center view cameras 3720 on the top row 3760 may be tilted upward, and the center view cameras 3720 on the bottom row 3780 may be tilted downward. This tilt may provide enhanced vertical stitching and/or an enhanced vertical field-of-view.

Further, the tiled array 3700 may have three full degrees of freedom, and three limited degrees of freedom. The tiled array 3700 may provide support for head tilt via the enhanced vertical field-of-view, and may further provide limited vertical parallax. Further, the tiled array 3700 may support limited forward/backward movement.

In other alternative embodiments, various alterations may be made in order to accommodate user needs or budgetary restrictions. For example, fewer cameras may be used; in some tiled array embodiments, only ten to twenty cameras may be present. It may be advantageous to use smaller cameras with smaller pixel sizes. This and other modifications may be used to reduce the overall size of the tiled array. More horizontal and/or vertical stitching may be used.

According to one exemplary embodiment, approximately forty cameras may be used. The cameras may be, for example, Pt Grey Grasshopper 3 machine vision cameras, with CMOSIS MCV3600 sensors, USB 3.0 connectivity, and one-inch, 2 k×2 k square image sensors, with 90 frames per second (FPS) capture and data transfer capability. The data transfer rate for raw image data may be 14.4 GB/s (60 FPS at 12 bits), and a USB 3.0 to PCIE adapter may be used. Each USB 3.0 interface may receive the image data for one camera.

The tiled array may have a total resolution of 160 megapixels. Each of the center view cameras may have a Kowa 6 mm lens with a 90° field-of-view. Each of the upper view cameras and lower view cameras may have a Fujinon 2.7 mm fisheye lens with a field-of-view of 180° or more. In alternative embodiments, more compact lenses may be used to reduce the overall size of the tiled array.

Conventional cameras may be arranged in tiled arrays according to a wide variety of tiled arrays not specifically described herein. With the aid of the present disclosure, a person of skill in the art would recognize the existence of many variations of the tiled array 3500 of FIG. 35 and the tiled array 3700 that may provide unique advantages for capturing virtual reality video streams.

Spatial Random Access Enabled Volumetric Video—Introduction

As described in the background, the capture process for volumetric video may result in the generation of large quantities of volumetric video data. The amount of volumetric video data may strain the storage, bandwidth, and/or processing capabilities of client computing systems and/or networks. Accordingly, in at least one embodiment, the volumetric video data may be divided into portions, and only the portion needed, or likely to be needed soon, by a viewer may be delivered.

Specifically, at any given time, a viewer is only able to observe a field-of-view (FoV) inside the viewing volume. In at least one embodiment, the system only fetches and renders the needed FoV from the video volume data. To address the challenges of data and complexity, a spatial random access coding and viewing scheme may be used to allow arbitrary access to a viewer's desired FoV on a compressed volumetric video stream. Inter-vantage and inter spatial-layer predictions may also be used to help improve the system's coding efficiency.

Advantages of such a coding and/or viewing scheme may include, but are not limited to, the following:
Reduction of the bandwidth requirement for transmission and playback;
Provision of fast decoding performance for responsive playback; and/or
Enablement of low-latency spatial random access for interactive navigation inside the viewing volume.

Spatial Random Access Enabled Volumetric Video—Encoding

Several different methods may be used to apportion the video data, associate the video data with the corresponding vantage, encode the video data, and/or compress the video data for subsequent transmission. Some exemplary methods will be shown and described, as follows. These can be implemented singly or in any suitable combination.

Data Representation—Vantages

Numerous data representations are possible for video data for fully immersive virtual reality and/or augmented reality (hereafter "immersive video"). "Immersive video" may also be referred to as "volumetric video" where there is a volume of viewpoints from which the views presented to the user can be generated. In some data representations, digital sampling of all view-dependent color and depth information may be carried out for any visible surfaces in a given viewing volume. Such sampling representation may provide sufficient data to render any arbitrary viewpoints within the viewing space. Viewers may enjoy smooth view-dependent lighting transitions and artifacts-free occlusion filling when switching between different viewpoints.

As described in the above-cited U.S. patent application Ser. No. 15/590,841, for "Vantage Generation", for ease of spatial random access and viewport rendering, an image-based rendering system according to the present disclosure may represent immersive video data by creating a three-dimensional sampling grid over the viewing volume. Each point of the sampling grid is called a "vantage." Various vantage arrangements may be used, such as a rectangular grid, a polar (spherical) matrix, a cylindrical matrix, and/or an irregular matrix. Each vantage may contain a projected view, such as an omnidirectional view projected onto the interior of a sphere, of the scene at a given coordinate in the sampling grid. This projected view may be encoded into video data for that particular vantage. It may contain color, texture, and/or depth information. Additionally or alternatively, the projected view may be created using the virtual view generated from the light-field volume data, as discussed in the previous section.

To provide smooth transitions for view-dependent lighting and rendering, the system may perform a barycentric interpolation of color between four vantages whose locations form a tetrahedron that includes the view position for each eye view. Other fusion techniques may alternatively or additionally be used to interpolate between vantages. The result may be the combination of any number of vantages to generate viewpoint video data for a viewpoint that is not necessarily located at any of the vantages.

Tile-Based Vantage Coding

A positional tracking video experience may require more than hundreds of high resolution omnidirectional vantages across the viewing volume. This may require at least two orders of magnitude more storage space, by comparison with conventional two-dimensional videos. With color and depth information represented in each of the vantages, image-based and/or video-based compression techniques, such as JPEG, H.264/AVC and/or HEVC, may be applied to the color and/or depth channels to remove any spatial and temporal redundancies within a single vantage stream, as well as redundancies between different vantage streams.

In many situations, during decoding and rendering, there may be a need for multiple vantages to be loaded and rendered in real-time at a high frame rate. A compressed vantage, which requires a decoding procedure, may further put computation and memory pressure on the client's system. To relieve this pressure, in at least one embodiment, the system and method may only decode and render the region of vantages within a viewer's FoV. Spatial random access may be facilitated by dividing a vantage into multiple tiles. Each tile may be independently and/or jointly encoded with the system's vantage encoder using image-based and/or video-based compression techniques, or encoded through the use of any other compression techniques. When a user is accessing an arbitrary viewpoint inside a viewing volume, the system may find the corresponding vantages within the sampling grid and fetch the corresponding tiles inside the vantages. A tile-based representation may also offer inherent parallelizability for multi-core systems. The tiling scheme used for vantage compression may be different from the tiling scheme used for rendering or culling used by the rendering pipeline. Notably, tiling may be used to expedite delivery, decoding, and/or display of video data, independently of the use of compression. Tiling may expedite playback and rendering independently of the manner in which tiling is performed for encoding and/or transmission. In some embodiments, the tiling scheme used for encoding and transmission may also be used be used for playback and rendering. A tiled rendering scheme may help reduce computation complexity and provide stability to meet time-varying demands on the CPU and/or GPU of a computing system.

Figure 52:
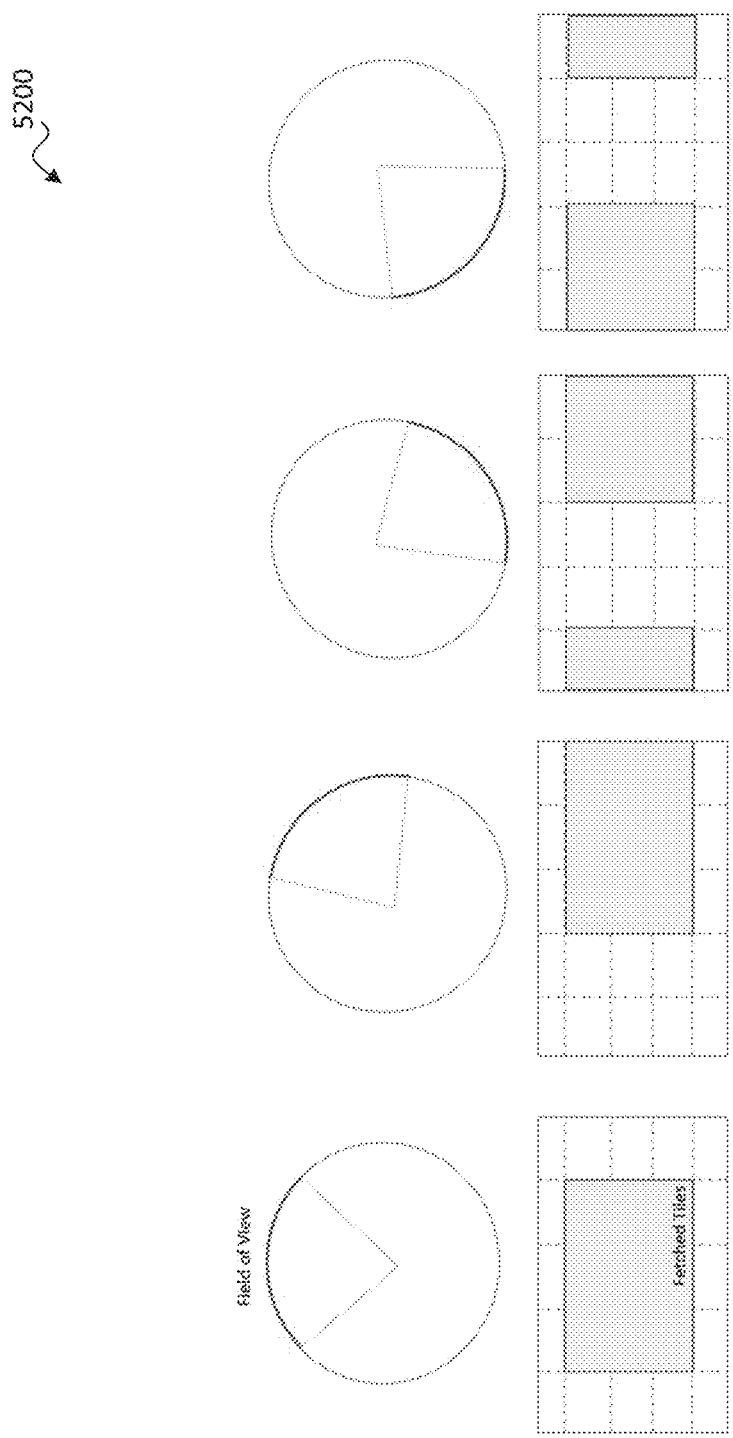
FIG. 52 is a series of graphs depict a tile-based scheme, according to one embodiment.

Referring to FIG. 52, a series of graphs depict a tile-based scheme 5200, according to one embodiment. The tile-based scheme 5200 may allow spatial random access on a single vantage for any field of view within a 360° field, i.e., any viewing direction originating at the vantage. FIG. 52 illustrates fetched tiles, on the bottom row, that correspond to various input fields, on the top row, showing a top-down view of the input field-of-view projected on a single spherical vantage. Each planar image is projected to a planar image from a single omnidirectional spherical vantage.

Multiple Resolution Layers

Coding dependencies, system processing, and/or network transmission may introduce spatial random access latency to the system. Spatial random access to different tiles may be needed in certain instances, such as when the viewer switches the FoV in a virtual reality experience by turning his or her head or when the viewer moves to a new region along the vantage sampling grid. To prevent playback discontinuity in such situations, the system and method disclosed herein may pre-load the tiles outside a viewer's FoV. However, this may increase the decoding load on the client system and limit the complexity savings provided by the compression and/or apportionment of the video data. Accordingly, the pre-fetched tiles may instead be provided at a lower spatial resolution, so as to conceal switching latency.

In addition, clients with different constraints, such as network bandwidth, display resolution and computation capabilities, may require different quality representation of the tiles. In at least one embodiment, the system and method provide such different quality representations by displaying the tiles at different resolutions and/or delivering the tiles at different bitrates. To meet these demands, a multi-spatial resolution layer scheme may be used. A system according to the present disclosure may have any number of spatial resolution layers. Further, all tiles need not necessarily have the same number of spatial resolution layers; rather, different tiles may have different numbers of spatial resolution layers. Different tiles may additionally or alternatively have different bit rates, spatial resolutions, frame resolutions, shapes, and/or aspect ratios. A spatial layered scheme may also provide error-resilience against data corruption and network packet losses.

Figure 38:
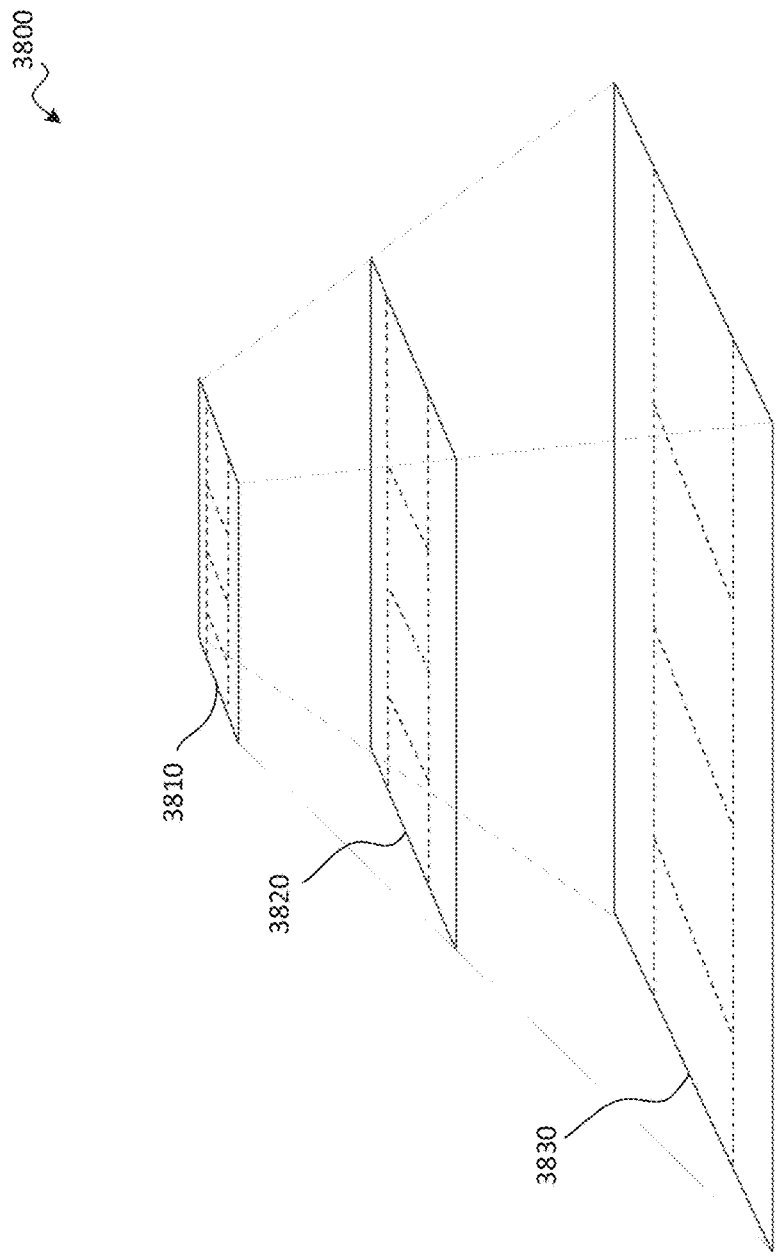
FIG. 38 depicts a tiling scheme representing some or all of the view encoded in the video data for a single vantage, including three layers, according to one embodiment.

FIG. 38 illustrates a simplified example of tiles with multiple spatial layers. A tile 3800 is shown, representing some or all of the view encoded in the video data for a single vantage, including three layers, according to one embodiment. Specifically, the tile 3800 may have a first layer 3810, a second layer 3820, and a third layer 3830. The first layer 3810 may be a low resolution layer, the second layer 3820 may be a medium resolution layer, and the third layer 3830 may be a high resolution layer.

Thus, the first layer 3810 may be transmitted and used to generate and display the viewpoint video data when bandwidth, storage, and/or computational limits are stringent. The second layer 3820 may be transmitted and used to generate and display the viewpoint video data when bandwidth, storage, and/or computational limits are moderate. The third layer 3830 may be transmitted and used to generate and display the viewpoint video data when bandwidth, storage, and/or computational limits are less significant.

Tiling Design for Equirectangular Projected Vantage

In some embodiments, equirectangular projection can be used to project a given scene onto each vantage. In equirectangular projection, a panoramic projection may be formed from a sphere onto a plane. This type of projection may create non-uniform sampling densities. Due to constant spacing of latitude, this projection may have a constant vertical sampling density on the sphere. However, horizontally, each latitude $\phi$, may be stretched to a unit length to fit in a rectangular projection, resulting in a horizontal sampling density of $1/\cos(\phi)$. Therefore, to reduce the incidence of over-sampling in equirectangular projection, there may be a need to scale down the horizontal resolution of each tile according to the latitude location of the tile. This resampling rate may enable bit-rate reduction and/or maintain uniform spatial sampling across tiles.

Figure 53:
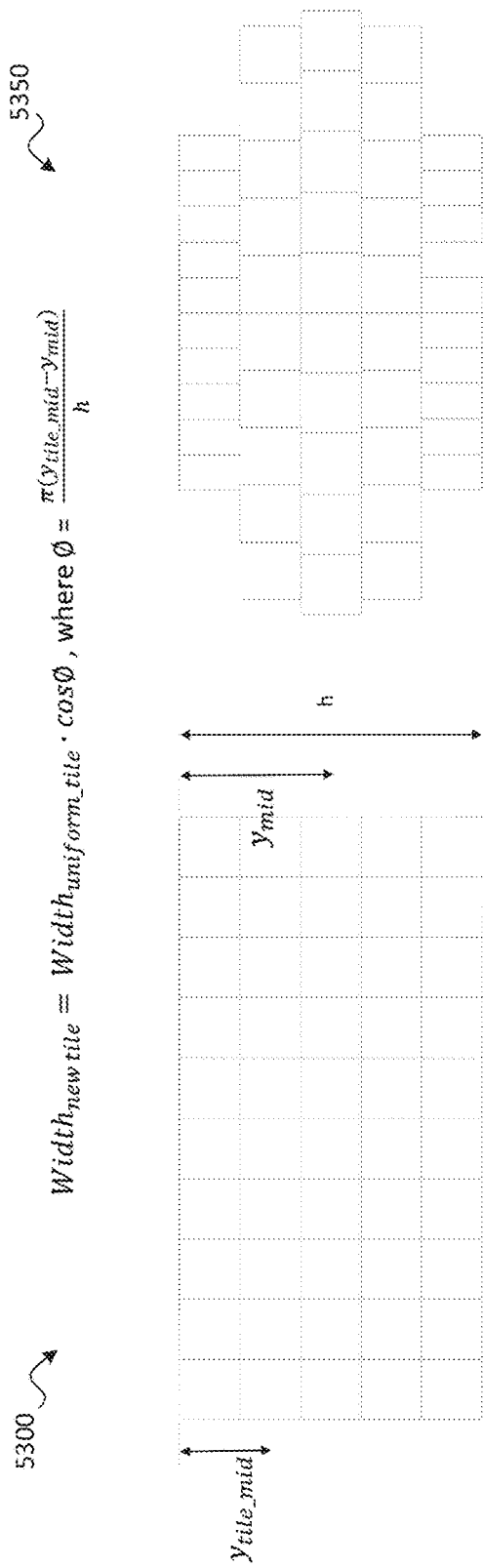
FIGS. 53A and 53B depict exemplary tiling schemes, according to certain embodiments.

Referring to FIGS. 53A and 53B, exemplary tiling schemes 5300 and 5350 are depicted, according to certain embodiments. The tiling scheme 5300 is a uniform equirectangular tiling scheme, and the tiling scheme is an equirectangular tiling scheme with reduced horizontal sampling at the top and bottom. The formula shown in FIGS. 53A and 53B may be used to reduce the width of some of the tiles of the tiling scheme 5300 of FIG. 53A to obtain the reduced horizontal resolution in the tiling scheme 5350 of FIG. 53B.

In alternative embodiments, in addition to or instead of re-sampling the dimension of the tile, the length of pixels in scanline order may be resampled. Such resampling may enable the use of a uniform tiling scheme, as in FIG. 53A. As a result, the system can maintain constant solid angle quality. This scheme may leave some of the tiles near the poles blank (for example, the tiles at the corners of FIG. 53A); these tiles may optionally be skipped while encoding. However, under this scheme, the playback system may need to resample the pixels in scanline order for proper playback, which might incur extra system complexities.

Compression Scheme References

In recent years, a number of compression schemes have been developed specifically for two-dimensional, three-dimensional, and multi-view videos. Examples of various compression standards include:
1. G. Tech, Y. Chen, K. Müller, J.-R. Ohm, A. Vetro, and Y.-K. Wang, "Overview of the Multiview and 3D Extensions of High Efficiency Video Coding", IEEE Transactions on Circuits and Systems for Video Technology, Vol. 26, Issue 1, pp. 35-49, September 2015.
2. Jens-Rainer Ohm, Mihaela van der Schaar, John W. Woods, Interframe wavelet coding—motion picture representation for universal scalability, Signal Processing: Image Communication, Volume 19, Issue 9, October 2004, Pages 877-908, ISSN 0923-5965.
3. Chuo-Ling Chang, Xiaoqing Zhu, P. Ramanathan and B. Girod, "Light field compression using disparity-compensated lifting and shape adaptation," in IEEE Transactions on Image Processing, vol. 15, no. 4, pp. 793-806, April 2006.
4. K. Yamamoto et al., "Multiview Video Coding Using View Interpolation and Color Correction," in IEEE Transactions on Circuits and Systems for Video Technology, vol. 17, no. 11, pp. 1436-1449, November 2007.
5. Xiu, Xiaoyu, Derek Pang, and Jie Liang. "Rectification-Based View Interpolation and Extrapolation for Multiview Video Coding." IEEE TRANSACTIONS ON CIRCUITS AND SYSTEMS FOR VIDEO TECHNOLOGY 21.6 (2011): 693.
6. Park, Joon Hong, and Hyun Wook Park. "A mesh-based disparity representation method for view interpolation and stereo image compression." Image Processing, IEEE Transactions on 15.7 (2006): 1751-1762.
7. P. Merkle, K. Müller, D. Marpe and T. Wiegand, "Depth Intra Coding for 3D Video Based on Geometric Primitives," in IEEE Transactions on Circuits and Systems for Video Technology, vol. 26, no. 3, pp. 570-582, March 2016. doi: 10.1109/TCSVT.2015.2407791.
8. G. J. Sullivan, J. M. Boyce, Y. Chen, J.-R. Ohm, C. A. Segall, and A. Vetro, "Standardized Extensions of High Efficiency Video Coding", IEEE Journal on Selected Topics in Signal Processing, Vol. 7, no. 6, pp. 1001-1016, December 2013. http://ieeexploreleee.org/stamp/stamp.jsp?tp=&arnumber=6630053.
9. Aditya Mavlankar and Bernd Girod, "Spatial-Random-Access-Enabled Video Coding for Interactive Virtual Pan/Tilt/Zoom Functionality," IEEE Transactions on Circuits and Systems for Video Technology. vol. 21, no. 5, pp. 577-588, May 2011.
10. Mavlankar, P. Agrawal, D. Pang, S. Halawa, N. M. Cheung and B. Girod, "An interactive region-of-interest video streaming system for online lecture viewing," 2010 18th International Packet Video Workshop, Hong Kong, 2010, pp. 64-71.
11. Fraedrich, Roland, Michael Bauer, and Marc Stamminger. "Sequential Data Compression of Very Large Data in Volume Rendering." VMV. 2007.
12. Sohn, Bong-Soo, Chandrajit Bajaj, and Vinay Siddavanahalli. "Feature based volumetric video compression for interactive playback." Proceedings of the 2002 IEEE symposium on Volume visualization and graphics. IEEE Press, 2002.

Any of the foregoing may optionally be incorporated into the systems and methods disclosed herein. However, most image/video-based compression schemes exploit redundancies that exist, for example, between different camera views (inter-view) and between different video frames in time (inter-frame). Recent standards, such as MV/3D-HEVC, aim to compress video-plus-depth format more efficiently by addressing the unique characteristics of depth maps and exploiting redundancies between the views. Numbers 1, 7, and 8 above are examples of such standards.

The compression schemes set forth above generally rely on block-based disparity compensation and expect all input views to be aligned in a one-dimensional linear and coplanar arrangement Numbers 4 and 5 make use of the geometric relationship between different camera views and generate a synthesized reference view using view interpolation and extrapolation. Number 6 represents disparity information using meshes and yields higher coding gains with higher quality view interpolation for stereo image compression. Other prior techniques also utilize lifting-based wavelet decomposition to encode multi-view data by performing motion-compensated temporal filtering, as in Number 2 above, and disparity-compensated inter-view filtering, as in Number 3 above. However, all inter-view techniques described above have only applied on-camera data with planar projection. In terms of spatial random access enabled video, Numbers 9 and 10 provide a rectangular tiling scheme with multi-spatial resolution layers and enabled pan/tilt/zoom capabilities on high-resolution two-dimensional videos.

Prediction Types

Figure 39:
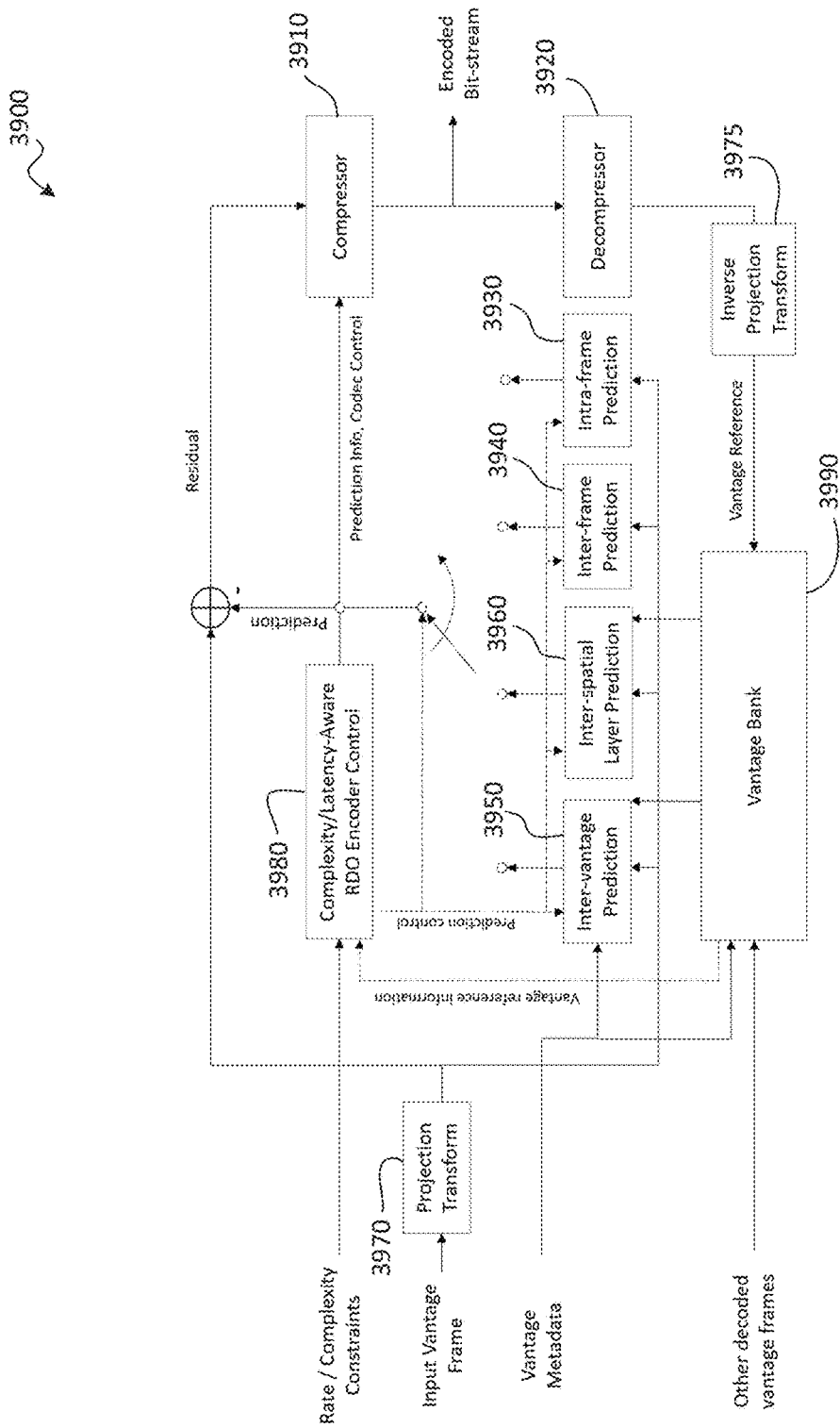
FIG. 39 depicts an encoder according to one embodiment.
Figure 40:
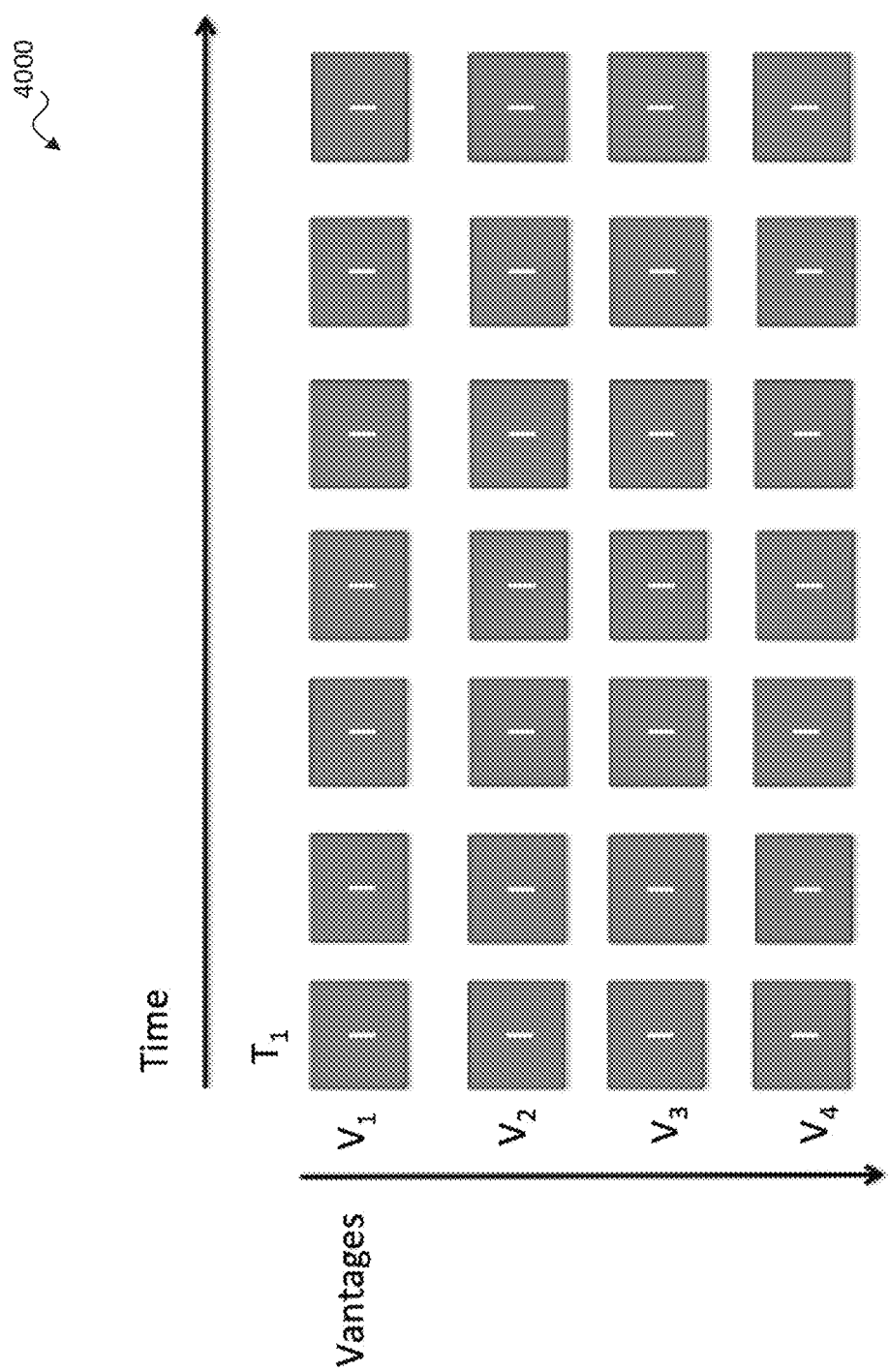
FIGS. 40 through 44 depict various vantage encoding schemes according to certain embodiments.
Figure 41:
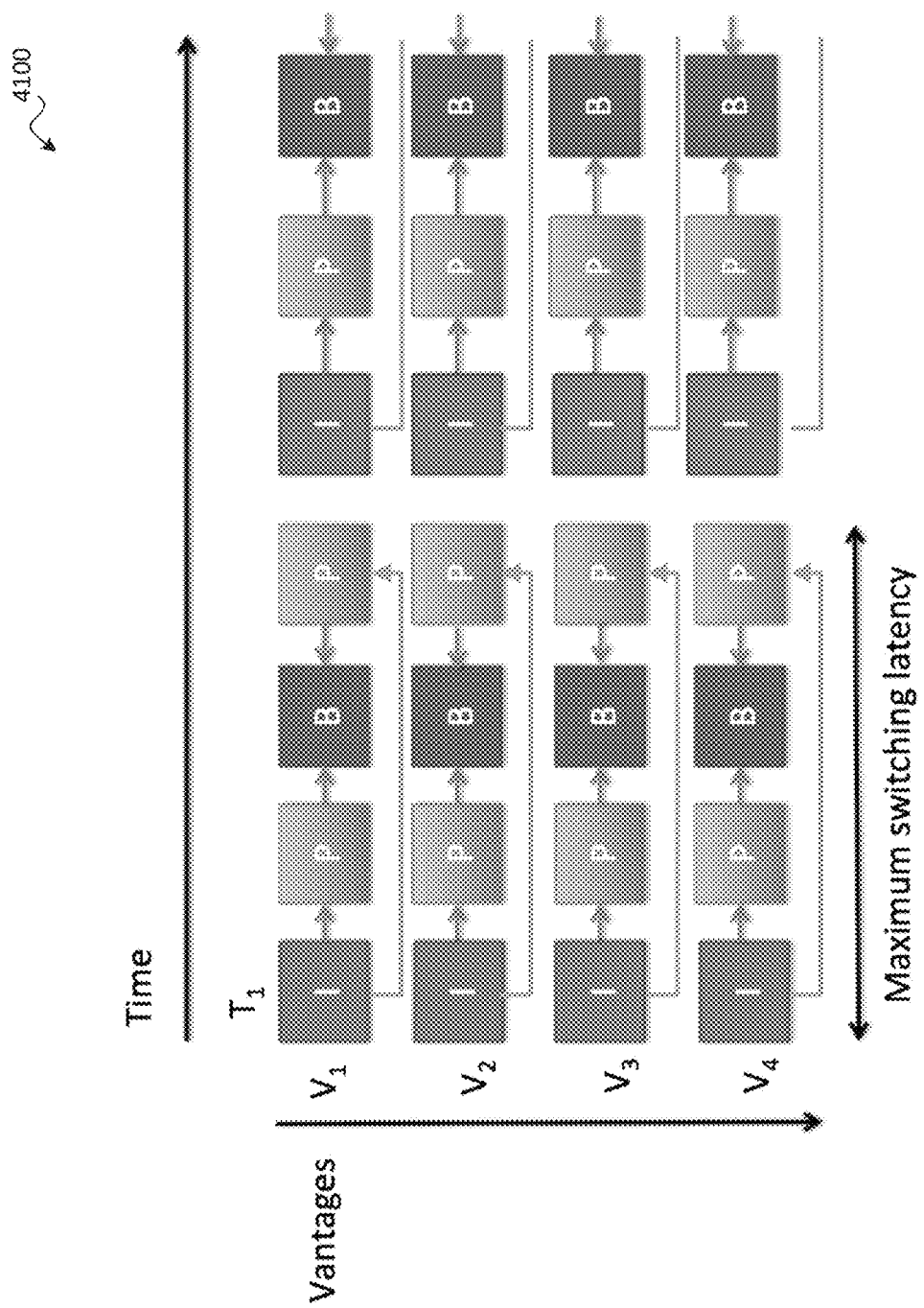
Figure 42:
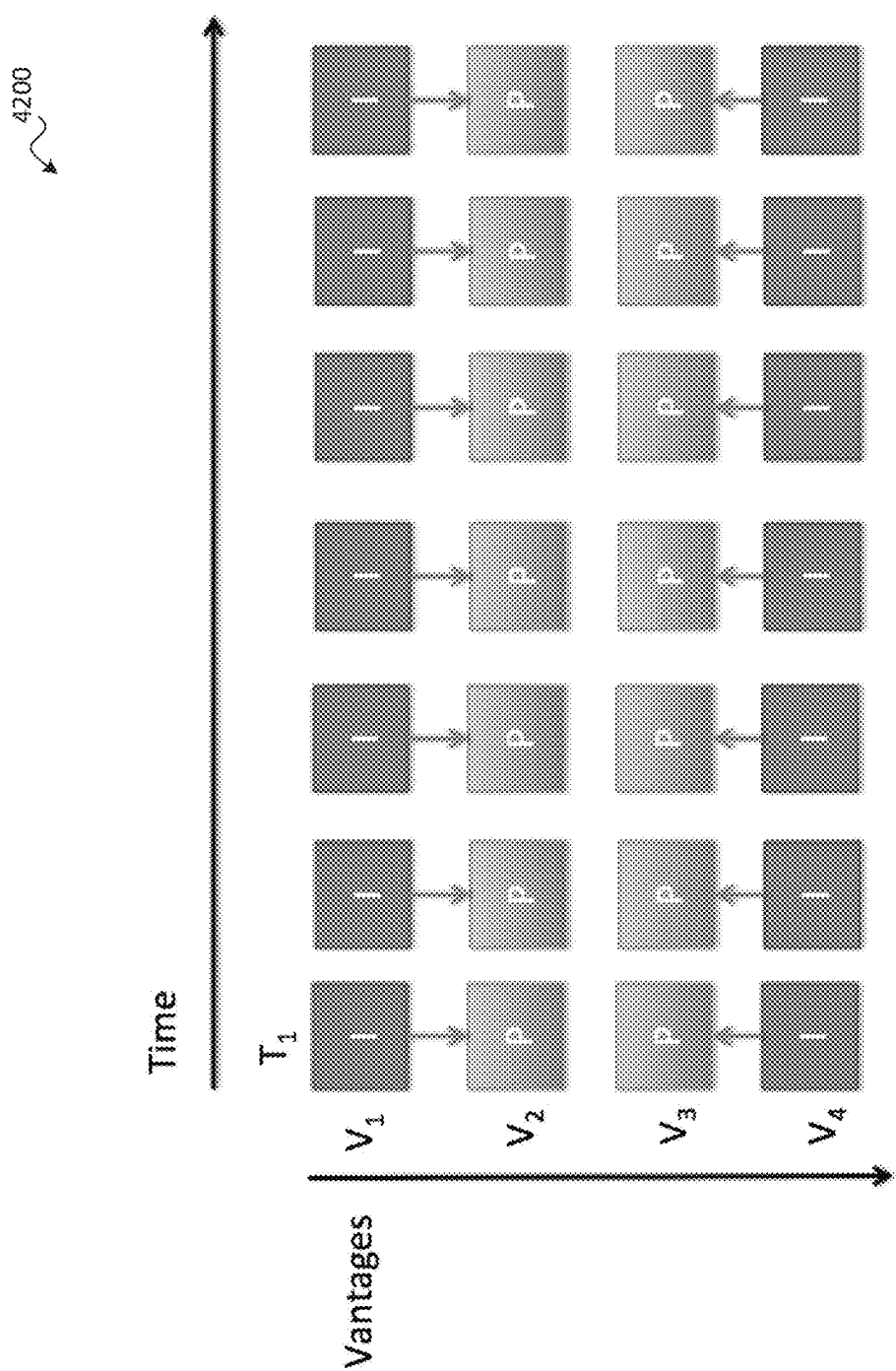
Figure 43:
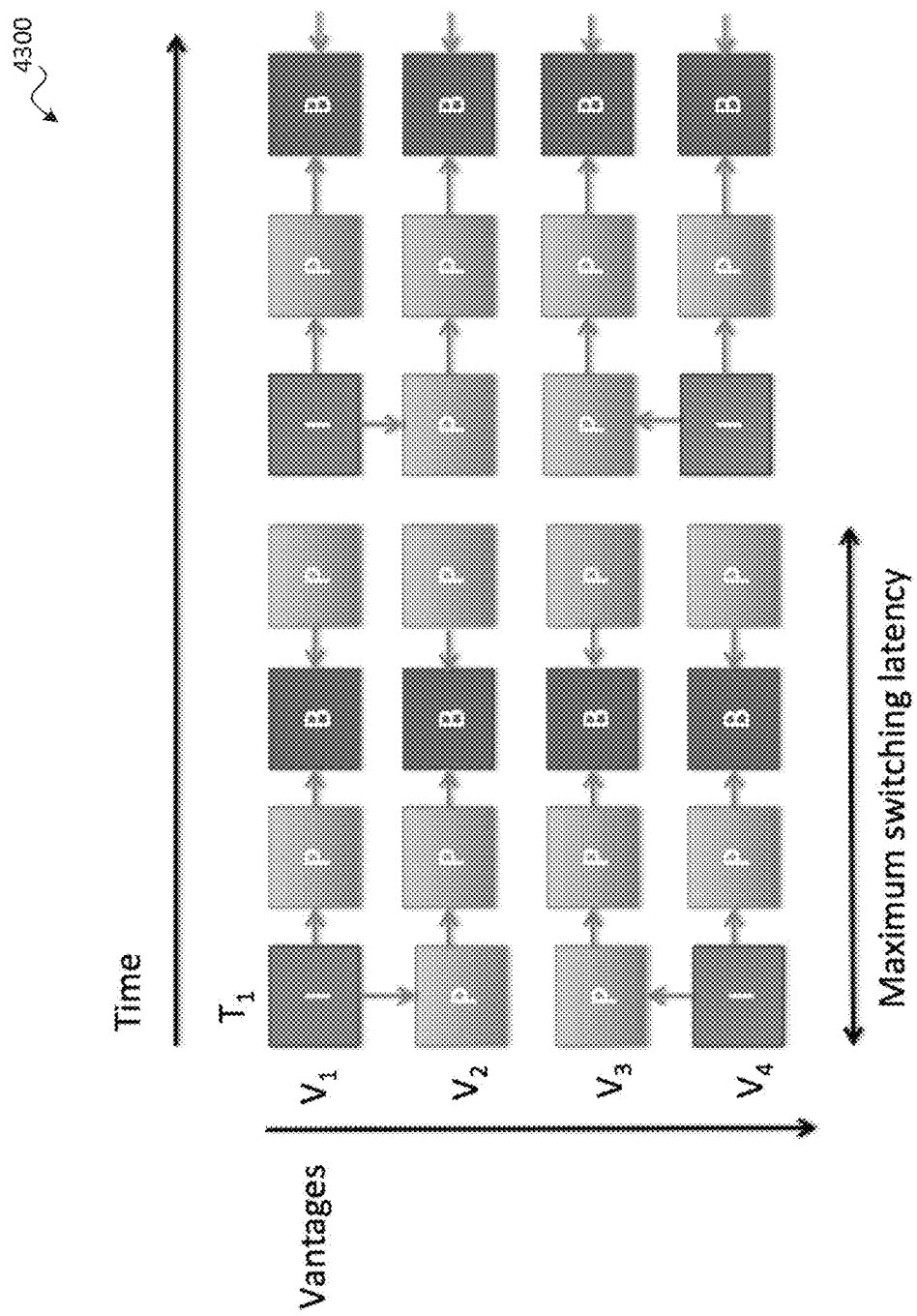

Referring to FIG. 39, an encoder 3900 is depicted, according to one embodiment. The encoder 3900 may have a compressor 3910 and a decompressor 3920. The encoder 3900 may employ intra-frame prediction 3930, inter-frame prediction 3940, inter-vantage prediction 3950, and/or inter-spatial layer prediction 3960 to compress color information for a given input. The input can be a single vantage frame, a tile inside a vantage, and/or a block inside a tile. The encoder 3900 may utilize existing techniques, such as any of the list set forth in the previous section, in intra-frame coding to remove redundancies through spatial prediction and/or inter-frame coding to remove temporal redundancies through motion compensation and prediction. The encoder 3900 may use projection transform 3970 and inverse projection transform 3975. The encoder 3900 may also have a complexity/latency-aware RDO encoder control 3980, and may store vantage data in a vantage bank 3990.

By contrast with conventional inter-view prediction in stereo images or video, the inter-vantage prediction carried out by the encoder 3900 may deal with non-planar projection. It may generate meshes by extracting color, texture, and/or depth information from each vantage and rendering a vantage prediction after warping and interpolation. Other methods for inter-vantage prediction include, but are not limited to:
  Geometric transformation by using depth information and known intrinsic and extrinsic camera parameters;
  Methods mentioned in previous section on virtual view generation from light field data;
  Reprojection techniques described in the above-referenced U.S. patent application Ser. No. 15/590,841 for "Vantage Generation", and
  Other advanced view synthesis method, such as those set forth in:
    Zitnick, C. Lawrence, et al. "High-quality video view interpolation using a layered representation." ACM Transactions on Graphics (TOG). Vol. 23. No. 3. ACM, 2004;
    Flynn, John, et al. "DeepStereo: Learning to Predict New Views from the World's Imagery." arXiv preprint arXiv:1506.06825 (2015); and
    Oh, Kwan-Jung, Sehoon Yea, and Yo-Sung Ho. "Hole filling method using depth based in-painting for view synthesis in free viewpoint television and 3-d video." Picture Coding Symposium, 2009. PCS 2009. IEEE, 2009.

Disocclusions may be filled with special considerations for different cases. According to some examples, disocclusions may be filled with previously mentioned methods such as, without limitation, image inpainting (Patch match), and spatial interpolation.

For the case of inter-frame coding, conventional two-dimensional motion compensation and estimation used in inter-frame prediction may only account for linear motion on a planar projection. One solution to rectify this problem is to map the input vantage projection to another projection map, such as cube map, that minimizes geometric distortion and/or favors straight-line motions. This procedure may be achieved by the module that handles projection transform 3970 in FIG. 39.

In a manner similar to that of scalable video coding (SVC), the system may also make use of the tiles from one or more lower resolution layers (such as the first layer 3810 and/or the second layer 3820 of FIG. 38) to predict tiles on the higher resolution layer (such as the second layer 3820 and/or the third layer 3830 of FIG. 38). The inter-spatial layer prediction scheme may provide progressive viewing capabilities during downloading and streaming. It may also allow larger storage savings by comparison with storage of each resolution independently.

Prediction Structure

The encoding prediction steps mentioned previously may be carried out according to a wide variety of techniques. Some examples will be shown and described in connection with FIGS. 40 through 44. By using inter-frame and inter-vantage prediction, additional reference dependencies may be introduced in the coding scheme. These dependences may introduce higher decoding complexity and longer random access latency in the playback process. In these drawings, arrows between frames are used to illustrate dependencies. Where a first frame points to a second frame, data from the first frame will be used to predict the second frame for predictive coding.

Referring to FIGS. 40 through 44, various vantage encoding schemes 4000, 4100, 4200, 4300, 4400 are depicted, according to certain embodiments. In the encoding schemes 4000, 4100, 4200, 4300, and 4400, the I-frames are key-frames that can be independently determined. The P-frames are predicted frames with a single dependency on a previous frame, and the B-frames are predicted frames with more than one dependency on other frames, which may include future and/or past frames. Generally, coding complexity may depend on the number of dependencies involved.

Figure 44:
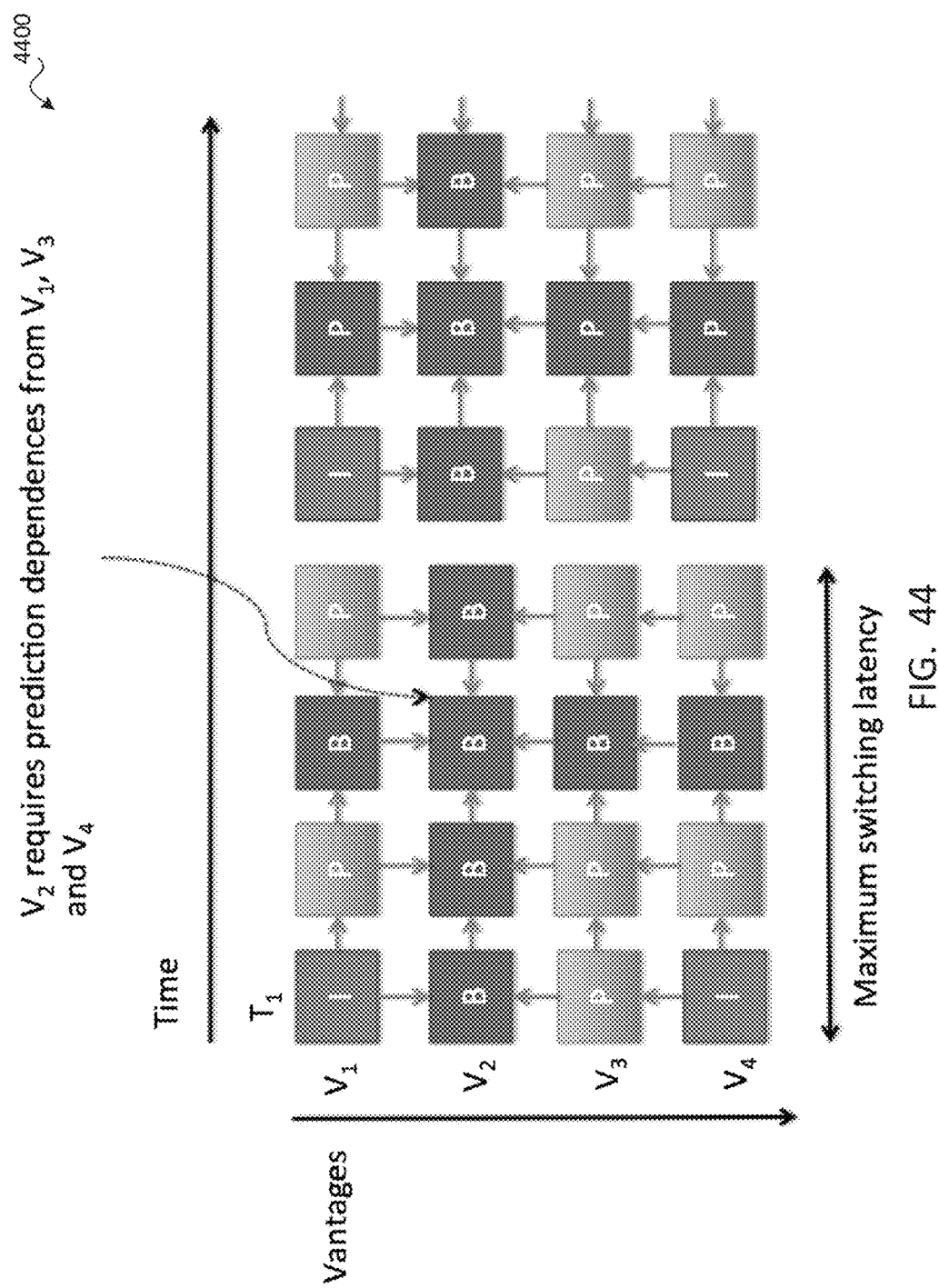

Of the coding structures of FIGS. 40 through 44, FIG. 44 may have the best coding gain. In FIG. 44, all P-frames and B-frames have both inter-frame and inter-vantage predicted frames as references. Thus, higher coding complexity and higher coding gain may both be present.

Many prediction structures may be used for inter-vantage prediction, in addition to or in the alternative to those of FIGS. 40 through 44. According to one possible encoding scheme, every other vantage on the sampling grid may be uniformly selected as a prediction reference. Inter-vantage prediction can then synthesize the view between the reference vantages, as shown in FIGS. 45A and 45B.

Figure 45B:
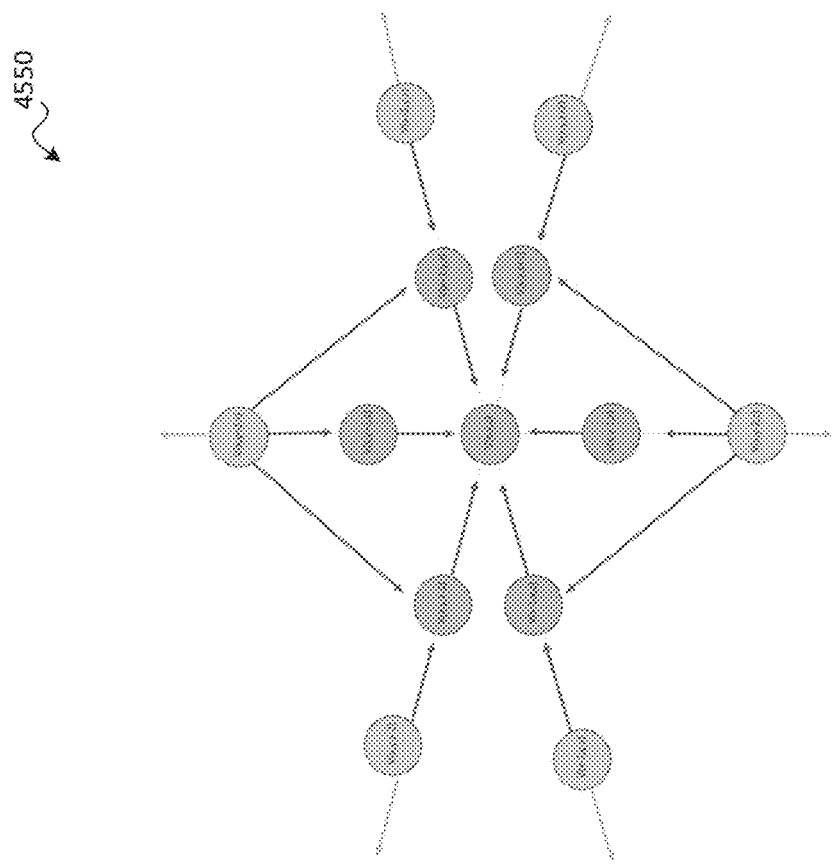
FIGS. 45A and 45B depict encoding schemes with inter-vantage prediction, according to certain alternative embodiments.
Figure 45A:
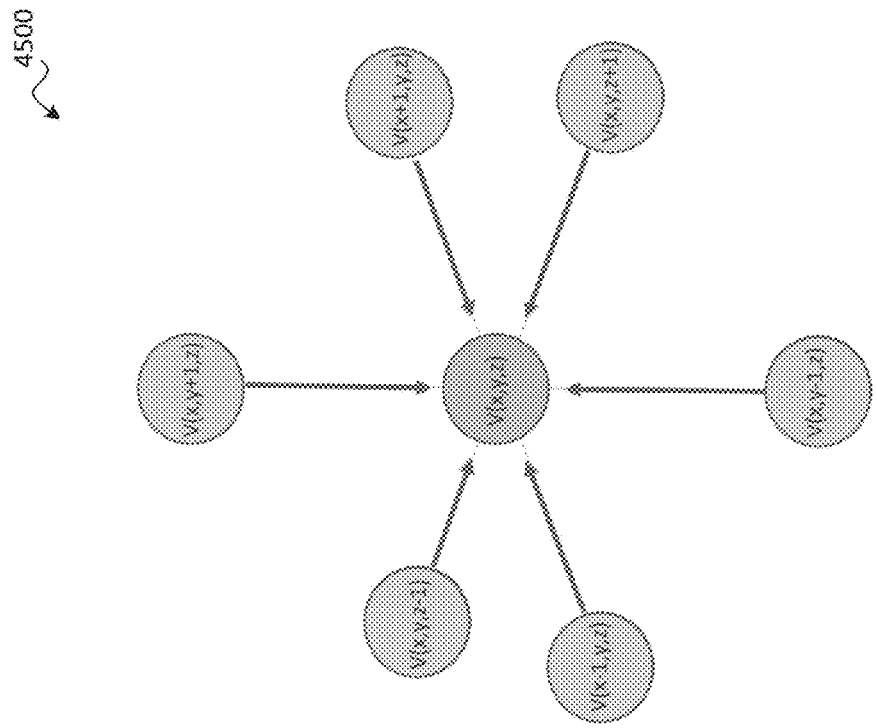

Referring to FIGS. 45A and 45B, two encoding schemes 4500 and 4550 are depicted, respectively, both having inter-vantage prediction, according to certain alternative embodiments. In these drawings, V(x,y,z) represents a vantage to be predicted through the use of surrounding vantages and/or a vantage that may be used to predict surrounding vantages. Vantages may be distributed throughout a viewing volume in any of a wide variety of arrangements, including but not limited to rectangular/cuboid arrangements, spherical arrangements, hexagonal arrangements, and non-uniform arrangements. The predictive principles set forth in these drawings may be used in conjunction with any such arrangement of vantages within a viewing volume.

FIG. 45A illustrates the encoding scheme with a low number of intra-coded reference vantages. Advantageously, only one reference may need to be encoded. However, relying on a single prediction may not provide the accuracy of multiple predictions, which may result in a drop in quality for the same bandwidth. Accordingly, there may be a tradeoff between bandwidth and the level of detail in the experience. Further, there may be tradeoff between decoding complexity and quality, with a larger number of dependencies increasing the decoding complexity. Yet further, a large number of dependencies may induce higher latency, which may necessitate buffering future frames.

To increase compression efficiency, the encoding scheme 4550 may also decrease the number of intra-coded reference vantages and have each predicted vantage predict other vantages as well. Therefore, the encoding scheme 4550 may create a chain of dependencies as shown in FIG. 45B. If low decoding complexity and/or random access latency are desired, a single reference scheme, such those of FIGS. 40 through 43, may be more suitable because they may trade away some of the compression ratio for lower latency and/or complexity.

Figures 46A, 46B:
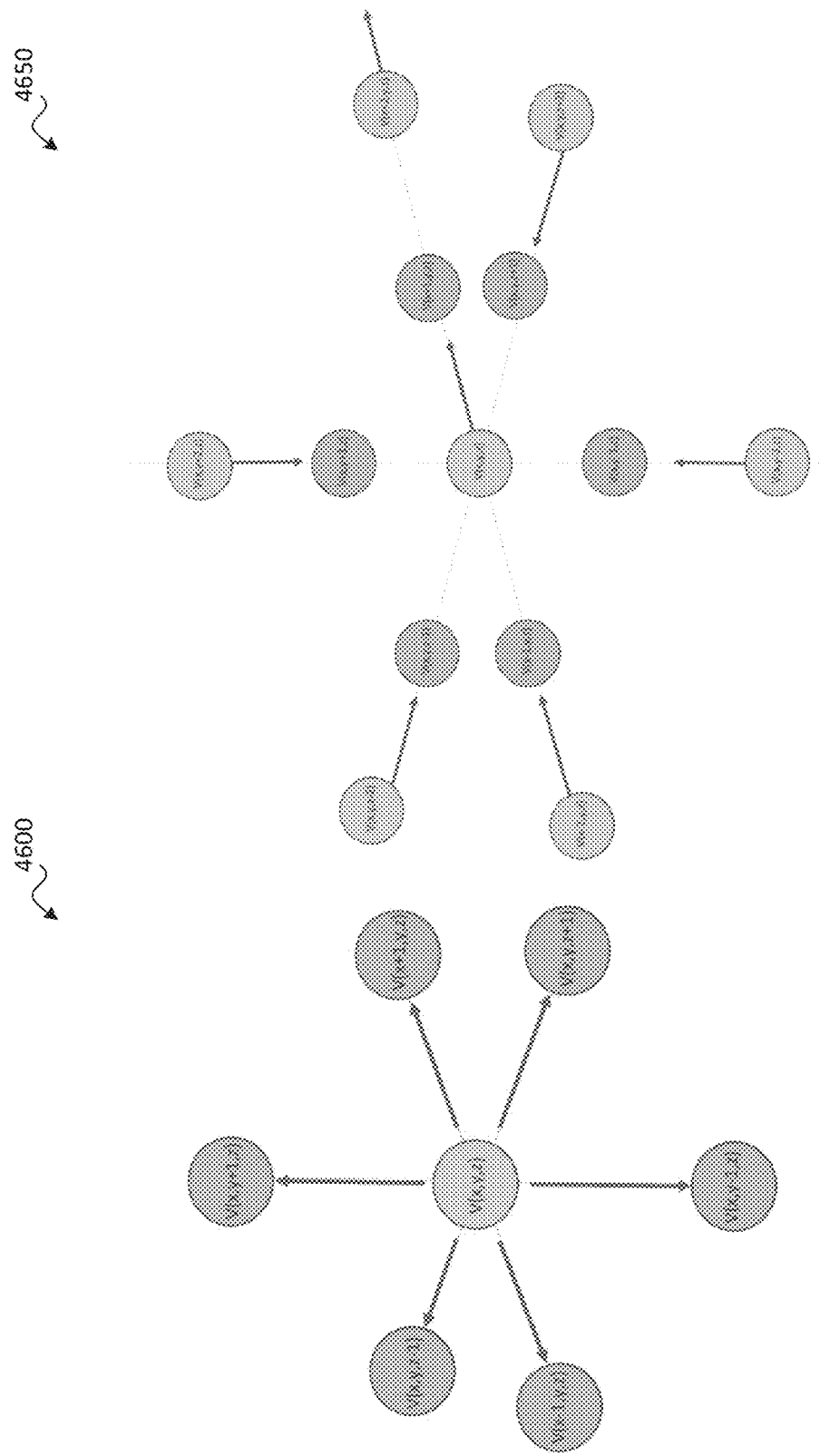
FIGS. 46A and 46B depict encoding schemes according to further alternative embodiments.

Referring to FIGS. 46A and 46B, two encoding schemes 4600 and 4650 are depicted, respectively, according to further alternative embodiments. In the encoding scheme 4600 and the encoding scheme 4650, a single-reference vantage prediction structure may lay out a three-dimensional sampling grid. To optimize quality, a reference frame and its prediction dependencies may advantageously be chosen in a rate-distortion optimized manner. Thus, inter-vantage prediction may be combined with intra-vantage prediction. Additionally or alternatively, inter-vantage prediction may be combined with inter-temporal and/or inter-spatial layering (not shown). The rate-distortion optimization will be shown and described in greater detail subsequently.

In some embodiments (not shown), a full inter-temporal/inter-vantage encoding scheme may be used. Such a scheme may provide optimum encoding efficiency, but may be relatively more difficult to decode.

Hierarchical Inter-Vantage Prediction Structure

In some embodiments, a hierarchical coding structure for inter-vantage prediction may provide a scalable solution to vantage compression. A set of vantages can be decomposed into hierarchical layers. The vantages in the lower layer may be independently encoded and used as references for the upper layers. The vantages in a layer may be predicted by either interpolating or extrapolating the vantages views from the lower layers.

Such a coding scheme may provide scalability to address different rate and/or device constraints. Devices with less processing power and/or bandwidth may selectively receive, decode and/or store the lower layers with a smaller viewing volume and/or lower vantage sampling density.

Figure 54:
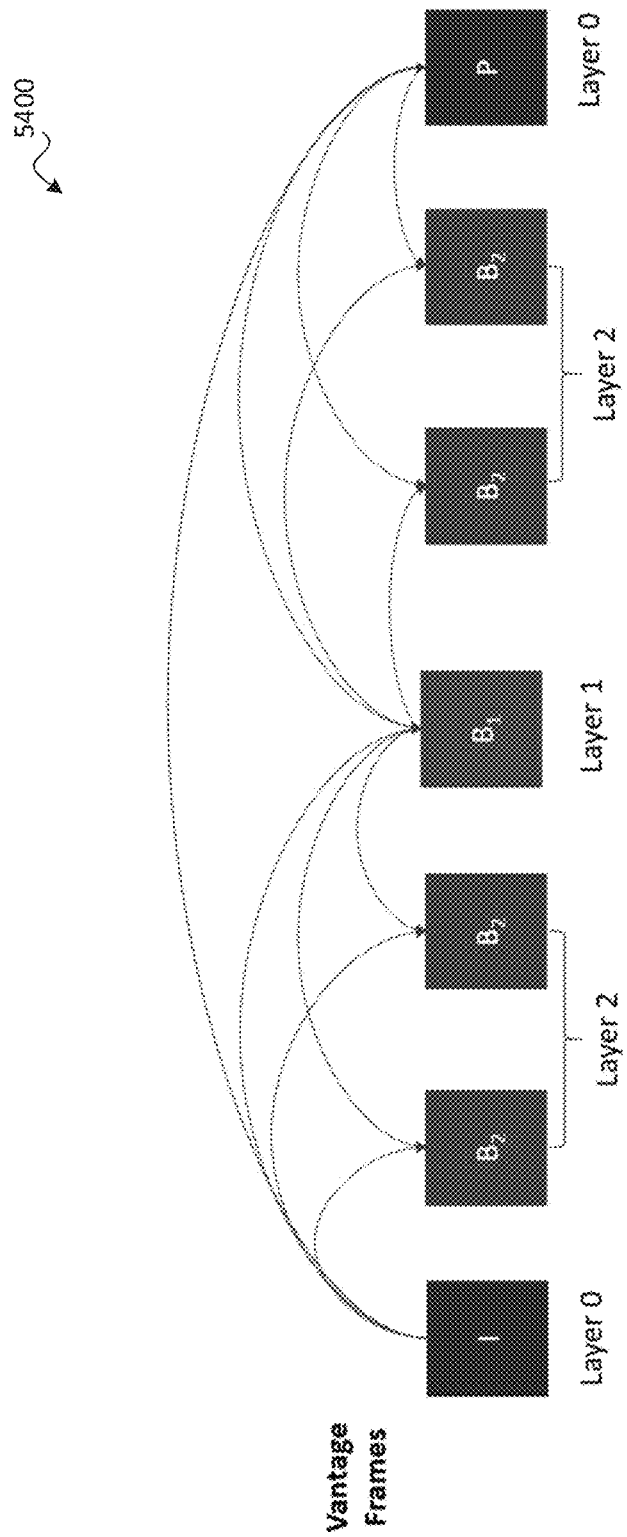
FIG. 54 depicts a hierarchical coding scheme, according to one embodiment.

Referring to FIG. 54, a hierarchical coding scheme 5400 is depicted, according to one embodiment. The hierarchical scheme 5400 may vary the vantage sampling density and/or viewing volume to support different system constraints of any clients. FIG. 54 provides a one-dimensional view of the hierarchical coding scheme 5400, with exemplary operation of the hierarchical coding scheme 5400 illustrated in two dimensions in FIGS. 55A, 55B, 55C, and 55D.

Referring to FIGS. 55A, 55B, 55C, and 55D, a series of views 5500, 5520, 5540, and 5560, respectively, depict the operation of the hierarchical coding scheme 5400 of FIG. 54 in two dimensions, according to one embodiment. With reference to FIGS. 54 through 55D, all views of layer 1 may be predicted by interpolation of all views from layer 0. Layer 2's views may be predicted by extrapolation of layers 0 and 1. Finally, layer 3 may be predicted by interpolation of layers 0, 1, and 2. The hierarchical coding scheme 5400 may extend into three-dimensions. This will be further shown and described in connection with FIGS. 56A, 56B, 56C, and 56D, as follows. Further, FIGS. 54 through 55D are merely exemplary; the system disclosed herein supports different layering arrangements in three-dimensional space. Any number of coding layers may be used to obtain the desired viewing volume.

Referring to FIGS. 56A, 56B, 56C, and 56D, a series of views 5600, 5620, 5640, and 5660, respectively, depict the operation of the hierarchical coding scheme 5400 of FIG. 54 in three dimensions, according to another embodiment. As in FIGS. 55A through 55D, all views of layer 1 may be predicted by interpolation of all views from layer 0. Layer 2's views may be predicted by extrapolation of layers 0 and 1. Finally, layer 3 may be predicted by interpolation of layers 0, 1, and 2.

Such hierarchical coding schemes may also provide enhanced error-resiliency. For example, if the client fails to receive, decode, and/or load the higher layers before the playback deadline, the client can still continue playback by just decoding and processing the lower layers.

Rate-Distortion-Optimized (RDO) Encoder Control with Decoding Complexity and Latency Awareness The systems and methods of the present disclosure may utilize a rate-distortion optimized encoder control that addresses different decoding complexity and latency demands from different content types and client playback devices. For example, content with higher resolution or more complex scenery might require higher decoding complexity. Content storage that does not need real-time decoding would exploit the highest compression ratio possible without considering latency.

To estimate decoding complexity, the controller may map a client device's capabilities to a set of possible video profiles with different parameter configurations. The client device capabilities may include hardware and/or software parameters such as resolution, supported prediction types, frame-rate, prediction structure, number of references, codec support and/or other parameters.

Given the decoding complexity mapping and the switching latency requirement, the encoder control can determine the best possible video profile used for encoding. The latency can be reduced by decreasing the intra-frame interval and/or pruning the number of frame dependencies.

Decoding complexity can be reduced by disabling more complex prediction modes, reducing playback quality, and/or reducing resolution. Using the chosen video profile, the controller can then apply Lagrangian optimization to select the most optimal prediction structure and encoding parameters, for example, from those set forth previously. Exemplary Lagrangian optimization is disclosed in Wiegand, Thomas, and Bernd Girod, "Lagrange multiplier selection in hybrid video coder control." *Image Processing, 2001. Proceedings. 2001 International Conference on.* Vol. 3. IEEE, 2001. An optimal encoder control may find the optimal decision, $\hat{m}$, by the following Lagrangian cost function:

$$\hat{m} = \mathrm{argmin}_{m \in M}[D(l,m) + \lambda \cdot R(l,m)]$$

where l denotes the locality of the decision (frame-level or block level), m denotes the parameters or mode decision, D denotes the distortion, R denotes the rate and λ denotes the Lagrangian multiplier.

The encoder control may manage and find the optimal settings for the following encoding parameters on a block or frame level:

Codec choice, such as JPEG, H.264/AVC, HEVC, VP8/9;
Reference selection from vantage bank, which stored all reconstructed frames from past encoded frames, for inter-spatial, inter-vantage and inter-frame predictions;
Prediction mode and dependencies;
Bitrates, quantization parameters and/or quality level;
I-frame interval or Group-of-Picture (GOP) size;
Resolution (spatial and/or temporal);
Frame-rate; and/or
Other codec specific parameters related to complexity and quality, such as motion estimation types, entropy coding types, quantization, post-processing filters, etc.

Compression/Decompression Codecs

In various embodiments, any suitable compression scheme and/or codec can be used for encoding prediction residuals and encoder side information. The system may be compatible with image/texture-based and/or video-based encoders, such as BC7, JPEG, H.264/AVC, HEVC, VP8/9 and others. Components, such as intra-frame prediction and inter-frame prediction, which exist in other codecs can be reused and integrated with the system and method set forth herein.

Depth Channel Compression

In some embodiments, information regarding the depth of objects in a scene may be used to facilitate compression and/or decompression or to otherwise enhance the user experience. For example, a depth map, which may be a two-dimensional grayscale image with intensity indicative of the depth of objects, may be used. In general, depth channel compression or depth map compression may advantageously preserve the mapping of silhouettes in the depth map to their associated color information. Image-based and/or video-based lossless compression techniques may advantageously be applied to the depth map data. Inter-vantage prediction techniques are applicable to depth map compression as well. Depth values may need to be geometrically re-calculated to another vantage with respect to an origin reference. In a manner similar to that of color, the (x,y) coordinate can be geometrically re-projected to another vantage.

Extension to Other Data Representations

The techniques set forth above describe the application of spatial random access-enabled compression schemes to a vantage representation. Each vantage may consist of multi-channel color information, such as RGB, YUV and other color formats, and a single depth channel. Similar techniques can also be performed in connection with other forms of data representation, such as layered depth images, as set forth in Shade, Jonathan, et al. "Layered depth images." *Proceedings of the 25th annual conference on Computer graphics and interactive techniques.* ACM, 1998, epipolar plane image volumes, as set forth in Bolles, Robert C., H. Harlyn Baker, and David H. Marimont. "Epipolar-plane image analysis: An approach to determining structure from motion." *International Journal of Computer Vision* 1.1 (1987): 7-55, light field images, three-dimensional point clouds, and meshes.

Temporal redundancies may be removed by tracking each data sample in the temporal direction for a given representation. Spatial redundancies may be removed by exploiting correlations between neighboring sample points across space and/or layers, depending on the representation. To facilitate spatial random access similar to vantage-based tiling, each sample from the corresponding layers may be grouped together according to their spatial location and/or viewing direction on a two-dimensional, three-dimensional, and/or other multi-dimensional space. Each grouping may be independently encoded such that the viewer only needs to decode samples from a subregion of a viewing volume when facing a given direction with a given field-of-view.

Referring to FIGS. 57A, 57B, 57C, and 57D, a series of graphs 5700, 5720, 5740, 5760, respectively, depict the projection of depth layers onto planar image from a spherical viewing range from a vantage, according to one embodiment. Specifically, the graph 5700 of FIG. 57A depicts a top-down view of an input field-of-view projected on a simple depth layer map. FIGS. 57B, 57C, and 57D depict the projection of the first, second, and third depth layers, respectively, on planar images from the spherical input field-of-view of FIG. 57A. Each depth layer may be divided into tiles as shown. Such a layering scheme may be used to implement the depth channel compression techniques set forth above. This compression scheme may utilize a "Layered depth images" representation. This may be used as an alternative representation to represent a three-dimensional viewing volume, instead of using a vantage-based system. In each depth layer, each pixel may contain color information about the three-dimensional scene for the corresponding depth. For view-dependent lighting generation, each pixel may include extra information to describe how lighting varies between viewing angles. To generate a viewpoint, the viewpoint may be rendered directly.

System Architecture

Various system architectures may be used to implement encoding, decoding, and/or other tasks related to the provision of viewpoint video data to a viewer. In some embodiments, the system may provide six degrees of freedom and/or full parallax in a three-dimensional viewing volume. The system may be scalable to support different degrees of immersion. For example, all aforementioned techniques, such as hierarchical vantage prediction, spatial layers, and tiling, may support scalability to different applications. Such a scheme may be scaled to support two-dimensional planar video, single viewpoint omnidirectional three-dimensional video, a virtual reality video system with only vertical or horizontal parallax, and/or systems with different degrees of freedom ranging from one degree of freedom to six degrees of freedom. To achieve such scaling, vantage density and vantage volume may be decreased and/or the set of vantages and tiles that can be fetched to generate a viewpoint may be limited. A hierarchical vantage scheme may be designed to support different platforms, for example, a base layer that supports one degree of freedom (a single vantage), a secondary layer that supports three degrees of freedom with horizontal parallax (a disk of vantages), and a third layer that supports six degrees of freedom with full parallax (a set of all vantages in a viewing volume). Exemplary architecture will be shown and described as follows.

Tile Processing and Encoding

Figure 47:
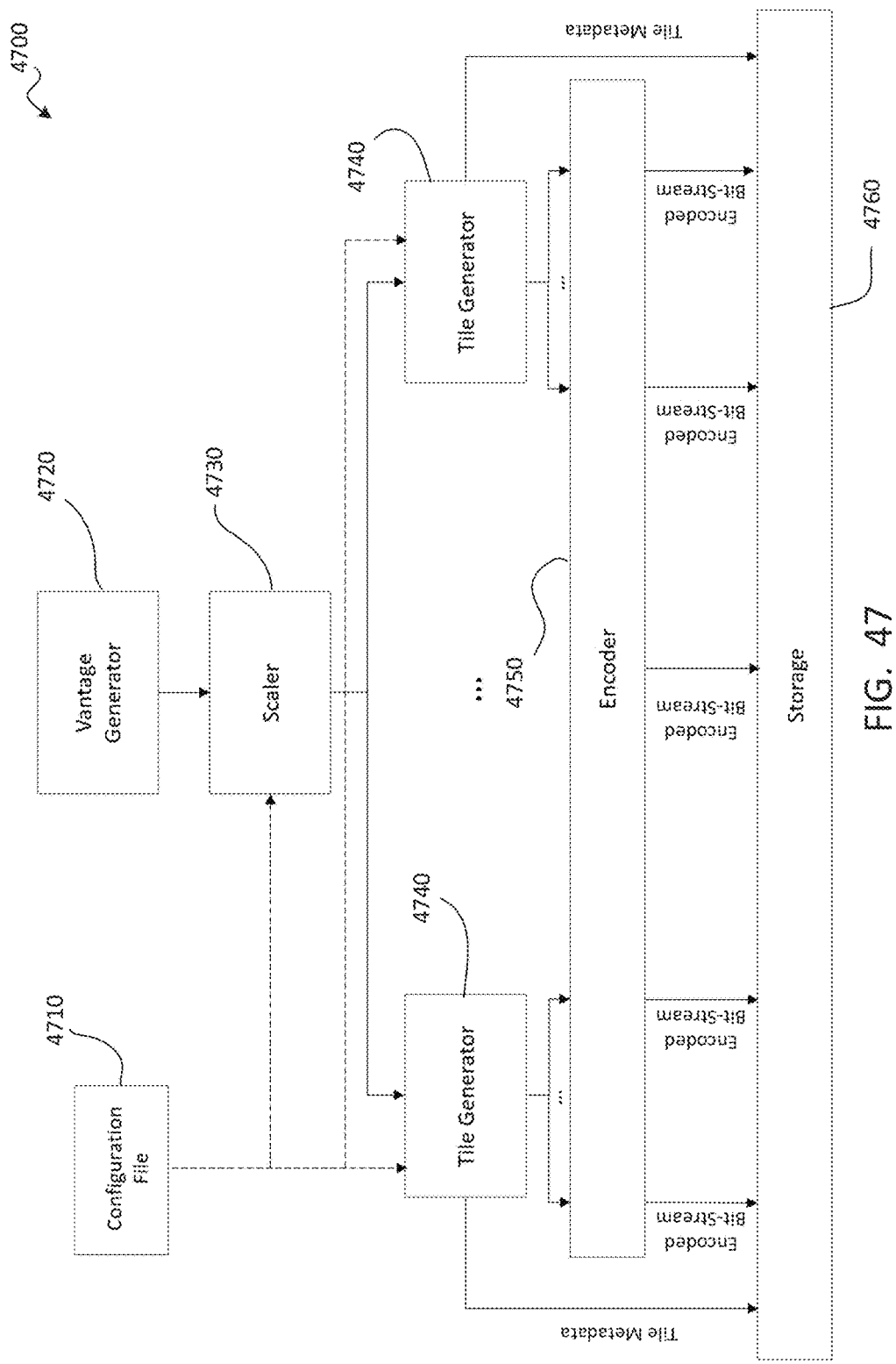
FIG. 47 depicts a system for generating and compressing tiles, according to one embodiment.

Referring to FIG. 47, a system 4700 for generating and compressing tiles is depicted, according to one embodiment. An input configuration file 4710 may specify parameters such as the number of spatial layers needed and the size and location of the tiles for each spatial layer. The tiling and spatial layering scheme may be as depicted in the tile 3800 of FIG. 38. A vantage generator 4720 may generate all of the vantages, each of which may be omnidirectional as described above, and may contain both color and depth information, on a specified three-dimensional sampling grid. The vantages may then be decomposed by a scaler 4730 into multiple spatial resolution layers, as in the tile 3800. The scaler 4730 may advantageously preserve correspondence between the edges of the depth map and the color information to avoid any viewing artifacts.

For each spatial resolution layer (for example, for each of the first layer 3810, the second layer 3820, and the third layer 3830 of FIG. 38), a tile generator 4740 may crop the appropriate region and create the specified tile(s). Each tile may then be compressed by an encoder 4750, which may be an encoder as described in any of the previous sections. For each tile, a metafile may be used to describe any additional information, such as the codec used for compression, time segmentation, tile playback dependences and file storage, etc. The metadata may thus support playback. The tiles and metadata may be stored in storage 4760.

Tile Decoding and Playback

Figure 48:
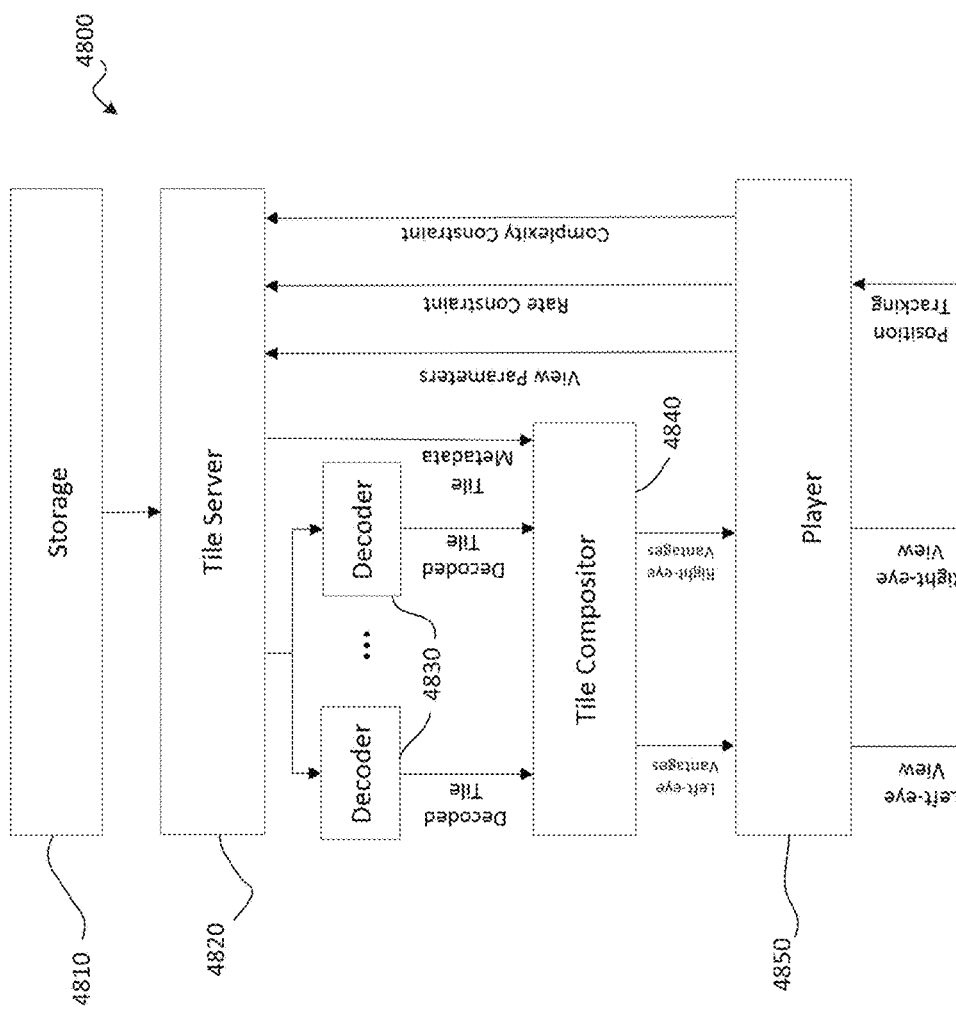
FIG. 48 depicts a system for tile decoding, compositing, and playback, according to one embodiment.

Referring to FIG. 48, a system 4800 for tile decoding, compositing, and playback is depicted, according to one embodiment. Tiles and/or metadata may be retrieved from storage 4810. Based on the available data transfer rate, the complexity budget, and/or the user's current viewing locations, a tile server 4820 may relay a set of tiles that provide the optimal viewing quality. After the tiles are decoded in decoders 4830, a tile compositor 4840 may combine the fetched tiles together to form the corresponding vantage views needed for rendering. The techniques to combine the fetched tiles may include stitching, blending and/or interpolation. Tiles can additionally or alternatively be generated by using tiles from another spatial layer and/or neighboring tiles on the same layer. The resulting viewpoint video data, which may include the combined tiles, may be sent to a player 4850 for playback. When a tile is missing or corrupted, the playback system may use tiles from other layers and/or other tiles from the same layer for error concealment. Error concealment can be achieved by interpolation, upsampling, downsampling, superresolution, filtering, and/or other predictive techniques.

In some embodiments, pause, fast-forward, and/or rewind functionality may be supported. The system may perform spatial-temporal access on the tiles at the same time during fast-forward and rewind, for example, by fast-forwarding or rewinding while the viewer's head is moving. The playback tile may continue to stream and/or decode the tiles spatially and temporally while a user is rewinding or fast-forwarding. A similar feature may be implemented to facilitate pausing playback.

Figure 49:
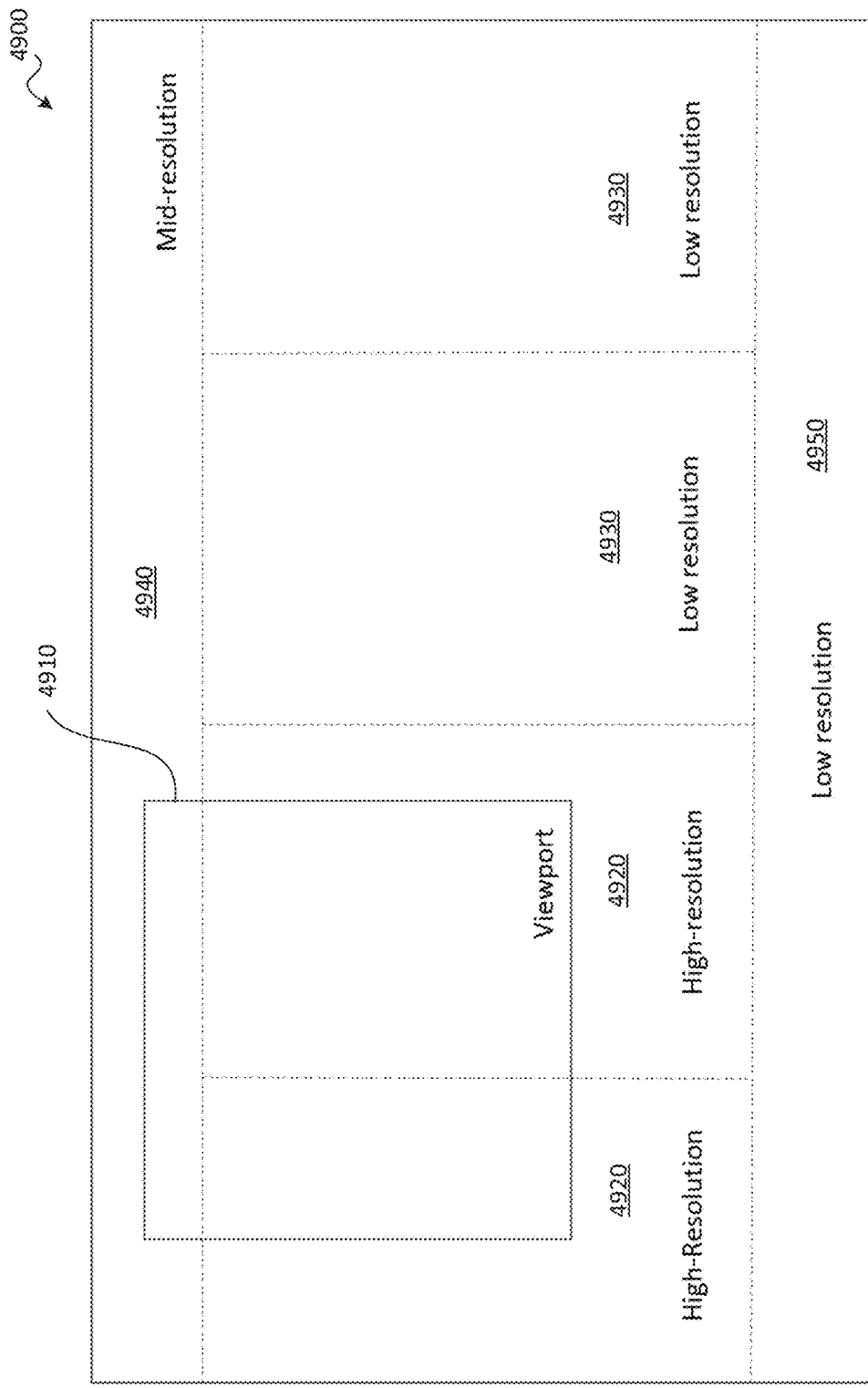
FIG. 49 is a diagram depicting how a vantage view may be composed, according to one embodiment.

FIG. 49 is a diagram 4900 depicting how a vantage view may be composed, according to one embodiment. A viewport 4910 illustrates the FoV of the viewer, which may be selected by viewer via motion of his or her head, in the case of a virtual reality experience. Tiles 4920 that are at least partially within the central region of the viewport 4910 may be rendered in high resolution. Thus, these tiles may be fetched from a high-resolution layer (for example, the third layer 3830 of FIG. 38).

To reduce complexity, tiles 4930 outside of the viewport 4910 may be fetched from the lower resolution layers (for example, the first layer 3810 of FIG. 38). Depending on the content and viewing behavior, the tile server may also fetch tiles from lower resolution layers in less perceptible regions of the viewport 4910.

In the example of FIG. 49, the vantage may be projected to an equirectangular map. The tiles 4940 on top of the viewing area may be fetched from a mid-resolution layer (for example, the second layer 3820 of FIG. 38) because the top region of an equirectangular map is often stretched and over-sampled.

Figure 50:
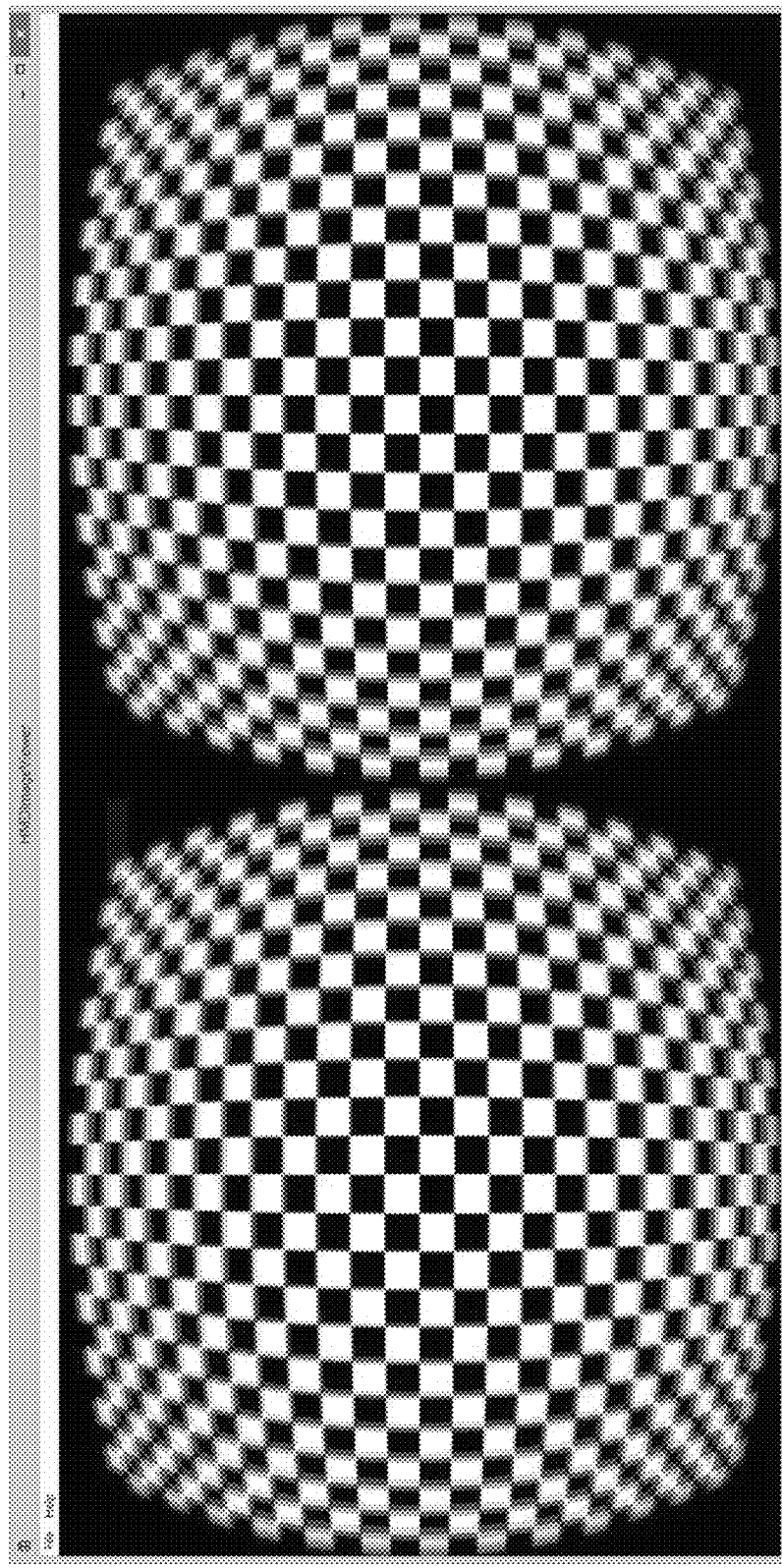
FIG. 50 depicts the view of a checkerboard pattern from a known virtual reality headset.

Referring to FIG. 50, a diagram 5000 depicts the view of a checkerboard pattern from a known virtual reality headset, namely the Oculus rift. As shown, there is significant viewing distortion near the edges of the FoV of the head-mounted display. Such distortion may reduce the effective display resolution in those areas, as illustrated in FIG. 50. Thus, the user may be unable to perceive a difference between rendering with low-resolution tiles and rendering with high-resolution tiles in those regions. Returning briefly to FIG. 49, tiles 4950 at the bottom region of an equirectangular map may be fetched from a low-resolution layer (for example, the first layer 3810 of FIG. 38). Similarly, if a particular portion of a scene is not likely to command the viewer's attention, it may be fetched from a lower resolution layer.

When the scene inside a tile is composed of objects that are far away, the variations in view-dependent lighting and occlusions are very limited. Instead of fetching a set of four or more vantage tiles for rendering the view, the system might only need to fetch a single tile from the closest vantage. Conversely, when the scene inside a tile has one or more objects that are close to the viewpoint, representation of those objects may be more realistic if tiles from all four (or even more) vantages are used for rendering the view on the display device.

Through multi-spatial layer composition, a system and method according to the present disclosure may provide flexibility to optimize perceptual quality when the system is constrained by computing resources such as processing power, storage space, and/or bandwidth. Such flexibility can also support perceptual rendering techniques such as aerial perspective and foveated rendering.

Notably, the system 4700 of FIG. 47 and/or the system 4800 of FIG. 48 may be run locally on a client machine, and/or remotely over a network. Additional streaming infrastructure may be required to facilitate tile streaming over a network.

Content Delivery

In various embodiment, the system and method may support different modes of content delivery for immersive videos. Such content delivery modes may include, for example and without limitation:

Compressed video data storage on physical storage medium;
Decompressed video data downloaded to client device;
Compressed video data downloaded to client device with offline decompression; and
Video data streamed to client device.

Compressed Volumetric Video Data Storage on Physical Storage Medium

When a physical storage medium is available, the compressed volumetric video data may be stored on and retrieved from a local physical storage medium and played back in real-time. This may require the presence of sufficient memory bandwidth between the storage medium and the system's CPU and/or GPU.

Decompressed Video Data Downloaded to Client Device

The compressed video data may be packaged to support content downloading. The compression and packaging may be selected to meet the client device's complexity and storage capabilities. For a less complex device, such as a smartphone, lower resolution video data and/or less complex video data may be downloaded to the client device. In some embodiments, this may be achieved using the scalability techniques described previously.

Compressed Volumetric Video Data Downloaded to Client Device with Offline Decompression When the file size of the volumetric video data or download time is a concern, the system can remove the decoding complexity constraint and compress the file stream by using the best available compression parameters. After a client device downloads the compressed package, the client can then decode the package offline and transcode it to another compression format that can be decodable at real-time, usually at the cost of creating a much larger store of compressed volumetric video data.

Video Data Streamed to Client Device

A tiling scheme with multiple resolution layers, as described above in connection with FIG. 38 and elsewhere above, may offer a scalable system that can support any arbitrary viewings from a large number of users inside a video volume at the same time. A tiling scheme may help reduce streaming bandwidth, and a spatial layering scheme may help meet different client limitations in bandwidth and decoding complexity. A layering scheme may also provide concealment to spatial random access latency and any network packet losses or data corruption.

Method

The systems described above may be used in conjunction with a wide variety of methods. One example will be shown and described below. Although the systems and methods of the present disclosure may be used in a wide variety of applications, the following discussion relates to a virtual reality application.

Figure 51:
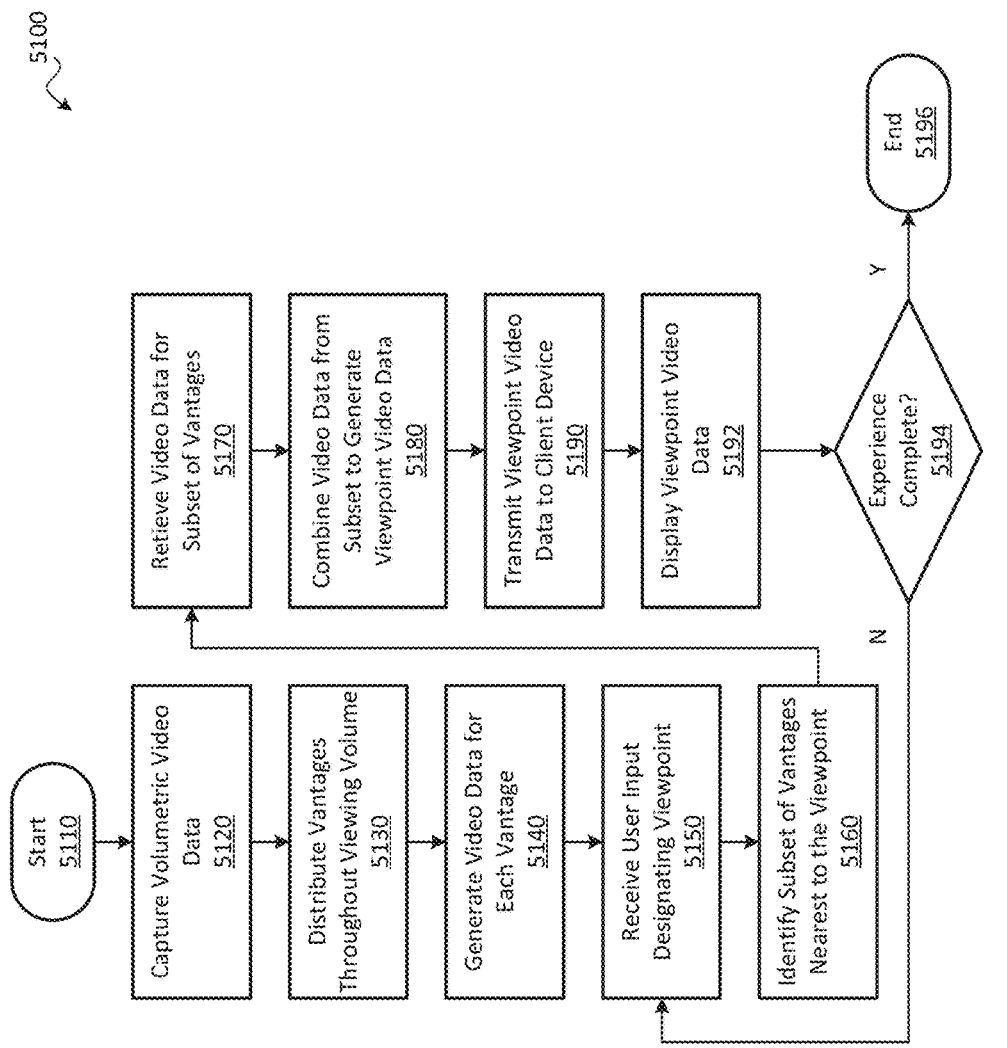
FIG. 51 depicts a method for capturing volumetric video data, encoding the volumetric video data, decoding to obtain viewpoint video data, and displaying the viewpoint video data for a viewer, according to one embodiment.

Referring to FIG. 51, a method 5100 is depicted for capturing volumetric video data, encoding the volumetric video data, decoding to obtain viewpoint video data, and displaying the viewpoint video data for a viewer, according to one embodiment. The method 5100 may start 5110 with a step 5120 in which the volumetric video data is captured. This may be done, for example, through the use of a tiled camera array such as any of those described above.

In a step 5130, vantages may be distributed throughout the viewing volume. The viewing volume may be a designated volume, from within which the captured scene is to be viewable. The vantages may be distributed throughout the viewing volume in a regular pattern such as a three-dimensional grid or the like. In alternative embodiments, the vantages may instead be distributed in a three-dimensional hexagonal grid, in which each vantage is equidistant from all of its immediate neighbors. Such an arrangement may approximate a sphere. Vantages may also be distributed non-uniformly across the three-dimensional viewing volume. For example, regions of the viewing volume that are more likely to be selected as viewpoints, or from which the scene would beneficially be viewed in greater detail, may have comparatively more vantages.

In a step 5140, the volumetric video data may be used to generate video data for each of the vantages. For any given vantage, the corresponding video data may be usable to generate a view of the scene from a viewpoint located at the vantage.

In a step 5150, user input may be received to designate a viewpoint within the viewing volume. This may be done, for example, by a viewer positioning his or her head at a location corresponding to the viewpoint. The orientation of the viewer's head may be used to obtain a view direction along which the view from the viewpoint is to be constructed.

In a step 5160, a subset of the vantages nearest to the viewpoint may be identified. The subset may be, for example, the four vantages closest to the viewpoint, which may define a tetrahedral shape containing the viewpoint, as described previously. In step 5170, the video data for the subset of vantages may be retrieved.

In a step 5180, the video data from the subset of vantages may be combined together to yield viewpoint video data representing the view of the scene from the viewpoint, from along the view direction. The video data may be interpolated if the viewpoint does not lie on or adjacent to one of the vantages.

Further, various predictive methods may be used, as set forth above, to combine future video data from the viewpoint and/or future video data from proximate the viewpoint. Such predictive methods may be used to generate at least a portion of the viewpoint video data for a future view from any combination of the viewpoint, an additional viewpoint proximate the viewpoint, the view direction, an additional view direction different the view direction. Thus, if the viewer actually does turn his or her head in alignment with the viewpoint and view direction pertaining to the predicted viewpoint video data, the predicted viewpoint video data may be used to streamline the steps needed to display the scene from that viewpoint, along that view direction. Additionally or alternatively, the playback system may predict one or more viewing trajectories along which the viewer is likely to move his or her head. By predicting the viewing trajectories, the system may pre-fetch the tiles to be decoded and rendered to minimize viewing latencies.

Additionally or alternatively, predictive methods may be used to predict viewpoint video data without having to receive and/or process the underlying video data. Thus, tighter bandwidth and/or processing power requirements may be met without significantly diminishing the viewing experience.

In a step 5190, the viewpoint video data may be transmitted to the client device. Notably, this is an optional step, as the steps 5150, 5160, 5170, and 5180 may be optionally performed at the client device. In such an event, there may be no need to transmit the viewpoint video data to the client device. However, for embodiments in which the step 5180 is carried out remotely from the client device, the step 5190 may convey the viewpoint video data to the client device.

In a step 5192, the viewpoint video data may be used to display a view of the scene to the viewer, from the viewpoint, with a FoV oriented along the view direction. Then, in a query 5194, the method 5100 may determine whether the experience is complete. If not, the method 5100 may return to the step 5150, in which the viewer may provide a new viewpoint and/or a new view direction. The steps 5160, 5170, 5180, 5190, and 5192 may then be repeated to generate a view of the scene from the new viewpoint and/or along the new view direction. Once the query 5194 is answered in the affirmative, the method 5100 may end 5196.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for displaying an environment from a viewpoint, the method comprising:
   at an input device, receiving user input designating the viewpoint within a viewing volume;
   at one or more processors, identifying, from among a plurality of vantages within the viewing volume, a subset of the vantages nearest to the viewpoint comprising at least two of the vantages, each of which has associated video data;
   at a data store, retrieving the video data from the subset of the vantages;
   at the one or more processors, combining the video data from the subset of the vantages to generate viewpoint video data depicting the environment from the viewpoint; and
   at a display device, displaying the viewpoint video data, wherein identifying the subset comprises identifying four vantages of the plurality of vantages that define a tetrahedral shape around the viewpoint.

2. The method of claim 1, further comprising, prior to receiving the user input:
   with one or more cameras, capturing volumetric video data depicting the environment from within the viewing volume;
   at the one or more processors, distributing the plurality of vantages throughout the viewing volume; and
   at the one or more processors, using the volumetric video data to generate the video data for each of the vantages such that the video data for each vantage comprises a subset of the volumetric video data that depicts the environment as viewed from the vantage.

3. The method of claim 1, wherein:
   the video data for each of the vantages depicts an omnidirectional view from the vantage;
   the user input further designates a view direction; and
   the viewpoint video data further depicts the environment from along the view direction.

4. The method of claim 3, wherein:
   the video data for each of the vantages comprises a plurality of tiles;

each of the tiles comprises a sectoral portion of the video data; and combining the video data from the subset of the vantages to generate the viewpoint video data comprises combining the video data from only the tiles of the video data that are oriented proximate the view direction.

5. The method of claim 4, further comprising, prior to displaying the viewpoint video data on the display device, transmitting the viewpoint video data to a client computing device having the display device exclusive of video data for any of the tiles that are not oriented proximate the view direction.

6. The method of claim 1, further comprising, prior to displaying the viewpoint video data on the display device, transmitting the viewpoint video data to a client computing device having the display device exclusive of video data for any of the vantages outside the subset.

7. The method of claim 1, further comprising using the video data from the subset of the vantages to predict at least a portion of additional viewpoint video data from one of the viewpoint and an additional viewpoint proximate to the viewpoint.

8. The method of claim 1, further comprising using a first portion of the video data from the subset of the vantages, pertaining to a first portion of the viewpoint video data, to predict a second portion of the viewpoint video data to which the first portion of the video data does not directly pertain.

9. The method of claim 1, further comprising:
at the one or more processors, compressing at least one selection from a group consisting of the viewpoint video data and the video data from the subset of the vantages;
transmitting the selection, in compressed form, to a client computing device having the display device; and
decompressing the at least one selection from the group consisting of the viewpoint video data and the video data from the subset of the vantages at the client computing device.

10. A method for displaying an environment from a viewpoint, the method comprising:
at an input device, receiving user input designating the viewpoint within a viewing volume;
at one or more processors, identifying, from among a plurality of vantages within the viewing volume, a subset of the vantages nearest to the viewpoint comprising at least two of the vantages, each of which has associated video data;
at a data store, retrieving the video data from the subset of the vantages;
at the one or more processors, combining the video data from the subset of the vantages to generate viewpoint video data depicting the environment from the viewpoint; and
at a display device, displaying the viewpoint video data, wherein the video data for each of the vantages comprises at least a first layer having a first resolution, and a second layer having a second resolution higher than the first resolution and further comprising, at the one or more processors:
identifying a shortage of at least one of bandwidth, storage space, and processing power; and
in response to identification of the shortage, selecting the first layer;

wherein, combining the video data from the subset of the vantages to generate the viewpoint video data comprises combining the first layers of the video data from the subset.

11. The method of claim 10, wherein the first resolution is selected from a group consisting of spatial resolution, bit rate, and temporal resolution.

12. The method of claim 10, further comprising, prior to displaying the viewpoint video data on the display device, transmitting the viewpoint video data to a client computing device having the display device;
wherein the viewpoint video data excludes data from the second layers of the video data from the subset.

13. The method of claim 10, further comprising, at the one or more processors, after displaying the viewpoint video data:
identifying cessation of the shortage; and
in response to identification of cessation of the shortage, selecting the second layer;
wherein the method further comprises:
combining the video data from the subset of the vantages to generate additional viewpoint video data by combining the second layers of the video data from the subset; and
at the display device, displaying the additional viewpoint video data.

14. A method for displaying an environment from a viewpoint, the method comprising:
at an input device, receiving user input designating the viewpoint within a viewing volume;
at one or more processors, identifying, from among a plurality of vantages within the viewing volume, a subset of the vantages nearest to the viewpoint comprising at least two of the vantages, each of which has associated video data;
at a data store, retrieving the video data from the subset of the vantages;
at the one or more processors, combining the video data from the subset of the vantages to generate viewpoint video data depicting the environment from the viewpoint; and
at a display device, displaying the viewpoint video data, wherein:
the user input further designates a view direction;
the viewpoint video data further depicts the environment from along the view direction; and
the method further comprises using the video data from the subset of the vantages to predict from the viewpoint at one of the view direction and an additional view direction different from the view direction.

15. A method for preparing viewpoint video data for display for a user, the method comprising:
with one or more cameras, capturing volumetric video data depicting an environment from within a viewing volume;
at one or more processors, distributing a plurality of vantages throughout the viewing volume; and
at the one or more processors, using the volumetric video data to generate video data for each of the vantages such that the video data for each vantage comprises a subset of the volumetric video data that depicts the environment as viewed from the vantage, wherein generating the video data for each of the vantages comprises generating, within the video data for each of the vantages, at least a first layer having a first resolution and a second layer having a second resolution higher than the first resolution, and further comprising transmitting the first layer, but not the second layer, of the video data for a subset of the vantages to a client computing device having a display device.

16. The method of claim 15, wherein the video data for each of the vantages depicts an omnidirectional view from the vantage.

17. The method of claim 16, wherein:
the video data for each of the vantages comprises a plurality of tiles; and
each of the tiles comprises a sectoral portion of the video data.

18. The method of claim 15, further comprising transmitting the video data for a subset of the vantages to a client computing device having a display device without transmitting the video data for any of the vantages outside the subset to the client computing device.

19. The method of claim 15, further comprising:
at the one or more processors, compressing at least a portion of the video data; and
transmitting at least the portion of the video data, in compressed form, to a client computing device having a display device.

20. A non-transitory computer-readable medium for displaying an environment from a viewpoint, comprising instructions stored thereon, that when executed by one or more processors, perform the steps of:
causing an input device to receive user input designating the viewpoint within a viewing volume;
identifying, from among a plurality of vantages within the viewing volume, a subset of the vantages nearest to the viewpoint comprising at least two of the vantages, each of which has associated video data;
causing a data store to retrieve the video data from the subset of the vantages;
combining the video data from the subset of the vantages to generate viewpoint video data depicting the environment from the viewpoint; and
causing a display device to display the viewpoint video data, wherein the video data for each of the vantages comprises at least a first layer having a first resolution, and a second layer having a second resolution higher than the first resolution and further comprising instructions stored thereon, that when executed by one or more processors, perform the steps of:
identifying a shortage of at least one of bandwidth, storage space, and processing power; and
in response to identification of the shortage, selecting the first layer;
wherein, combining the video data from the subset of the vantages to generate the viewpoint video data comprises combining the first layers of the video data from the subset.

21. The non-transitory computer-readable medium of claim 20, further comprising instructions stored thereon, that when executed by one or more processors, perform the steps of:
causing one or more cameras to capture volumetric video data depicting the environment from within the viewing volume;
distributing the plurality of vantages throughout the viewing volume; and
using the volumetric video data to generate the video data for each of the vantages such that the video data for each vantage comprises a subset of the volumetric video data that depicts the environment as viewed from the vantage.

22. The non-transitory computer-readable medium of claim 20, wherein:
the video data for each of the vantages depicts an omnidirectional view from the vantage;
the user input further designates a view direction; and
the viewpoint video data further depicts the environment from along the view direction.

23. The non-transitory computer-readable medium of claim 22, wherein:
the video data for each of the vantages comprises a plurality of tiles;
each of the tiles comprises a sectoral portion of the video data; and
combining the video data from the subset of the vantages to generate the viewpoint video data comprises combining the video data from only the tiles of the video data that are oriented proximate the view direction.

24. The non-transitory computer-readable medium of claim 20, further comprising additional instructions stored thereon, that when executed by one or more processors, prior to causing the display device to display the viewpoint video data, initiate transmission the viewpoint video data to a client computing device having the display device exclusive of video data for any of the vantages outside the subset.

25. The non-transitory computer-readable medium of claim 20, further comprising additional instructions stored thereon, that when executed by the one or more processors, use the video data from the subset of the vantages to predict at least a portion of additional viewpoint video data from one of the viewpoint and an additional viewpoint proximate to the viewpoint.

26. The non-transitory computer-readable medium of claim 20, further comprising additional instructions stored thereon, that when executed by the one or more processors, perform the steps of:
compressing at least one selection from a group consisting of the viewpoint video data and the video data from the subset of the vantages;
initiating transmission of the selection, in compressed form, to a client computing device having the display device; and
decompressing the at least one selection from the group consisting of the viewpoint video data and the video data from the subset of the vantages at the client computing device.

27. A non-transitory computer-readable medium for preparing viewpoint video data for display for a user, comprising instructions stored thereon, that when executed by one or more processors, perform the steps of:
causing one or more cameras to capture volumetric video data depicting an environment from within a viewing volume;
distributing a plurality of vantages throughout the viewing volume; and
using the volumetric video data to generate video data for each of the vantages such that the video data for each vantage comprises a subset of the volumetric video data that depicts the environment as viewed from the vantage, wherein generating the video data for each of the vantages comprises generating, within the video data for each of the vantages, at least a first layer having a first resolution and a second layer having a second resolution higher than the first resolution;
wherein the non-transitory computer-readable medium further comprises instructions stored thereon, that when executed by one or more processors, initiate transmission of the first layer, but not the second layer, of the video data for a subset of the vantages to a client computing device having a display device.

28. The non-transitory computer-readable medium of claim claim 27, wherein:
the video data for each of the vantages depicts an omni-directional view from the vantage;
the video data for each of the vantages comprises a plurality of tiles; and
each of the tiles comprises a sectoral portion of the video data.

29. The non-transitory computer-readable medium of claim 27, further comprising additional instructions stored thereon, that when executed by the one or more processors, initiate transmission of the video data for a subset of the vantages to a client computing device having a display device without transmitting the video data for any of the vantages outside the subset to the client computing device.

30. The non-transitory computer-readable medium of claim 27, further comprising additional instructions stored thereon, that when executed by the one or more processors, perform the steps of:
compressing at least a portion of the video data; and
initiating transmission of at least the portion of the video data, in compressed form, to a client computing device having a display device.

31. A system for displaying an environment from a viewpoint, the system comprising:
an input device configured to receive user input designating the viewpoint within a viewing volume;
one or more processors, communicatively coupled to the input device configured to identify, from among a plurality of vantages within the viewing volume, a subset of the vantages nearest to the viewpoint comprising at least two of the vantages, each of which has associated video data;
a data store, communicatively coupled to the processor, configured to retrieve the video data from the subset of the vantages; and
a display device communicatively coupled to the processor;
wherein:
the one or more processors are further configured to combine the video data from the subset of the vantages to generate viewpoint video data depicting the environment from the viewpoint; and
the display device is configured to display the viewpoint video data, wherein the video data for each of the vantages comprises at least a first layer having a first resolution, and a second layer having a second resolution higher than the first resolution and wherein the one or more processors are further configured to:
identify a shortage of at least one of bandwidth, storage space, and processing power; and
in response to identification of the shortage, select the first layer;
wherein, the one or more processors are further configured to combine the video data from the subset of the vantages to generate the viewpoint video data by combining the first layers of the video data from the subset.

32. The system of claim 31, further comprising one or more cameras configured to capture volumetric video data depicting the environment from within the viewing volume;
wherein the one or more processors are further configured to:
distribute the plurality of vantages throughout the viewing volume; and
use the volumetric video data to generate the video data for each of the vantages such that the video data for each vantage comprises a subset of the volumetric video data that depicts the environment as viewed from the vantage.

33. The system of claim 31, wherein:
the video data for each of the vantages depicts an omni-directional view from the vantage;
the user input further designates a view direction; and
the viewpoint video data further depicts the environment from along the view direction.

34. The system of claim 33, wherein:
the video data for each of the vantages comprises a plurality of tiles;
each of the tiles comprises a sectoral portion of the video data; and
the one or more processors are further configured to combine the video data from the subset of the vantages to generate the viewpoint video data by combining the video data from only the tiles of the video data that are oriented proximate the view direction.

35. The system of claim 31, wherein the one or more processors are further configured, prior to display of the viewpoint video data on the display device, to initiate transmission of the viewpoint video data to a client computing device having the display device exclusive of video data for any of the vantages outside the subset.

36. The system of claim 31, wherein the one or more processors are further configured to use the video data from the subset of the vantages to predict at least a portion of additional viewpoint video data from one of the viewpoint and an additional viewpoint proximate to the viewpoint.

37. The system of claim 31, wherein the one or more processors are further configured to:
compress at least one selection from a group consisting of the viewpoint video data and the video data from the subset of the vantages;
initiate transmission of the selection, in compressed form, to a client computing device having the display device; and
decompress the at least one selection from the group consisting of the viewpoint video data and the video data from the subset of the vantages at the client computing device.

38. A system for preparing viewpoint video data for display for a user, the system comprising:
one or more cameras configured to capture volumetric video data depicting an environment from within a viewing volume; and
one or more processors, communicatively coupled to the one or more cameras, configured to:
distribute a plurality of vantages throughout the viewing volume; and
use the volumetric video data to generate video data for each of the vantages such that the video data for each vantage comprises a subset of the volumetric video data that depicts the environment as viewed from the vantage, wherein the one or more processors are further configured to generate the video data for each of the vantages by generating, within the video data for each of the vantages, at least a first layer having a first resolution and a second layer having a second resolution higher than the first resolution;
wherein the one or more processors are further configured to initiate transmission of the first layer, but not the second layer, of the video data for a subset of the vantages to a client computing device having a display device.

39. The system of claim 38, wherein:
the video data for each of the vantages depicts an omni-directional view from the vantage;
the video data for each of the vantages comprises a plurality of tiles; and
each of the tiles comprises a sectoral portion of the video data.

40. The system of claim 38, wherein the one or more processors are further configured to initiate transmission of the video data for a subset of the vantages to a client computing device having a display device without transmitting the video data for any of the vantages outside the subset to the client computing device.

41. The system of claim 38, wherein the one or more processors are further configured to:
compress at least a portion of the video data; and
initiate transmission of at least the portion of the video data, in compressed form, to a client computing device having a display device.

\* \* \* \* \*